United States Patent
Valensi et al.

(10) Patent No.: US 11,580,137 B2
(45) Date of Patent: *Feb. 14, 2023

(54) SYSTEMS AND METHODS FOR ATTRIBUTE ANALYSIS OF ONE OR MORE DATABASES

(71) Applicant: Palantir Technologies Inc., Denver, CO (US)

(72) Inventors: Boris Valensi, San Francisco, CA (US); James Ong, New York, NY (US); Howard Carter, Providence, RI (US); Joy Tao, New York, NY (US); Mark Schafer, New York, NY (US); Barry McCardel, New York, NY (US); Kelsey Falter, New York, NY (US); Roger Hu, New York, NY (US)

(73) Assignee: Palantir Technologies Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/459,801

(22) Filed: Aug. 27, 2021

(65) Prior Publication Data

US 2022/0164371 A1    May 26, 2022

Related U.S. Application Data

(63) Continuation of application No. 16/172,616, filed on Oct. 26, 2018, now Pat. No. 11,106,701, which is a (Continued)

(51) Int. Cl.
*G06F 16/20* (2019.01)
*G06F 16/28* (2019.01)
*G06F 3/0484* (2022.01)
*G06F 3/0482* (2013.01)
*G06F 16/25* (2019.01)
*G06F 16/248* (2019.01)
*G06F 16/901* (2019.01)
*G06F 16/26* (2019.01)
*G06F 16/90* (2019.01)
*G06F 3/00* (2006.01)

(52) U.S. Cl.
CPC .......... *G06F 16/285* (2019.01); *G06F 3/0482* (2013.01); *G06F 3/0484* (2013.01); *G06F 16/248* (2019.01); *G06F 16/25* (2019.01); *G06F 16/26* (2019.01); *G06F 16/9024* (2019.01)

(58) Field of Classification Search
CPC .............................. G06F 16/248; G06F 16/26
See application file for complete search history.

(56) References Cited

U.S. PATENT DOCUMENTS 10,114,884 B1    10/2018    Valensi et al.
11,106,701 B2    8/2021    Valensi et al.
(Continued)

*Primary Examiner* — Kristopher Andersen
(74) *Attorney, Agent, or Firm* — Knobbe, Martens, Olson & Bear, LLP

(57) ABSTRACT

Systems and techniques for indexing and/or querying a database are described herein. Multiple, large disparate data sources may be processed to cleanse and/or combine item data and/or item metadata. Further, attributes may be extracted from the item data sources. The interactive user interfaces allow a user to select one or more attributes and/or other parameters to present visualizations based on the processed data.

18 Claims, 42 Drawing Sheets

Related U.S. Application Data continuation of application No. 15/077,650, filed on Mar. 22, 2016, now Pat. No. 10,114,884.

(60) Provisional application No. 62/268,425, filed on Dec. 16, 2015.

(56) References Cited

U.S. PATENT DOCUMENTS

| | | | | |
|---|---|---|---|---|
| 2004/0143600 | A1* | 7/2004 | Musgrove | G06F 16/24575 |
| 2007/0203902 | A1* | 8/2007 | Bauerle | G06F 16/283 |
| | | | | 707/999.005 |
| 2015/0317320 | A1* | 11/2015 | Miller | G06F 16/951 |
| | | | | 707/728 |

\* cited by examiner

TRENDS: ATTRIBUTES

Find attributes trending in...
Any of these categories:
[CANDY ×]

With this attribute type:
[ANY ▼]

Optional specifications...
Only display these attributes:
[CRUNCHY ×] [PEANUT BUTTER ×]

Hide these attributes:
[           ]

[Clear]  [Apply]

---

940F

4-YR CAGR | GROWTH RATES | DOL SALES | VOL SALES | MARKET SHARE | SAMPLE SIZE | TIME SERIES | SUMMARY TA...

904F → SAMPLE SIZE

COUNT OF
[Products ×]

350
300
250
200
150
100
50

942F → PEANUT BUTTER

944F → CRUNCHY

FILTER RESULTS

FILTER BY
[Dol Sales 2014: Descending ▼]

NUMBER OF RESULTS
[10 ▼]

|  | MIN | MAX | MIN | MAX |
|---|---|---|---|---|
| 2014 DOL SALES | $ [ ] M | $ [ ] M | | |
| 2013 DOL SALES | $ [ ] M | $ [ ] M | | |
| 2012 DOL SALES | $ [ ] M | $ [ ] M | | |
| 2011 DOL SALES | $ [ ] M | $ [ ] M | | |
| 4-YR CAGR | | | [ ] % | [ ] % |
| LAST YEAR GR | | | [ ] % | [ ] % |
| 2012-2013 GR | | | [ ] % | [ ] % |
| 2011-2012 GR | | | [ ] % | [ ] % |

[Apply]

900

TRENDS: ATTRIBUTES

Find attributes trending in...

Any of these categories:
[ CANDY × ]

With this attribute type:
[ ANY ▶ ]

Optional specifications...

Only display these attributes:
[ CRUNCHY × ] [ PEANUT BUTTER × ]

Hide these attributes:
[ ]

[ Clear ] [ Apply ]

---

904H — 4-YR CAGR | GROWTH RATES | DOL SALES | VOL SALES | MARKET SHARE | SAMPLE SIZE | TIME SERIES | SUMMARY TA... ← 956, 940H

| Attribute | 2014 Dol Sales (Mil) | 2014 Vol Sales (Mil) | CAGR | Last Year Growth | 2014 UPC count |
|---|---|---|---|---|---|
| PEANUT BUTTER | 1501.38 | 293.23 | 0.7 | 1.73 | 1929 |
| CRUNCHY | 202.33 | 36.86 | 0.74 | 3.26 | 501 |

[ EXPORT ALL YEARS TO EXCEL ] ← 946

FILTER RESULTS

FILTER BY
[ Dol Sales 2014: Descending ▶ ]

NUMBER OF RESULTS
[ 10 ▶ ]

| | MIN | | MAX | |
|---|---|---|---|---|
| 2014 DOL SALES | $ | M | $ | M |
| 2013 DOL SALES | $ | M | $ | M |
| 2012 DOL SALES | $ | M | $ | M |
| 2011 DOL SALES | $ | M | $ | M |

| | MIN | MAX |
|---|---|---|
| 4-YR CAGR | % | % |
| LAST YEAR GR | % | % |
| 2012-2013 GR | % | % |
| 2011-2012 GR | % | % |

[ Apply ]

SYSTEMS AND METHODS FOR ATTRIBUTE ANALYSIS OF ONE OR MORE DATABASES

INCORPORATION BY REFERENCE TO ANY PRIORITY APPLICATIONS

This application is a continuation of U.S. patent application Ser. No. 16/172,616 entitled "Systems and Methods for Attribute Analysis of One or More Databases" filed Oct. 26, 2018, which is a continuation of U.S. patent application Ser. No. 15/077,650 entitled "Systems and Methods for Attribute Analysis of One or More Databases" filed Mar. 22, 2016, now U.S. Pat. No. 10,114,884 issued Oct. 30, 2018, which claims benefit of U.S. Provisional Patent Application Ser. No. 62/268,425 entitled "Systems and Methods for Attribute Analysis of One or More Databases" filed Dec. 16, 2015. Each of these applications are hereby incorporated by reference herein in their entireties.

Any and all applications for which a foreign or domestic priority claim is identified in the Application Data Sheet as filed with the present application are hereby incorporated by reference under 37 CFR 1.57.

CROSS-REFERENCE TO RELATED APPLICATIONS

This application hereby incorporates by reference in their entireties, but does not claim priority to, each of the following:

U.S. patent application Ser. No. 14/841,338 entitled "System For Providing Dynamic Linked Panels In User Interface" filed Dec. 31, 2014 ("the '338 application.")

U.S. patent application Ser. No. 14/874,690 entitled "Domain-specific Language for Dataset Transformations" filed Oct. 5, 2014 ("the '690 application.")

U.S. Pat. No. 8,937,619 entitled "Generating An Object Time Series From Data Objects," which issued from U.S. patent application Ser. No. 14/148,559 filed Jan. 6, 2014 ("the '619 patent.")

BACKGROUND

In the area of computer-based platforms, a database may be queried.

SUMMARY

The systems, methods, and devices described herein each have several aspects, no single one of which is solely responsible for its desirable attributes. Without limiting the scope of this disclosure, several non-limiting features will now be discussed briefly.

One embodiment includes a computer-implemented method for identifying trends of one or more items from an item database, the computer-implemented method comprising: accessing item data from a first data source; accessing item metadata from a second data source, the item metadata comprising a mapping of item identifiers to respective categories, and one or more metadata values for each item of the item metadata; analyzing the item data by at least: determining cleansed item data; determining a set of attributes from the cleansed item data; and determining a category for each respective item using the mapping of item identifiers to respective categories; receiving input comprising data indicative of a first attribute from the set of attributes and a first category; determining a set of items where each item of the set of items are associated with both the first attribute and the first category; determining, from the item metadata, a set of metadata values associated with the set of items; aggregating the set of metadata values to determine a summary indicator representative of the set of items; generating a graph from the summary indicator; and presenting the graph in a user interface.

In some embodiments, the computer-implemented method of the preceding paragraph can include a combination or sub-combination of features. The computer-implemented method can further include: wherein determining cleansed item data comprises at least one of: removing a number from the item data, removing punctuation from the item data, or removing text data from the item data wherein the text data does not correspond to a set of valid words. The computer-implemented method can further include: determining at least one binary column within the item data; replacing a column value of the at least one binary column with a predefined attribute value based at least on the column value being non-empty; and adding the predefined attribute value to the set of attributes. The computer-implemented method can further include: receiving second user input via the user interface, the second user input comprising data indicative of the first attribute, the first category, and a second exclusion attribute from the set of attributes; determining a second set of items associated with the first category; determining a first subset of items from the second set of items, wherein each item of the first subset of items is further associated with the first attribute, and wherein the first subset of items comprises a first item and a second item, the first item associated with the first attribute and the second exclusion attribute; determining a second subset of items by removing the first item from the first subset of items; determining, from the item metadata, a second set of metadata values associated with the second subset of items; and presenting a visualization, in the user interface, associated with the second set of metadata values. The item data can comprise food item data. The summary indicator can correspond to at least one of: total dollar sales of the set of items, growth rates of the set of items, volume of sales of the set of items, or market share of the set of items. The computer-implemented method can further include: wherein determining cleansed item data comprises at least one of: removing a number from the item data, removing punctuation from the item data, or removing text data from the item data wherein the text data does not correspond to a set of valid words. The set of attributes can comprise a multi-word attribute. The computer-implemented method can further include: wherein determining the cleansed item data further comprises removing a stopword from the item data based at least on a predefined stopword list. The computer-implemented method can further include: determining one or more multi-word attributes from the cleansed item data using an n-gram identification algorithm, wherein the set of attributes comprises the one or more multi-word attributes. The item data can comprise three or more columns of data, and the computer-implemented method can further include: wherein determining one or more multi-word attributes from the cleansed item data further comprises pseudo-randomly reordering the three or more columns of data. The user interface can further comprise at least one of: a time series or a summary table.

Another embodiment includes a non-transitory computer storage medium for storing computer executable instructions that when executed by a computer hardware processor perform operations comprising: accessing item data from a first data source; analyzing the item data by at least: determining cleansed item data by at least one of: removing a number from the item data, removing punctuation from the item data, or removing text data from the item data wherein the text data does not correspond to a set of valid words; determining that two or more words from the item data are synonyms; selecting a first word from the two or more words as a representative attribute; and determining a set of attributes from the cleansed item data, the set of attributes comprising the representative attribute; accessing item metadata from a second data source; receiving user input via a user interface, the user input comprising data indicative of a first attribute from the set of attributes; determining a set of items where each item of the set of items is associated with the first attribute; determining, from the item metadata, a set of metadata values associated with the set of items; generating a visualization from the set of metadata values; and presenting the visualization in the user interface.

In some embodiments, the non-transitory computer storage medium of the preceding paragraph can include a combination or sub-combination of features. The operations can further include: determining at least one binary column within the item data; replacing a column value of the at least one binary column with a predefined attribute value based at least on the column value being non-empty; and adding the predefined attribute value to the set of attributes. The operations can further include: receiving second user input via the user interface, the second user input comprising data indicative of the first attribute, the first category, and a second exclusion attribute from the set of attributes; determining a second set of items associated with the first category; determining a first subset of items from the second set of items, wherein each item of the first subset of items is further associated with the first attribute, and wherein the first subset of items comprises a first item and a second item, the first item associated with the first attribute and the second exclusion attribute; determining a second subset of items by removing the first item from the first subset of items; determining, from the item metadata, a second set of metadata values associated with the second subset of items; and presenting a visualization, in the user interface, associated with the second set of metadata values. The item data can comprise food item data. The visualization can comprise at least one of: total dollar sales of the set of items, growth rates of the set of items, volume of sales of the set of items, or market share of the set of items. The visualization can comprise at least one of: growth rate data, annual sales data, volume sales data, market share data, or sample size data. The operations can further include: wherein determining cleansed item data comprises at least one of: removing a number from the item data, removing punctuation from the item data, or removing text data from the item data wherein the text data does not correspond to a set of valid words. The set of attributes can comprise a multi-word attribute. The operations can further include: wherein determining the cleansed item data further comprises removing a stopword from the item data based at least on a predefined stopword list. The operations can further include: determining one or more multi-word attributes from the cleansed item data using an n-gram identification algorithm, wherein the set of attributes comprises the one or more multi-word attributes. The item data can comprise three or more columns of data, and the operations can further include: wherein determining one or more multi-word attributes from the cleansed item data further comprises pseudo-randomly reordering the three or more columns of data. The visualization can comprise at least one of: a graph visualization, a time series visualization, or a summary table visualization.

Another embodiment includes a computing system comprising: one or more hardware computer processors programmed, via executable code instructions, to: access item data from a first data source; analyze the item data by at least: determining cleansed item data; and determining the set of attributes from the cleansed item data; receive input comprising data indicative of a first attribute from the set of attributes; determine a set of items where each item of the set of items is associated with the first attribute; access item metadata from a second data source; determine, from the item metadata, a set of metadata values associated with the set of items; generate a visualization from the set of metadata values; and present the visualization in a user interface.

In some embodiments, the computing system of the preceding paragraph can include a combination or sub-combination of features. The one or more hardware processors can be further programmed to: determine at least one binary column within the item data; replace a column value of the at least one binary column with a predefined attribute value based at least on the column value being non-empty; and add the predefined attribute value to the set of attributes. The one or more hardware processors can be further programmed to: receive second user input via the user interface, the second user input comprising data indicative of the first attribute, the first category, and a second exclusion attribute from the set of attributes; determine a second set of items associated with the first category; determine a first subset of items from the second set of items, wherein each item of the first subset of items is further associated with the first attribute, and wherein the first subset of items comprises a first item and a second item, the first item associated with the first attribute and the second exclusion attribute; determine a second subset of items by removing the first item from the first subset of items; determine, from the item metadata, a second set of metadata values associated with the second subset of items; and present a visualization, in the user interface, associated with the second set of metadata values. The item data can comprise food item data. The visualization can comprise at least one of: total dollar sales of the set of items, growth rates of the set of items, volume of sales of the set of items, or market share of the set of items. The visualization can comprise at least one of: growth rate data, annual sales data, volume sales data, market share data, or sample size data. The one or more hardware processors can be further programmed to: wherein determining cleansed item data comprises at least one of: removing a number from the item data, removing punctuation from the item data, or removing text data from the item data wherein the text data does not correspond to a set of valid words. The set of attributes can comprise a multi-word attribute. The one or more hardware processors can be further programmed to: wherein determining the cleansed item data further comprises removing a stopword from the item data based at least on a predefined stopword list. The one or more hardware processors can be further programmed to: determine one or more multi-word attributes from the cleansed item data using an n-gram identification algorithm, wherein the set of attributes comprises the one or more multi-word attributes. The one or more hardware processors can be further programmed to: receive second user input via the user interface, the second user input comprising data indicative of the first attribute and a filter parameter value; determine a first set of items associated with the first attribute and a second set of items associated with the first attribute; determine, from the item metadata, a first metadata value associated with the first set of items, and a second metadata value associated with the second set of items; select the first set of items based at least on: the first metadata value being within the first parameter value, and the second metadata value being outside of the first parameter value; and present a graph associated with the first set of items. The item data can comprise three or more columns of data, and the one or more hardware processors can be further programmed to: wherein determining one or more multi-word attributes from the cleansed item data further comprises pseudo-randomly reordering the three or more columns of data. The visualization can comprise at least one of: a graph visualization, a time series visualization, or a summary table visualization.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 9A-9J illustrate example user interfaces of the attribute analysis system, according to some embodiments of the present disclosure.

FIGS. 10A-10I illustrate example user interfaces of the attribute analysis system for analyzing multiple attribute groups, according to some embodiments of the present disclosure.

FIGS. 11A-11F illustrate example user interfaces of the attribute analysis system for analyzing particular items, according to some embodiments of the present disclosure.

DETAILED DESCRIPTION

Figure 1:
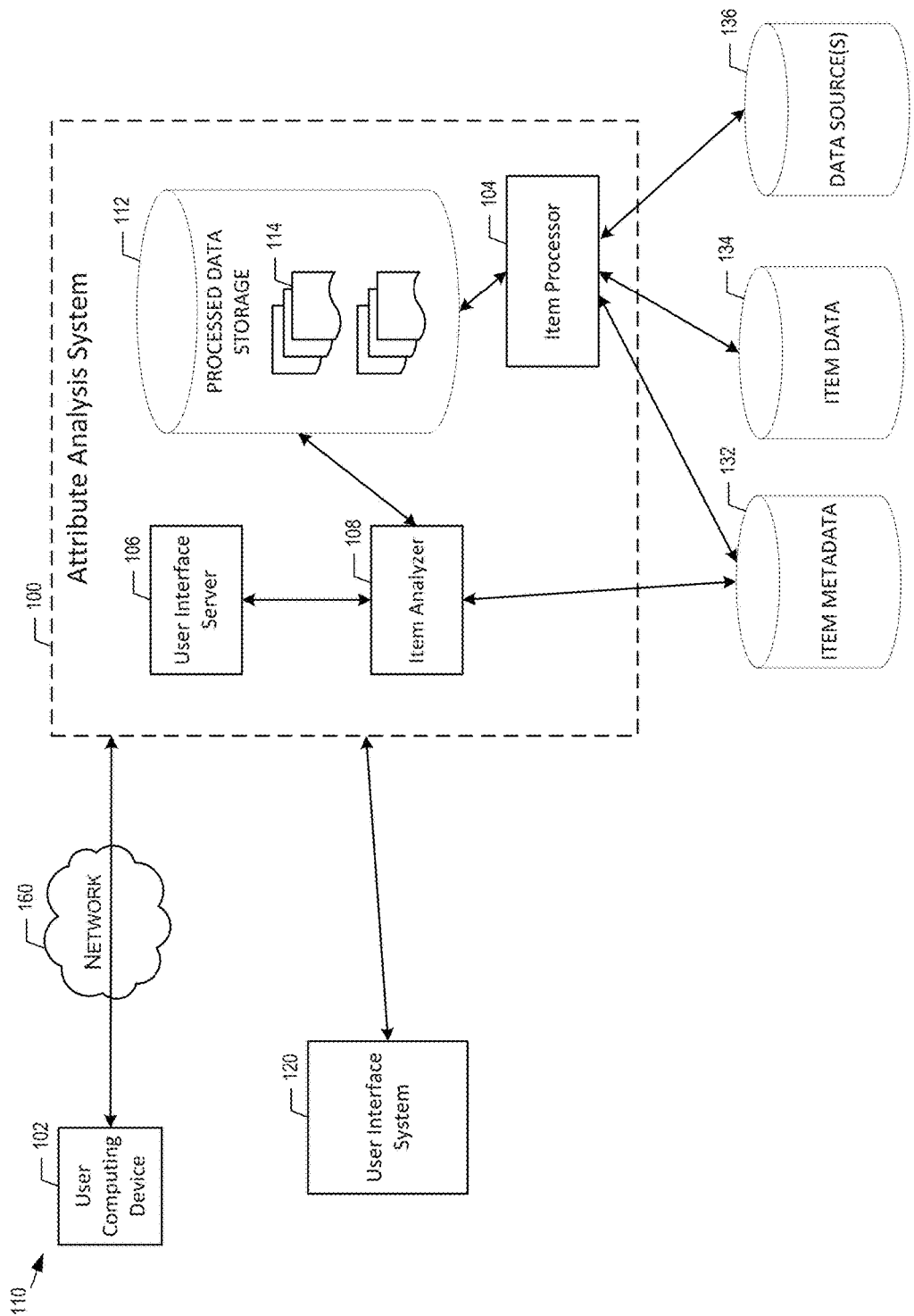
FIG. 1 is a block diagram illustrating an example attribute analysis system, according to some embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide example definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (for example, Oracle database, mySQL database, and the like), non-relational databases (for example, a NoSQL database), an in-memory database, spreadsheets, XML files, and text file, among others. The various terms "database," "storage," "data store," and "data source" may be used interchangeably in the present disclosure.

Data Object (Object), Data Item (Item), or Data Entity (Entity): A data container for information. A data object may be associated with a number of definable properties (as described herein). A data object may represent a specific thing, or a group of things, in the world. For example, a data object may represent an item such as a particular type of product, a food item, person, a place, an organization, an account, a computer, an activity, or other noun. In a food item context, an item may correspond to a specific food product. In some embodiments, an item may correspond to a particular item identifier. In the food example, an item identifier may be a Universal Product Code ("UPC"). In some embodiments, if a food product includes an ingredient list A at time one, and the food product includes an ingredient list B at time two (which differs from ingredient list A by at least one ingredient), then the item corresponding to the food product at time one may differ from the item corresponding to the food product at time two. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data object," "data item," "data entity," "item," "object," and "entity" may be used interchangeably and/or synonymously in the present disclosure.

Item (or Entity or Object) Type: Type of a data item (for example, Person, Event, or Document). Data item types may be defined by an ontology and may be modified or updated to include additional data item types. An data item definition (for example, in an ontology) may include how the data item is related to other data items, such as being a sub-data item type of another data item type (for example, an agent may be a sub-data item of a person data item type), and the properties the data item type may have.

Properties: Also referred to herein as "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user1, user2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Attribute: A string, word, group of words, and/or tag associated with an item. For example, an item, such as a candy bar, may be associated with ingredients and/or a number of descriptors, name of product, flavors, etc. Attributes of the item describe and/or relate to the item. Example attributes for a particular item, such as a particular candy bar, may be one or more of: "crunchy," "chocolate," "peanut butter," "whole grain," "bold," "noble," "layered," etc. In some embodiments, "peanut butter" and "peanut_butter" may refer to the same attribute and/or the former may refer to the presentation of the attribute in a user interface and the latter may refer to representation of the attribute in the underlying database and/or system. In some embodiments, an attribute of an item may be a property of the item. Further, one or more attributes may be associated with a particular item and/or two or more items may be associated same attribute. An example attribute may be represented by a label that corresponds to multiple words and/or phrases associated with same attribute. For example, "crumbly" may be the label for a particular attribute, which is representative of multiple words such as "crumbled," "crumbly," and "crumble." An advantage of the algorithms and/or techniques described herein is that the determined attributes may be high-level concepts associated with an item. In a food item example, attributes for a food item may correspond to concepts that are not directly related to a flavor or ingredient, such as, for example, "noble," "liberty," "peruvian," etc.

Category: The class of an item. In some embodiments, the category of an item may be a property of the item. For example, particular items may be determined to correspond to one or more categories. Continuing with the food item example, the various categories may correspond to "candy," "salty snacks," "cookie," etc. In some embodiments, an item may be determined to correspond to two or more categories. In other embodiments, categories may correspond to the particular environment such as electronics, manufacturing, or other areas.

Product: Refers to a grouping that may apply to an item. In some embodiments, "product" may be a property of the item. For example, particular items may be determined to correspond to one or more products. Two or more items may correspond to the same product, Continuing with the food example, the product may be "Acme's cookies," which may include two or more items that are associated with "Acme's cookies," but each item may have different ingredients (such as different flavors for each item), different properties, and/or item identifiers. Usage of the product grouping may allow several items and/or UPCs to be analyzed together. For example, different UPCs may refer to the regular, large, and king sizes of essentially the same item, and usage of the product grouping allows the particular product to be analyzed together. In some embodiments, the product grouping may allow a broad number of items to be associated together, such as all or most of the items by a particular manufacturer, retailer, and/or organization to be grouped together. As used herein, "brand," "item grouping," and "product" may be used interchangeably. Product and category may be similar in that each respective term refers to a higher level description of an item.

Overview

Analysts may be interested in analyzing enormous data sets to determine insights associated with items from the data sets. The data sets may be from multiple disparate data sources that include gigabytes, terabytes, or even petabytes of data. An approach to analyzing the data sets may include processing the data sets by particular items, which may take weeks to accomplish.

Disclosed herein are systems and methods that may be used to advantageously process data sets and/or to provide user interfaces that enable a user to analyze the processed data sets. For example, the large data sources may include item data sets in a row and columnar data format. Other disparate data sources may include item metadata. The item data sets and/or the item metadata may be processed to extract attributes and/or other data to be used in the user interfaces. The interactive user interfaces allow a user to select one or more attributes and/or other parameters to present visualizations based on the processed data sets.

Embodiments of the present disclosure relate to an efficient and/or optimized attribute analysis system that processes multiple, large disparate data sources. For example, the attribute analysis system may enable users to do one or more the following: identify attributes associated with the growth of an item; identify, at the very early stages, attributes that are trending in a particular industry; identify two or more attributes that are doing well, which may be used for product development; identify one or more attributes best matching a selected attribute (e.g., what is the second-best attribute to add to the launch of a new candy with cookie dough?); quickly identify competitors for launching a new product (e.g., what are all items with chocolate and nougat?); rapidly identify the size of markets for items was selected attributes (e.g., how big is the nutritional bar market for bars with coconuts and nuts?); initially test prospective items for testing them on the market (e.g., is a salty snack with nuts and chocolate likely to succeed or fail?); and/or understand what are the attributes of selected shoppers (e.g., are the people buying dark chocolate also buying spicy food?).

Example Attribute Analysis System

FIG. 1 illustrates an attribute analysis system 100, according to some embodiments of the present disclosure. In the embodiment of FIG. 1, the database environment 110 includes a network 160, an attribute analysis system 100, a user computing device 102, a user interface system 120, and data sources, such as item metadata storage 132, item data storage 134, and/or other data sources 136. Various communications between these devices are illustrated. For example, the user computing device 102 may send user input, such as queries, to the attribute analysis system 100.

The example attribute analysis system 100 includes an item processor 104, a user interface server 106, an item analyzer 108, and processed data storage 112. The item processor 104 may process the large data sets from the item data storage 134 to extract attributes and/or other useful data from the item data sets. The item processor 104 may also process the item metadata storage 132, which may contain item metadata such as sales data associated with the items. The item processor 104 may store the processed data 114, including the one or more determined attributes, categories, and/or item metadata in the processed data storage 112. In some embodiments, a user may perform operations via the user interface server 106 such as selecting one or more predefined search interfaces, selecting one or more attributes and/or other parameters, selecting one or more predefined visualizations, such as graphs and/or time series, reviewing search results, and/or filtering search results, as described in further detail herein. For example, the user interface server 106 may receive user input to query the processed data storage 112 and/or other data stores, such as item metadata storage 132, via the item analyzer 108.

In some embodiments, the attribute analysis system 100 communicates with the user interface system 120. For example, the user interface system 120 may allow an administrator to generate and/or update the predefined user interfaces of the attribute analysis system 100, which is described in further detail herein.

Example Attribute Analysis Process Overview

Figure 2:
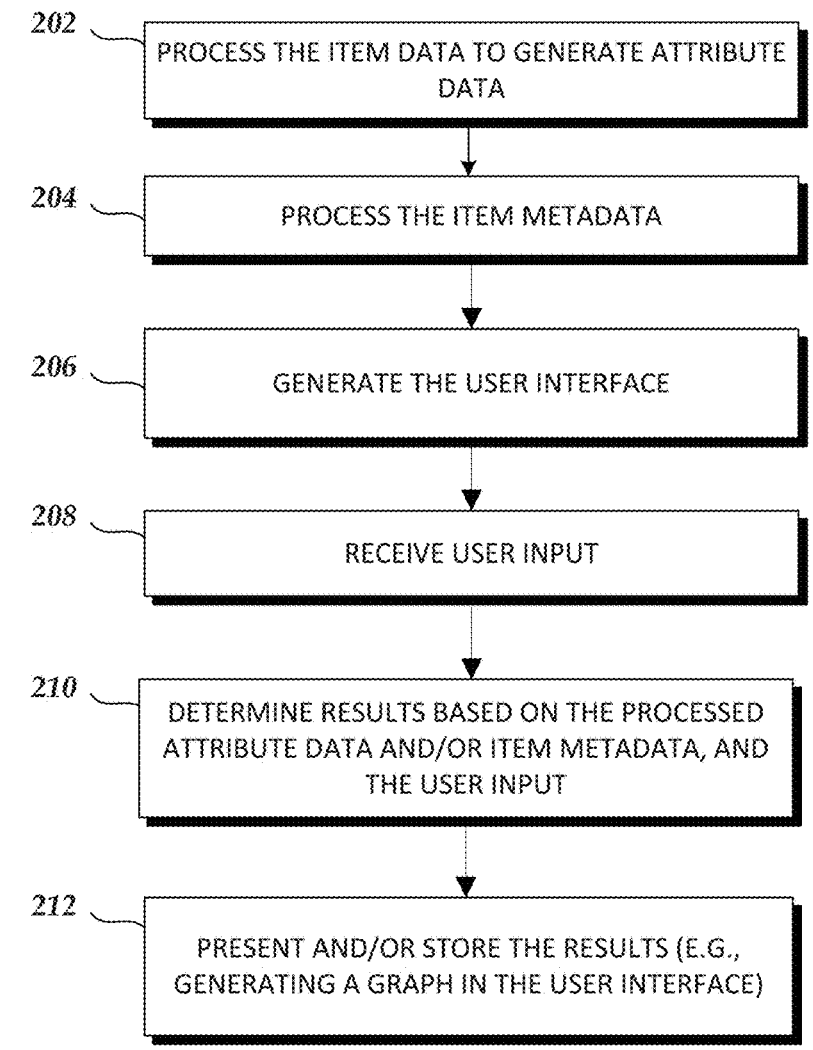
FIG. 2 is a flowchart illustrating an example attribute analysis process overview, according to some embodiments of the present disclosure.

FIG. 2 is a flowchart of an example method of processing and/or presenting attribute data, according to some embodiments of the present disclosure. Although the method 200 is described in conjunction with the systems of FIG. 1, any system configured to perform the method, in any order, is within the scope of this disclosure. The method 200 may be performed by the systems 100 and/or 120 of FIG. 1, such as the various components of the attribute analysis system 100 of FIG. 1 as discussed herein, including the item processor 104, the user interface server 106, and/or the item analyzer 108. Depending on the embodiment, the method 200 may include fewer or additional blocks and/or the blocks may be performed in an order different than is illustrated. Blocks of FIG. 2 may be similar to blocks of FIGS. 3-7. For example, the techniques and/or algorithms of a block of FIG. 2 may describe the techniques and/or algorithms that can be used at a block of FIGS. 3-7 or vice versa.

Beginning at block 202 the item processor 104 may process the item data to generate and/or store data, such as attribute data, for the attribute analysis system 100. The item processor 104 may process the item data by accessing the item data in a database format, cleansing the item data, enriching the item data, and/or determining one or more attributes. Example processes and/or algorithms for processing item data are described in further detail herein, such as with reference to FIG. 3.

At block 204, the item processor 104 may process the item metadata to generate and/or store item-related data for the attribute analysis system 100. For example, the item metadata may include sales and/or category data for one or more items in the item data. Accordingly, in the example, the item processor 104 determines the corresponding sales data and/or categories for the one or more items. In the category example, the item metadata may include a mapping of items to categories. The item processor 104 may process items of the item data and use the mapping of items to determine categories for the items of the item data. In some embodiments, the mapping of items includes a mapping of item identifiers to a category and/or category identifier. Example processes and/or algorithms for processing item metadata are described in further detail herein, such as with reference to FIG. 3.

In some embodiments, the item processor 104 may generate items and/or data objects via the processing at blocks 202 and 204. For example, the row and columnar item data and/or item metadata may be merged and/or converted into data objects. Example data objects may be described in further detail with respect to FIG. 8.

At block 206, the user interface server 106 generates a user interface. As described herein, the generated user interfaces may enable user to query the attribute data and/or other item-related data. The generated user interfaces are described in further detail herein with reference to FIGS. 9A-9J, 10A-10I, 11A-11F, and 12A-12H. In some embodiments, the user interfaces may be defined by an administrator using the user interface system 120. Additional information regarding defining and/or generating user interfaces, such as particular techniques, processes, and/or algorithms thereof, and the user interface system 120 is found in U.S. patent application Ser. No. 14/841,338 and U.S. patent application Ser. No. 14/874,690. For example, the '338 application describes various systems and methods for defining and/or generating user interfaces in at least paragraphs [0020]-[0080], among others. As another example, the '690 application describes various systems and methods for transforming datasets for user interfaces in at least paragraphs [0015]-[0089], among others. Additional information regarding generating time series user interfaces, such as particular techniques, processes, and/or algorithms thereof is found in U.S. Pat. No. 8,937,619. For example, the '619 patent describes various systems and methods for generating time series user interfaces in at least Col. 21.9-Col. 131.26, among others.

At block 208, the user interface server 106 receives the user input via the user interface. For example, a user may query for one or more attributes and/or other parameters via the user interface. Various methods for receiving user input is described in further detail with reference to FIGS. 4-8. Example interactive user interfaces associated with the user input are described in further detail with reference to FIGS. 9A-9J, 10A-10I, 11A-11F, and 12A-12H.

At block 210, the item analyzer 108 determines results based at least on the process attribute data and/or item metadata, and the received user input. For example, the user input may include the attribute "crunchy" and the category "candy." In the example, the item analyzer 108 determines items within the category "candy" and with the attribute "crunchy." Accordingly, the item analyzer 108 may determine a summary indicator for an item and/or a set of items by aggregating respective item metadata values. Continuing with the example, the item analyzer 108 calculates annual sales for the determined items for a predefined number of years. Various methods for determining results based on the user input and/or the processed data is described in further detail with reference to FIGS. 4-8.

At block 212, the item analyzer 108 and/or the user interface server 106 presents and/or stores the results. For example, the user interface server 106 generates a graph visualization based on the determined results at block 210. Additional information regarding presenting visualizations, such as particular techniques, processes, and/or algorithms thereof, and the user interface system 120 is found in the '338 application. For example, the '338 application describes various systems and methods for defining and/or generating visualizations in at least paragraphs [0020]—[0080], among others. Additional information regarding generating time series visualizations, such as particular techniques, processes, and/or algorithms thereof is found in the '619 patent. For example, the '619 patent describes various systems and methods for generating time series visualizations in at least Col. 21.9-Col. 131.26, among others. Example visualizations are described in further detail with reference to FIGS. 9A-9J, 10A-10I, 11A-11F, and 12A-12H. Additionally or alternatively, the item analyzer 108 may store some and/or all of the determined results in the processed data storage 112.

Example Data Extraction and/or Enrichment

Figure 3:
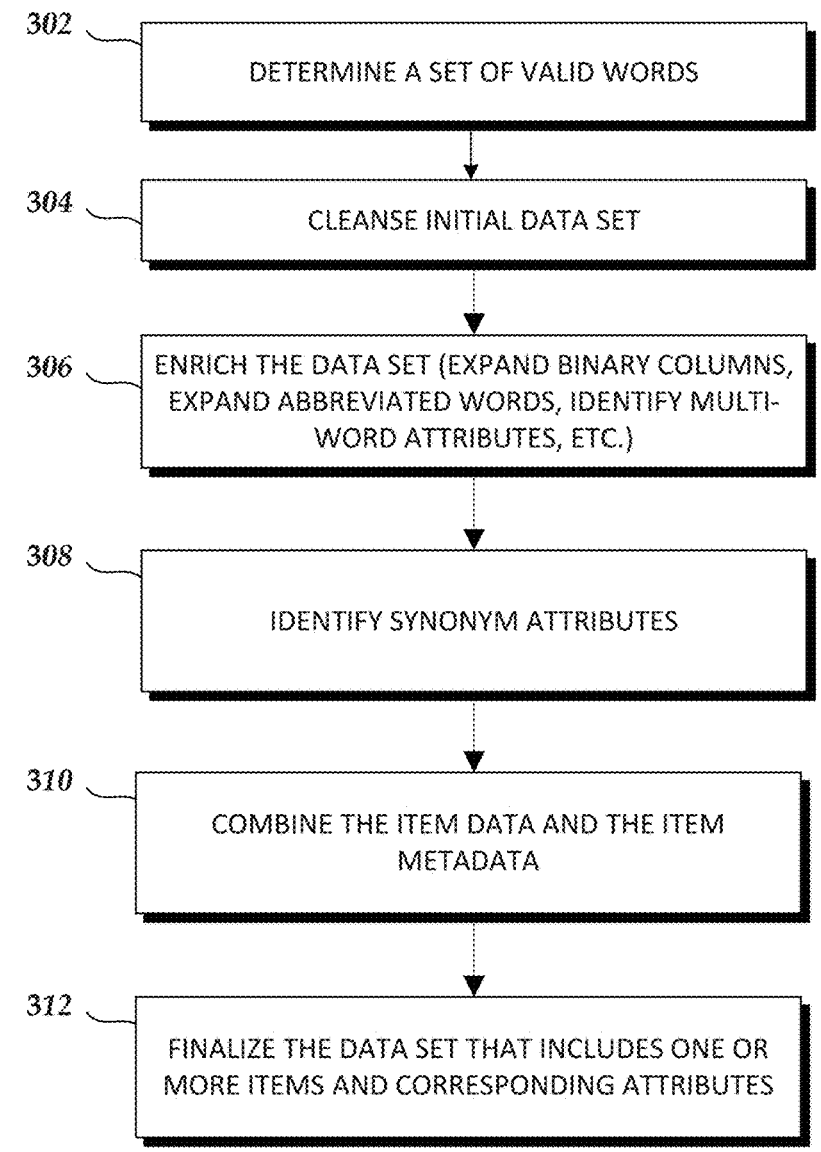
FIG. 3 is a flowchart illustrating an example data extraction and/or enrichment process, according to some embodiments of the present disclosure.

FIG. 3 is a flowchart illustrating an example method of data extraction and/or enrichment, according to some embodiments of the present disclosure. For example, the method 300 may be capable of analyzing the item data and/or item metadata. Although the method 300 is described in conjunction with the systems of FIG. 1, any system configured to perform the method, in any order, is within the scope of this disclosure. The method 300 may be performed by the attribute analysis system 100 of FIG. 1, such as the various components of the attribute analysis system 100 of FIG. 1 as discussed herein, including the item processor 104, the user interface server 106, and/or the item analyzer 108. Depending on the embodiment, the method 300 may include fewer or additional blocks and/or the blocks may be performed in an order different than is illustrated.

Beginning at block 302 the item processor 104 may determine a set of valid words. For example, the item processor 104 accesses a dictionary data store. In some embodiments, an example dictionary data store may correspond to a dictionary application or a dictionary service of a computing device. The item processor 104 may determine the set of valid words by updating the case of the words from the dictionary data store, such as updating the words in the data store to lowercase. The item processor 104 may optionally add colloquial terms and/or terms of art that are not typically found in standard dictionaries to the set of valid words. In a food item example, the item processor 104 adds words such as "creme," "bbq," and "sriracha" to the set of valid words. In some embodiments, the dictionary service may correspond to an online dictionary and/or a crowd-sourced encyclopedia. Accordingly, the dictionary service may provide valid words such as "creme," "bbq," and "sriracha." In the food item example, a food dictionary may be used to identify valid set of words. As described herein, item processor 104 may use the set of valid words, such as from a dictionary of words, to remove text data from the item data. In some embodiments, even if a word is in the set of valid words, the item processor 104 may discard the word if there is too low of a frequency of the particular word in the text data.

At block 304, the item processor 104 cleanses the data set to generate cleansed item data. For example, the item processor 104 accesses the item data from the item data storage 134 as the initial data set. In some embodiments, the item data includes hundreds of thousands of items and/or the item data is in a row and columnar format. In the example, the item data includes hundreds of columns for each item. Example item data is described in further detail with respect to FIG. 8. In some embodiments, the item processor 104 cleanses the initial data set by updating the case of the data, such as by updating the initial data set to lowercase. Additionally or alternatively, the item processor removes numbers and/or punctuation from the data set.

In some embodiments, the item processor 104 performs additional steps to further cleanse the data set. For example, the item processor 104 may: remove columns with a cardinality below a predefined cardinality threshold; remove columns that have non-empty values below a predefined threshold; and/or remove columns from a predefined list of columns that have been determined to not contain useful attributes. For example, a weight column may be discarded.

At block 306, the item processor 104 enriches the data set. For example, the item processor 104 expands binary columns in the data set. As used herein, "binary column" refers to a property type with corresponding binary values, such as 1 or 0, or "yes" or "no." The example method for expanding binary columns includes: determining binary columns within the data set, determining whether the column type is positive (e.g., presence of calcium) or negative (e.g., a low-cholesterol item); if the column value is non-empty then map the value to one or more attributes (e.g., "low_fat," "low_cholestrol") from a predefined mapping of binary values to attributes. In some embodiments, particular binary columns contain data such as "soy" or "soy free," and the item processor 104 may concatenate the column values to a single word, such as changing "soy free" to "soy_free." Further detail regarding expanding binary columns is described with respect to FIG. 8.

In some embodiments, the item processor 104 further cleanses the data set at the data value level. For example, the item processor 104 may remove words predefined set of blacklist words (which are known to lack usefulness as attributes) and variations of the blacklist words (without vowels, stemmed, etc.). Additionally or alternatively, the item processor 104 may remove stopwords (e.g. "the," "is," "at," "which," and "on"). In one embodiment, the item processor 104 remove stopwords from a predefined stopword list. For example, one or more known natural language processing techniques may be used for filtering stopwords such as by using a stop word list from the Python Natural Language Toolkit ("NLTK"). Additionally or alternatively, the item processor 104 may remove words from the data set that are below a defined character threshold, such as a threshold of two characters (which would cause words of one character length to be removed).

In some embodiments, the item processor 104 performs additional steps to further enrich the data set. For example, the item processor 104 enriches some of the column values for particular column types. For example, some column values may benefit from part of the color name to provide extra context, e.g., "cheese_component." In the example, all or part of the column name may be added to a column value if the column value does not already contain the full or partial column name. In other examples, the item processor 104 expands particular column values and/or abbreviations. In the food item example, a "chocolate_type" column with column values "w" or "d" that may be converted to "white_chocolate" or "dark_chocolate." In some embodiments, the item processor 104 accesses a predefined translation table for converting abbreviations and/or code values into attributes with greater linguistic meaning.

In some embodiments, attributes may be automatically organized into a hierarchy. For example, fruit attributes ("apple," "orange," "banana," etc.) may be organized under the "fruit" attribute, berry attributes ("blueberry," "raspberry," "strawberry," etc.) may be organized under the "berry" attribute. For example, NLTK's wordnet may be used to automatically identify related attributes.

In some embodiments, the item processor 104 may combine the column values from two or more of the columns were further enriching the data set and/or determining attributes. For example, the item processor 104 may randomly or pseudo-randomly order the columns. It may be advantageous to use a random or pseudo-random ordering when determining attributes for multi-words to decrease the likelihood that attributes are determined from multiple column values simply due to being adjacent to one another. Additionally or alternatively, the item processor 104 may break apart known compound words into multiple attributes.

The item processor 104 may identify multi-word attributes from multiple words. For example, item processor 104 may determine the attribute "old_fashioned" from the words "old fashioned." For example, the item processor 104 may construct a collection of words from some or all of the text of the item data. One or more n-gram natural language processing algorithms may be used to determine attributes based on multiple words. In some embodiments, the n-gram identification algorithms may look for words which appear in sequence together more often than they appear apart, e.g., contrast "red wine" with "the wine." Example n-gram identification algorithms include the BigramCollocationFinder or TrigramCollocationFinder of NLTK. In some embodiments, the n-gram algorithms may receive a variable to specify the minimum number of times a phrase must appear to constitute an n-gram. The item processor 104 may then convert the multi-word phrases to single attributes, such as by replacing spaces within the multi-word phrases with underscores. In some embodiments, the item processor determines variations of the multi-word attributes by including vowel-stripped and stemmed versions of the multi-word phrases.

In some embodiments, the item processor 104 maps multiple attributes into a single attribute. For example, the item processor 104 may access a predefined list of related attributes to select a single representative attribute. In the food item context, one example would be selecting the representative attribute "low_calorie" from a collection of similar attributes of "low_calorie," "fewer_calories," and "less_calories." Additionally or alternatively, the item processor 104 may use a data store of synonyms to automatically determine related attributes based on synonym words. For example, "low," "few," and "less" may all be synonyms in a data store and the item processor 104 may determine a single attribute for the previously mentioned example collection of "low_calorie," "fewer_calories," and "less_calories." In some embodiments, an algorithm may be used to collect groups of synonym words, also known as "synsets." One example algorithm is UnionFind.

At block 308, the item processor 104 determines attributes for similarly spelled and/or related words in the item data. For example, the item processor 104 may construct a collection of words from some or all of the text of the item data. Sets of related words and/or synsets may be determined for individual attributes. The item processor 104 may use the set of related and/or synonymous words may to select an attribute to represent two or more related words. In some embodiments, the item processor 104 stems the words to map to an attribute. For example, the item processor 104 may map the words "crumbled," "crumbly," and "crumble" to the same attribute. In some embodiments, the item processor 104 uses the UnionFind algorithm and/or a synonym data store to determine related words. In the example, the item processor 104 generates variations of each word and adds them to a synset using a union-find data structure or adds them to an existing synset if it matches a word in the synset. In some embodiments, a match may include words with an edit distance less than a predefined threshold, such as one. In some embodiments, the item processor 104 uses specific rules for determining attributes for similar words, such as: ignoring particular predefined words; matching the first letter; the word must be at least a certain number of characters long for checking the edit distance (such as five characters); ignoring the edit distance check words that start with particular letters (such as "a" or "b") because there would be too many false positives otherwise; and/or acquiring the words to be greater than a predefined threshold of characters (such as four characters for example). In some embodiments, the item processor 104 identifies a label for multiple similar words and or phrases. For example, the item processor 104 may select the shortest dictionary word from the set of related words and/or phrases as the label. Additionally or alternatively, the item processor 104 may ignore words ending in a particular letter or vowel, such as "i," to avoid selecting a stem word as a label. Additionally or alternatively, the item processor 104 may further stand all the words and replace the variations with the previously identified late. In some embodiments, the item processor 104 converts the union-find data structure into a map to use the map in identifying stemmed words for improved performance.

At block 310, the item processor 104 may combine the item data with the item metadata. For example, the item processor 104 may access item metadata from the item metadata storage 132 that includes predefined item categories. Accordingly, the item processor 104 may map items in the item data from the item data storage 134 to the predefined item categories. In a food item context, example categories include "candy," "snack," or "cookie." In some embodiments, the item processor 104 merges and/or associates sales data in the item data with items. For example, the item processor 104 may determine sales data for individual items and/or collections of items. As used herein, "collection of items" and a "set of items" are used interchangeably. Additionally or alternatively, the attribute analysis system 100 may dynamically query and/or determine related sales data for items and/or collections of items in response to user queries through the user interface.

In some embodiments, the item metadata may further indicate associations between items. For example, another property associated with an item may be a product and/or brand type. A brand type may refer to a collection of items within a particular brand. Continuing with the example, a line of cookies may be the "Acme" brand of cookies, and within the line there may be two or more items (each with a different UPC code and/or list of ingredients) associated with the "Acme" brand of cookies. Accordingly, the item processor 104 may determine associations between items using the item brand type metadata.

At block 312, the item processor 104 finalizes the one or more data sets. For example, the item processor 104 may compile a collection of attributes, mappings of items to one or more attributes, mappings of items to categories, and/or mappings of items and/or collections of items to sales data. In some embodiments, the item processor 104 may remove attributes from the data set based on: attributes that do not contain vowels, attributes that have fewer than four characters, and/or remove any attributes that are not in the determined set of valid words. In some embodiments, the item processor 104 stores the one or more data sets in the processed data storage 112.

Example Trending Attribute Analysis

Figure 4:
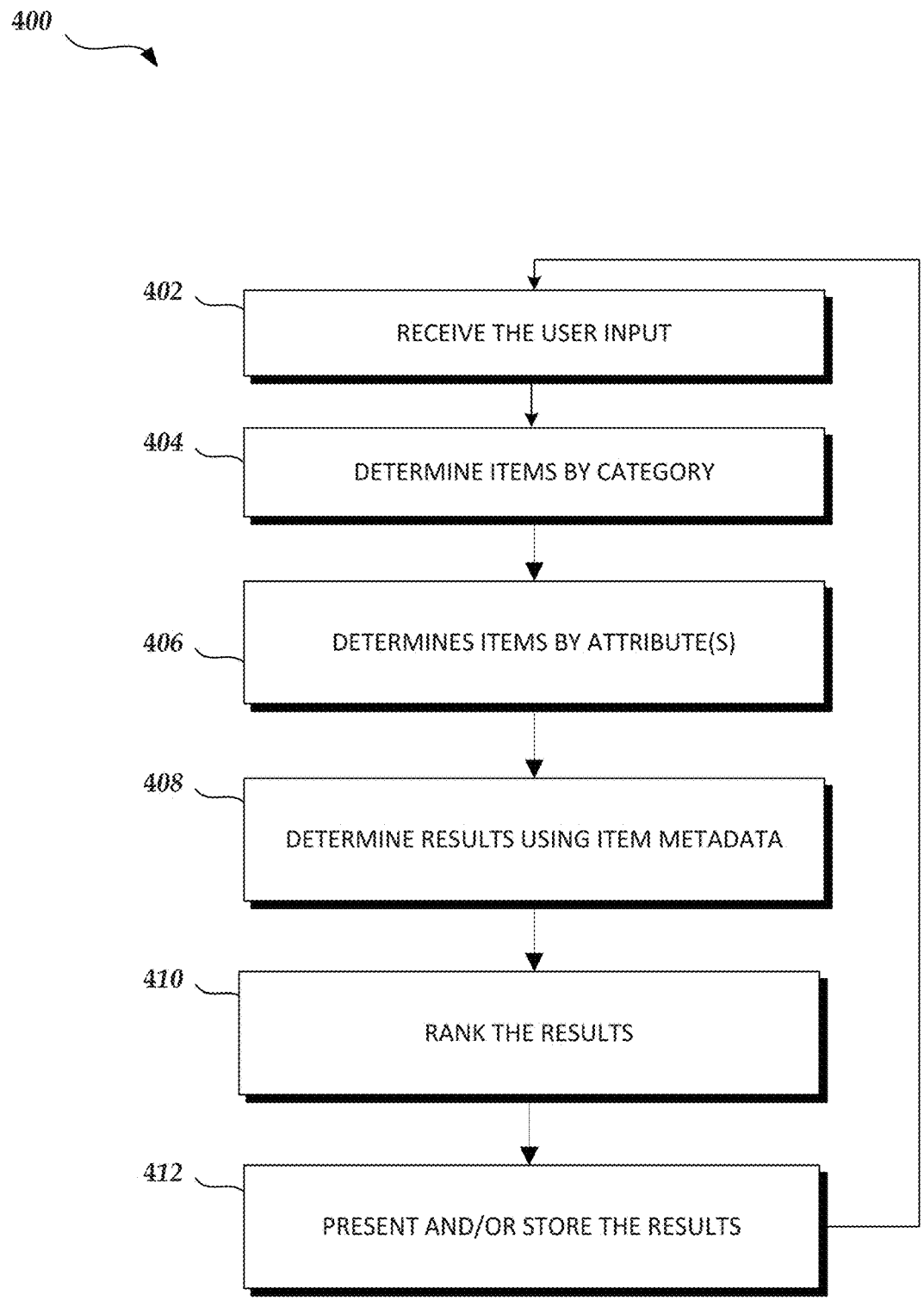
FIG. 4 is a flowchart illustrating an example trending attribute analysis process, according to some embodiments of the present disclosure.

FIG. 4 is a flowchart of an example method of determining trending attribute data, according to some embodiments of the present disclosure. Although the method 400 is described in conjunction with the systems of FIG. 1, any system configured to perform the method, in any order, is within the scope of this disclosure. The method 400 may be performed by the systems 100 and/or 120 of FIG. 1, such as the various components of the attribute analysis system 100 of FIG. 1 as discussed herein, including the user interface server 106 and/or the item analyzer 108. Depending on the embodiment, the method 400 may include fewer or additional blocks and/or the blocks may be performed in an order different than is illustrated. Further, the methods of FIGS. 2 and 4-7 may be similar, and the techniques and/or algorithms of one method or block of FIGS. 2 and 4-7 may be applied to another method or block of FIGS. 2 and 4-7. Aspects of the example method 400 may described in further detail herein with reference to FIGS. 10A-10I, 11A-11F, 12A-12H, and in particular with reference to FIGS. 9A-9J.

Beginning at block 402, the user interface server 106 receives user input via the user interface. For example, the user input may include categories, attribute types, one or more inclusion attributes, one or more exclusion attributes, filtering criteria, and/or any other parameter. Example user input is described in further detail herein with reference to FIGS. 9A-9J. In some embodiments, attributes may be further categorized based on type. Example attribute types include "flavor," "description," "packaging," "texture," "color," "ingredient," or any other category for an attribute. Accordingly, the attribute analysis system 100 may identify collections of items and/or particular items based on the respective selected attribute types. For example, if a user would like to search "flavor" attribute types, and the attribute analysis system 100 will not display a "crunchy" attribute.

At block 404, the item analyzer 108 may determine items by category. For example, the user input may specify one or more categories to query items in the processed data storage 112. In a food item example, if the user input includes a "candy" category, then the item analyzer 108 may determine a collection of items associated with the category "candy." The item analyzer 108 may then group collections of items by attribute, e.g., "crunchy," "bold," "berry," "noble," etc.

At block 406, the item analyzer 108 may determine items by one or more attributes. For example, the user input may specify one or more inclusion attributes to query items in the processed data storage 112 and/or to filter the collections of items determined at block 404. In a food item example, if the user input includes a "crunchy" attribute, then the item analyzer 108 may determine the items associated with the attribute "crunchy." In some embodiments, the item analyzer 108 may further filter the collection of items based on the user input. For example, where the user input includes the category "candy" and the attribute "crunchy," the items determined at block 404 may be further filtered based on the attribute "crunchy." In some embodiments, such chained filtering may result in improved query performance. Further, the processed data storage 112 may be indexed based on category, attribute, or other property types for improved performance.

In some embodiments, the item analyzer 108 may receive user input of two or more attributes and determine two or more sets of items associated with at least one of the two or more attributes. For example, if the user input includes attributes "crunchy" and "peanut_butter," then the item analyzer 108 may determine a set of items associated with the attribute "crunchy" and a set of items associated with the attribute "peanut_butter."

In some embodiments, the item analyzer 108 may exclude items from the one or more collections based on one or more exclusion attributes. For example, if the user input includes the exclusion attribute "dark_chocolate," then the item analyzer 108 excludes and/or removes items associated with the attribute "dark_chocolate" from the one or more collections.

At block 408, the item analyzer 108 determines results using the item metadata. For example, depending on the particular user input, the item analyzer 108 determines particular metadata values associated with the determined one or more collections items from blocks 404 and/or 406. Continuing with the food item example, the item analyzer 108 may determine annual sales data of for the one or more collections of items. The item analyzer 108 may then determine total sales data values for the one or more collections of items. As described herein, the item analyzer 108 may determine one or more summary indicators as specified by the user input, such as, for example, total dollar sales, growth rates, volume of sales, market share, sample size, and/or any other type of summary data associated with one or more items and/or corresponding item metadata. In some embodiments, the user input may cause filtering of the results. For example, the results may be filtered based on a minimum and/or maximum total dollar sales, number of results, minimum and/or maximum percentage change, and/or any other filtering criteria and/or filter parameter value. For example, the filter parameter value(s) may specify a ceiling, floor value, and/or range for a metadata value associated with a set of items. Accordingly, where there are multiple sets of items with associated metadata values, the filter parameter value may indicate those sets of items that are within, outside of, or at the filter parameter value that allows the item analyzer 108 to identify which of the sets of items to present in the user interface. In some embodiments, the filtering of the results by filtering parameters may occur after block 410 for improved performance. Various summary indicators, such as statistical indicators, and/or filtering of results, are described in further detail herein with reference to FIGS. 9A-9J, 10A-10I, 11A-11F, and 12A-12H.

At block 410, the item analyzer 108 may rank the results. For example, the item analyzer 108 may rank collections of items based on each of the collections respective summary indicators. In the example querying multiple attributes that results in multiple collections of items corresponding to those respective attributes (e.g., "crunchy" and "peanut_butter"), the item analyzer 108 may rank collections are of the highest summary indicator (e.g., items with the "crunchy" attribute have higher total sales than the total sales of items with the "peanut_butter" attribute). In some embodiments, the ranking of the collections of items may affect which of the collections of items are presented in the user interface and/or the order of the presentation of the collections of items at block 412. For example, where the number of collections fitting within the filtering parameters are above a threshold number of results, the item analyzer 108 may select a number of collections that best fit the filtering parameters that are below the threshold number of results. In some embodiments, the threshold number of results is configurable and/or may be selected by the user. Further, the filtering criteria in the user input may specify the particular ordering of the results ("dollar sales: ascending," "compound annual sales growth rate: descending," "compound annual sales growth rate: ascending," "last year growth rate: ascending," "last year growth rate: descending," etc.

At block 412, the item analyzer 108 and/or the user interface server 106 presents and/or stores the results. For example, the user interface server 106 may generate one or more visualizations corresponding to the determined result data. For example, graphs corresponding to the annual sales data of collections items with the same attribute may be presented in user interface. Accordingly, a user may obtain useful insights into item data based on trending attributes. The presentation of items and/or attribute visualizations are described in further detail herein with reference to FIGS. 9A-9J. Additionally or alternatively, the item analyzer 108 may store the determined results in the process data storage 112. Block 412 may be similar to block 212 of the method 200 of FIG. 2 regarding presenting and/or storing results.

Following block 412 (or any block of the method 400), the method 400 may return to block 402 to receive additional user input. For example, the user interface server 106 may receive multiple queries and corresponding user input in succession. In some embodiments, the user interface server 106 may present results based on a category selection, receive further user input including attribute selections, and then further update the presentation results based on the subsequent attribute selection user input. The successive processing of user input is described in further detail herein with reference to FIGS. 9A-9J, 10A-10I, 11A-11F, and 12A-12H.

Example Trending Multi-Attribute Analysis

Figure 5:
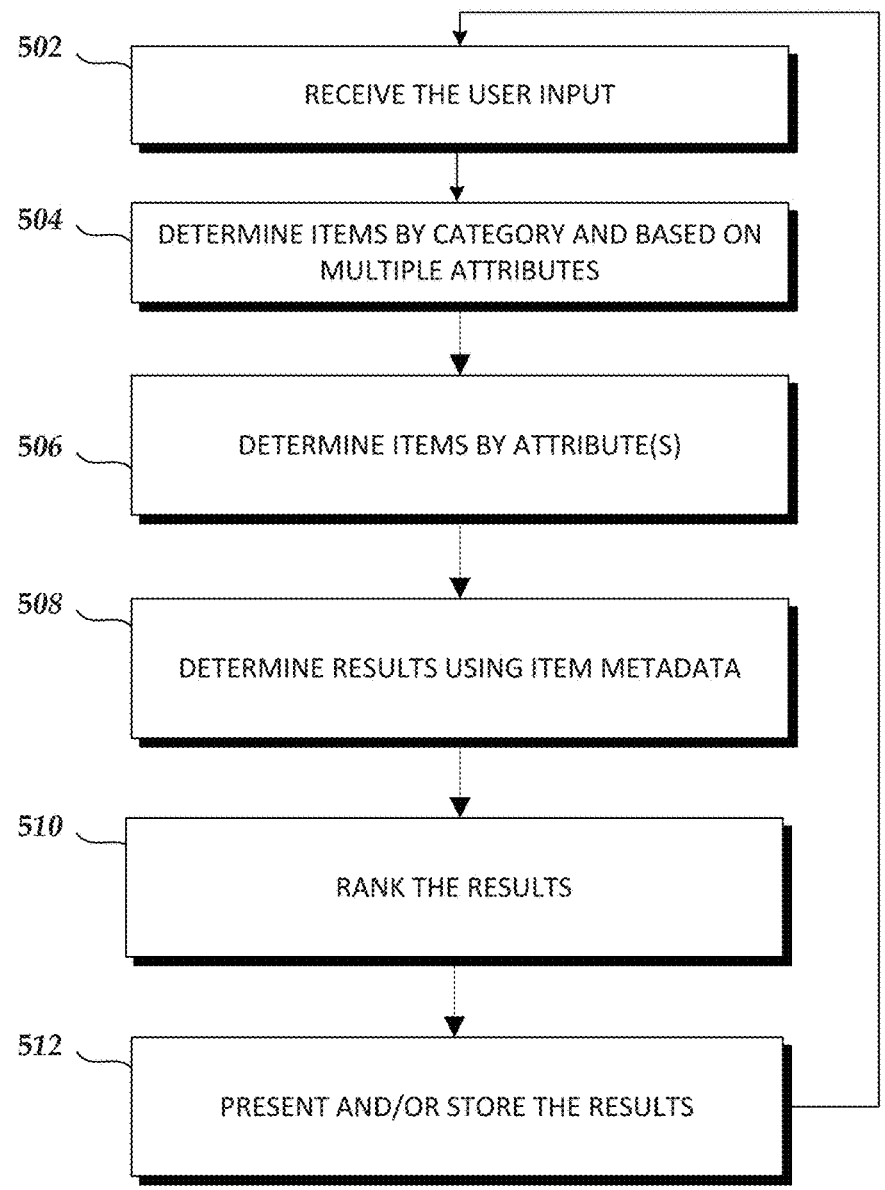
FIG. 5 is a flowchart illustrating an example multi-attribute analysis process, according to some embodiments of the present disclosure.

FIG. 5 is a flowchart of an example method of determining trending multi-attribute data, according to some embodiments of the present disclosure. Although the method 500 is described in conjunction with the systems of FIG. 1, any system configured to perform the method, in any order, is within the scope of this disclosure. The method 500 may be performed by the systems 100 and/or 120 of FIG. 1, such as the various components of the attribute analysis system 100 of FIG. 1 as discussed herein, including the user interface server 106 and/or the item analyzer 108. Depending on the embodiment, the method 500 may include fewer or additional blocks and/or the blocks may be performed in an order different than is illustrated. As used herein, "multi-attribute" refers to associations of two or more attributes, such as an item being associated with two or more distinct attributes. The terms "multi-attribute" and "multiple attribute groups" may be used interchangeably and/or synonymously in the present disclosure. While the present example of the method 500 typically discusses multi-attributes in the context of a pair (i.e., two) of attributes, it will be appreciated that the algorithms and techniques described with respect to the example method 500 may be applied to more than two attributes, such as combinations of three attributes, four attributes, five attributes, etc. Aspects of the example method 400 may described in further detail herein with reference to FIGS. 9A-9J, 11A-11F, 12A-12H, and in particular with reference to FIGS. 10A-10I.

Beginning at block 502, the user interface server 106 receives user input via the user interface. For example, the user input may include categories, attribute types, one or more inclusion attributes, one or more exclusion attributes, filtering criteria, and/or any other parameter. Example user input is described in further detail herein with reference to FIGS. 10A-10I. In some embodiments, block 502 may be similar to block 402 of the method 400 of FIG. 4.

At block 504, the item analyzer 108 may determine items by category and based on multiple attribute groups. For example, the user input may specify one or more categories to query items in the processed data storage 112. The item analyzer 108 may determine combinations of pairs of attributes in the same respective item associated with the category. In a food item example, if the user input includes a "candy" category, the corresponding pairs of attributes may correspond to ("crunchy" and "sugar"), ("chocolate" and "crunchy"), etc. An example algorithm for determining pairs of attributes for category may include: determining every combination of pairs of attributes, determining items associated with those pairs of attributes, and then filtering the determined items by the selected category. Another example algorithm for determining pairs of attributes for category may include: determining items associated with the selected category, and determining every combination of pairs of attributes based on the previously determined items. The item analyzer 108 may ultimately determine collections of items associated with a pair of attributes, where the same item may optionally be in two or more collection of items.

At block 506, the item analyzer 108 may further determine items by one or more attributes. For example, the user input may specify one or more attributes to query items in the processed data storage 112 and/or to filter the items determined at block 504. The item analyzer 108 may filter the collections of pairs of attributes by the user input indicating one or more selected attributes. In a food item example, the collections of attributes may correspond to ("crunchy" and "sugar"), ("chocolate" and "crunchy"), ("corn_syrup" and "covered"), and ("milk" and "corn_syrup"), and the selected attribute is "crunchy," then the item analyzer 108 may filter the collections of attributes that do not include "crunchy," and the remaining collections would include ("crunchy" and "sugar") and ("chocolate" and "crunchy"). In some embodiments, the item analyzer 108 may filter the collections of attributes based on one or more exclusion attributes. In one example, the collections of attributes may correspond to ("crunchy" and "candy"), ("chocolate" and "crunchy"), ("corn_syrup" and "covered"), and ("milk" and "corn_syrup"), and the selected exclusion attribute is "candy," then the item analyzer 108 may remove the collections of attributes that include "candy," and the remaining collections would include ("chocolate" and "crunchy"), ("corn_syrup" and "covered"), ("milk" and "corn_syrup").

At block 508, the item analyzer 108 determines results for the collections of items for multiple attribute groups using the item metadata. For example, depending on the particular user input, the item analyzer 108 determines particular metadata values associated with the determined collections of items from blocks 504 and/or 506. Block 508 may be similar to block 408 of the method 400 of FIG. 4 regarding determining results using the item metadata, such as determining one or more summary indicators, and/or filtering of the results.

At block 510, the item analyzer 108 may rank the results. For example, the item analyzer 108 may rank collections of items based on each of the collections respective summary indicators. For example, blocks 504 and/or 506 may determine the combinations of multiple attribute groups, which may result in dozens, hundreds, or even more distinct combinations of multiple attribute groups. In a food item example, the collections of attributes may include ("crunchy" and "sugar") and ("butter" and "spicy") with corresponding summary indicators of annual sales of $300 million and $1 million, respectively, then the item analyzer 108 may rank the ("butter" and "spicy") collection lower compared to the ("crunchy" and "sugar"). In some embodiments, the ranking of the collections of items may affect which of the collections of items are presented in the user interface and/or the order of the presentation of the collections of items at block 512. Accordingly, continuing with the previous example, the user interface server 106 may exclude the ("butter" and "spicy") collection from presentation at block 512. Additionally or alternatively, the various filtering criteria discussed herein may enable user to view collections of items within particular ranges (e.g., a user may select filter criteria to view collections of items within $1 million to $2 million in annual sales).

At block 512, the item analyzer 108 and/or the user interface server 106 presents and/or stores the results. Block 512 may be similar to block 412 of the method 400 of FIG. 4 and/or block 212 of the method 200 of FIG. 2 regarding presenting and/or storing results. In some embodiments, block 512 and/or the method 500 may be similar to block 412 and/or the method 400 by returning to block 502 to successively receive and/or process additional user input.

Example Trending Item Analysis

Figure 6:
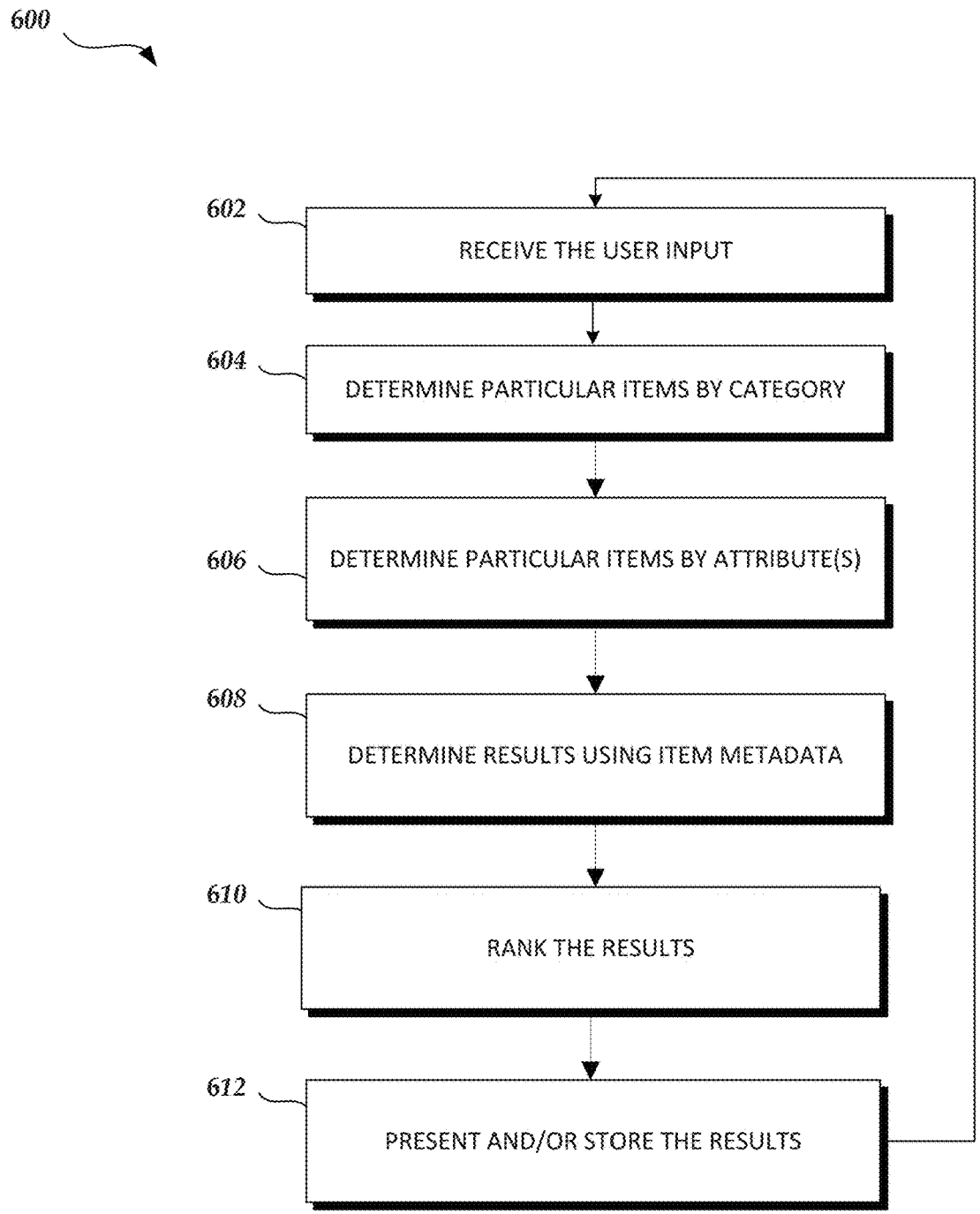
FIG. 6 is a flowchart illustrating an example item and/or product analysis process, according to some embodiments of the present disclosure.

FIG. 6 is a flowchart of an example method of determining trending item data, according to some embodiments of the present disclosure. Although the method 600 is described in conjunction with the systems of FIG. 1, any system configured to perform the method, in any order, is within the scope of this disclosure. The method 600 may be performed by the systems 100 and/or 120 of FIG. 1, such as the various components of the attribute analysis system 100 of FIG. 1 as discussed herein, including the user interface server 106 and/or the item analyzer 108. Depending on the embodiment, the method 600 may include fewer or additional blocks and/or the blocks may be performed in an order different than is illustrated. Aspects of the example method 600 may described in further detail herein with reference to FIGS. 9A-9J, 10A-10I, 12A-12H, and in particular with reference to FIGS. 11A-11F. Generally, the example method 600 may be advantageous because the method provides insights into the trending of particular items, products, and/or summary data regarding particular items and/or products that may be filtered by category and/or attribute. As used herein, "particular item" refers to a single item as opposed to collection of items that are grouped by a common attribute and/or category.

While the example method 600 is typically discussed with reference to particular items, the method 600 may additionally or alternatively apply to a "particular product." For example, the system 100 may determine and/or present data associated with a particular product, such as, a brand of pretzel or snack product, which includes two or more items. For example, the item analyzer 108 may determine that a particular attribute is associated with a particular product if at least one item of the particular product is associated with the particular attribute. In other embodiments, the item analyzer 108 may determine that a particular attribute is associated with a particular product if each item of a threshold number of items (or all of the items) of the particular product are all associated with the particular attribute. The example user interface 1100 of FIGS. 11A-11F may correspond to embodiments of determining trends with respect to products. Accordingly, aspects of the example method 600, in some embodiments, may be similar to method 700 of FIG. 7 in that both methods may determine trends associated with collections of items. For example, the algorithms discussed with respect to the method 700 of FIG. 7 for determining annual sales for a collection of items associated with same category may apply to the method 600 for determining annual sales for a collection of items associated with same product.

Beginning at block 602, the user interface server 106 receives user input via the user interface. For example, the user input may include categories, one or more attributes, one or more groups of synonymous attributes, filtering criteria, and/or any other parameter. Example user input is described in further detail herein with reference to FIGS. 11A-11F. In some embodiments, block 602 may be similar to block 402 of the method 400 of FIG. 4.

At block 604, the item analyzer 108 may determine particular items by category. For example, the user input may specify one or more categories to query items in the processed data storage 112. The item analyzer 108 may determine a collection of items associated with the one or more selected categories. In a food item example, if the user input includes a "salty snack" category, then the item analyzer 108 may determine a collection of items associated with the category "salty snack." Block 604 may contrast with block 404 of FIG. 4 in that block 604 determines individual items instead of grouping the items by attribute in some embodiments of the method 400 of FIG. 4.

At block 606, the item analyzer 108 may determine particular items by one or more attributes. For example, the user input may specify one or more attributes to query items in the processed data storage 112 and/or to filter the collection of items determined at block 404. In a food item example, if the user input includes a "corn_syrup" attribute, then the item analyzer 108 may determine the items and/or filter the collection of items based on an association with the attribute "corn_syrup." In some embodiments, the user input may include one or more groups of synonymous attributes. For example, the item analyzer 108 may use input of a group of synonymous attributes to treat two or more attributes as synonymous when the item analyzer 108 would treat them as otherwise. In the food item example, one group of synonymous attributes may include "pepper" and "spicy," and the item analyzer 108 identifies items that are associated with either "pepper" or "spicy" to add or filter the items in the collection. In some embodiments, the item analyzer 108 may treat two or more groups of synonymous attributes as a logical AND condition. For example, where there is a first group of synonymous attributes of ("pepper" and "spicy") and a second group of synonymous attributes of ("hard" and "crunchy"), the item analyzer may determine items that match at least one attribute from the first and second group of synonymous attributes. Example groups of synonymous attributes are described in further detail herein with reference to FIGS. 11A-11F.

At block 608, the item analyzer 108 determines results for particular items using the item metadata. For example, depending on the particular user input, the item analyzer 108 determines particular metadata values associated with each of the particular items of the collection of items from blocks 604 and/or 606. Block 608 may be similar to block 408 of the method 400 of FIG. 4 regarding determining results using the item metadata, such as determining one or more summary indicators, and/or filtering of the results.

At block 610, the item analyzer 108 may rank the results for the particular items. For example, the item analyzer 108 may rank particular items based on respective summary indicators for the particular items. For example, blocks 604 and/or 606 may determine the thousands of items. Accordingly, the item analyzer 108 may rank the collection of items to select a subset of the items for presentation and/or data analysis purposes. For example, the ranking of the particular items may affect which of the collections of items are presented in the user interface and/or the order of the presentation of the collections of items at block 612. Additionally or alternatively, the various filtering criteria discussed herein may enable user to view particular items within particular ranges (e.g., a user may select filter criteria to view particular items within $1 million to $2 million in annual sales).

At block 612, the item analyzer 108 and/or the user interface server 106 presents and/or stores the results for particular items. Block 612 may be similar to block 412 of the method 400 of FIG. 4 and/or block 212 of the method 200 of FIG. 2 regarding presenting and/or storing results. A difference between block 612 and other blocks of methods discussed herein may be that block 612 presents results for particular items (see FIG. 11B that illustrates results for individual items) as opposed to results for collections of items that are grouped by category and/or attribute. In some embodiments, block 612 and/or the method 600 may be similar to block 612 and/or the method 600 by returning to block 602 to successively receive and/or process additional user input.

Example Trending Item Category Analysis

Figure 7:
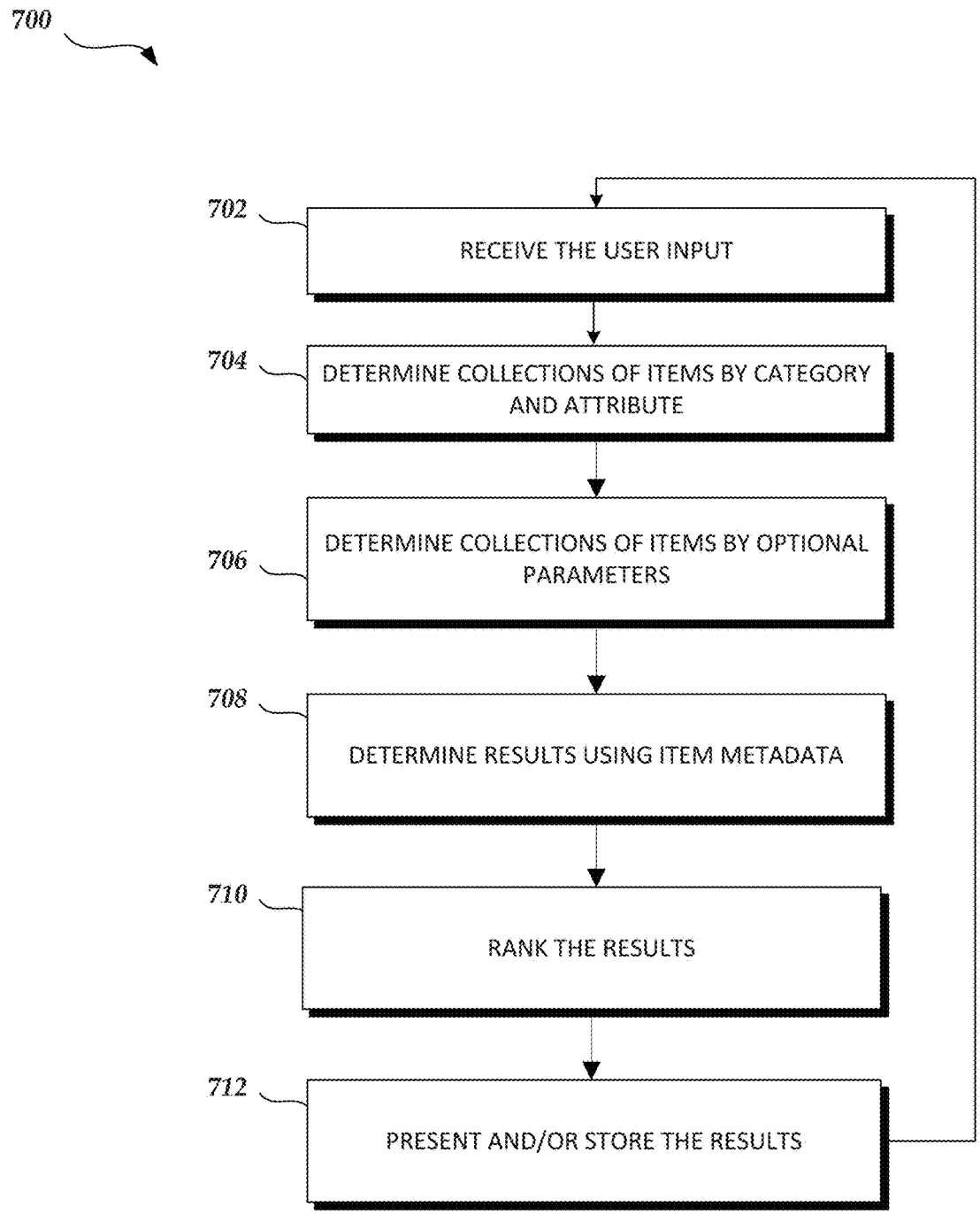
FIG. 7 is a flowchart illustrating an example item category analysis process, according to some embodiments of the present disclosure.

FIG. 7 is a flowchart of an example method of determining trending item category data, according to some embodiments of the present disclosure. Although the method 700 is described in conjunction with the systems of FIG. 1, any system configured to perform the method, in any order, is within the scope of this disclosure. The method 700 may be performed by the systems 100 and/or 120 of FIG. 1, such as the various components of the attribute analysis system 100 of FIG. 1 as discussed herein, including the user interface server 106 and/or the item analyzer 108. Depending on the embodiment, the method 700 may include fewer or additional blocks and/or the blocks may be performed in an order different than is illustrated. Aspects of the example method 700 may described in further detail herein with reference to FIGS. 9A-9J, 10A-10I, 11A-11F, and in particular with reference to FIGS. 12A-12H. Generally, the example method 700 may be advantageous because the method provides insights into the trending of collections of items and/or summary data regarding particular items that may be grouped by category.

Beginning at block 702, the user interface server 106 receives user input via the user interface. For example, the user input may include one or more inclusion attributes, one or more groups of synonymous attributes, one or more categories, one or more exclusion attributes, filtering criteria, and/or any other parameter. Example user input is described in further detail herein with reference to FIGS. 12A-12H. In some embodiments, block 702 may be similar to block 402 of the method 400 of FIG. 4 and/or block 602 of the method 600 of FIG. 6.

At block 704, the item analyzer 108 may determine collections of items by one or more attributes and the categories of the items. For example, the user input may specify one or more inclusion attributes to query items in the processed data storage 112. In a food item example, if the user input includes a "pepper" attribute, then the item analyzer 108 may determine the items associated with the attribute "pepper." The item analyzer 108 may group the determine items into collections based on the one or more categories of each item. Block 704 may contrast with block 404 of FIG. 4 in that block 704 determines collections of items grouped by category instead of grouping the items by attribute in some embodiments of the method 400 of FIG. 4.

At block 706, the item analyzer 108 may further filter the collections of items based on the user input that can include one or more optional parameters. Example optional parameters can include one or more groups of synonymous attributes, one or more categories, one or more exclusion attributes, filtering criteria, and/or any other parameter. For example, where the user input includes the attribute "crunchy" and the optional category "candy," the items determined at block 704 may be further filtered based on the category "candy." An example filtering criteria includes manufacturer, which may refer to a company or producer of the item, such as, "Acme Corp.," etc. In some embodiments, such chained filtering may result in improved query performance. In some embodiments, block 706 may be similar to block 606 of the method 600 of FIG. 6 with respect to filtering and, in particular, using groups of synonymous attributes for filtering. In some embodiments, block 706 may be similar to block 406 of the method 400 of FIG. 4 with respect to filtering and, in particular, using one or more exclusion attributes for filtering.

In some embodiments, the item analyzer 108 may further group the collections of items by item metadata. For example, in addition to grouping items by categories and/or other parameters, the item analyzer 108 may further group the collections based at least on brand and/or other hierarchical metadata. For example, the item analyzer 108 may determine the count of brands within the collection grouped by category. Continuing with the example, a collection of items for "salty snacks" may include 450 items, and within that collection there may be 200 distinct brands corresponding to those 450 items. Again using the same example, two or more items may correspond to the same brand, such as "Acme's cookies."

At block 708, the item analyzer 108 determines results for the collections of items grouped by category using the item metadata. For example, depending on the particular user input, the item analyzer 108 determines particular metadata values associated with the determined collections of items from blocks 704 and/or 706. Block 708 may be similar to block 408 of the method 400 of FIG. 4 regarding determining results using the item metadata, such as determining one or more summary indicators, and/or filtering of the results.

At block 710, the item analyzer 108 may rank the results. For example, the item analyzer 108 may rank collections of items based on each of the collections respective summary indicators. In some embodiments, the ranking of the collections of items may affect which of the collections of items are presented in the user interface and/or the order of the presentation of the collections of items at block 712. In some embodiments, block 710 may be similar to block 410 of the method 400 of FIG. 4 with respect to ranking of the results and/or the use of the determine rankings.

At block 712, the item analyzer 108 and/or the user interface server 106 presents and/or stores the results for collections of items grouped by category. Block 712 may be similar to block 412 of the method 400 of FIG. 4 and/or block 212 of the method 200 of FIG. 2 regarding presenting and/or storing results. A difference between block 712 and other blocks of methods discussed herein may be that block 712 presents results for collections of items grouped by category (see FIG. 12B for an example) as opposed to results for collections of items that are grouped by attribute or for individual items. In some embodiments, block 612 and/or the method 600 may be similar to block 612 and/or the method 600 by returning to block 602 to successively receive and/or process additional user input.

Example Item Data, Item Metadata, and Attributes

Figure 8:
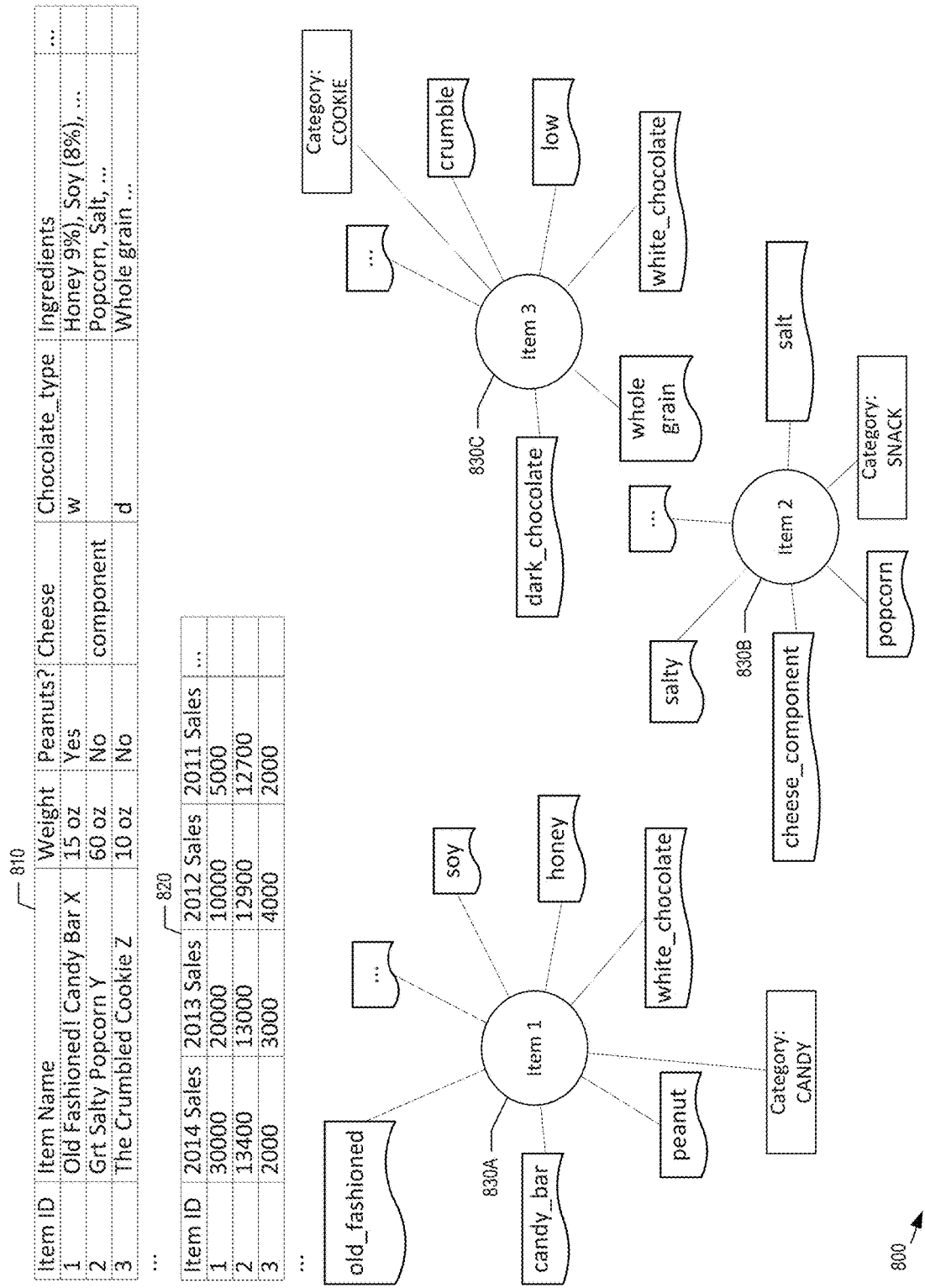
FIG. 8 illustrates example item data, item metadata, and attributes that may be processed and/or generated by the attribute analysis system, according to some embodiments of the present disclosure.

FIG. 8 illustrates example item data, item metadata, and attributes that may be processed and/or generated by the attribute analysis system 100, according to some embodiments of the present disclosure. Data environment 800 includes item data 810, item metadata 820, and item data objects 803A-803C. The example item data 810 may be from the item data storage 134. In some embodiments, the item data 810 corresponds to reference data, such as Nielsen Product Reference Data. As illustrated, the example item data 810 may include one or more columns and corresponding column values. In some embodiments, the item data 810 includes hundreds of columns. The example item metadata 820 may be from the item metadata storage 132. The example item metadata 820 includes sales data for or more items.

As discussed herein, the attribute analysis system 100 may process the item data and the item metadata to generate the items 803A-803C. As illustrated, the items 803A-803C are associated with one or more attributes and a category. For example, the example method 300 of FIG. 3 may process the item data 810 and the item metadata 820, such as removing invalid words (e.g., "Grt"), cleansing the item data 810, expanding binary columns, expanding abbreviations, removing numbers and/or punctuation, removing prepositions, identifying multi-word attributes, identifying synonyms, and/or combining the item data and the item metadata.

Example User Interfaces

FIGS. 9A-9J, 10A-10I, 11A-11F, and 12A-12H illustrate example user interfaces of the attribute analysis system 100, according to some embodiments of the present disclosure. In various embodiments, aspects of the user interfaces may be rearranged from what is shown and described below, and/or particular aspects may or may not be included. However, the embodiments described below in reference to FIGS. 9A-9J, 10A-10I, 11A-11F, and 12A-12H provide example user interfaces of the attribute analysis system 100. The user interfaces of FIGS. 9A-9J, 10A-10I, 11A-11F, and 12A-12H, such as, user interfaces 900, 1000, 1100, and 1200, respectively, may have similar elements and/or capabilities.

FIGS. 9A-9J illustrate example user interface 900 of the attribute analysis system 100 that enables a user to query a database of items based on attributes, categories, and/or other parameters. Functional aspects of example user interface 900 may correspond to the method 200 of FIG. 2 and/or the method 400 of FIG. 4.

Figure 9A:
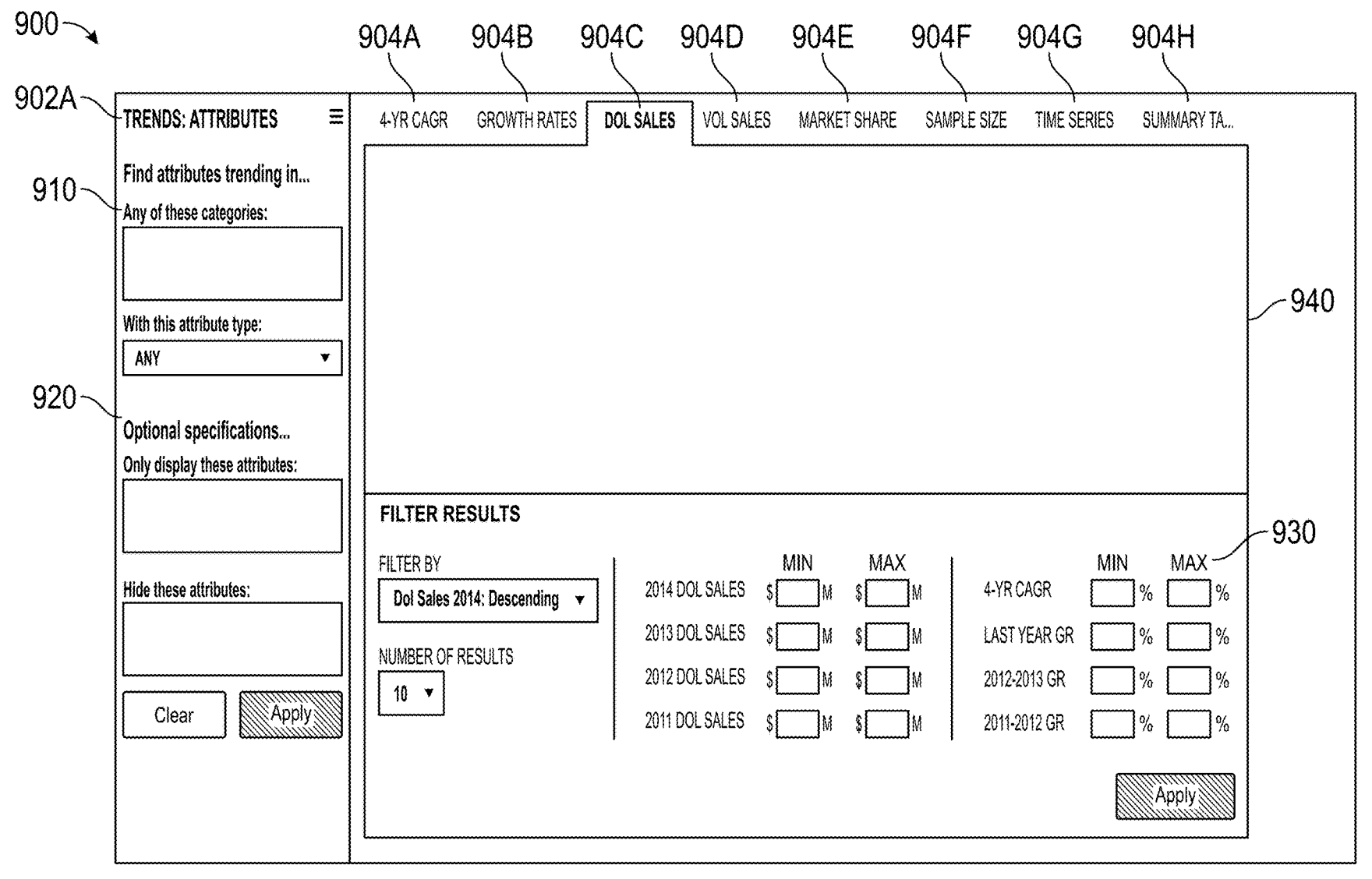

In FIG. 9A, user interface 900 includes a user interface selector 902A, which allows a user to navigate between various user interfaces. User interface 900 includes a primary input area 910, a secondary input area 920, a filter parameter area 930, and a results area 940. The results area 940 includes tabs 904A-904H: compound annual growth rate ("CAGR") tab 904A, growth rates tab 904B, dollar sales tab 904C, volume sales tab 904D, market share tab 904E, sample size tab 904F, time series tab 904G, and summary table tab 904H. The tabs 904A-904H enable user to select various user interfaces that cause the attribute analysis system 100 to determine results corresponding to the particular visualizations of the selected user interface. Tabs 904A-904H may be similar to the tabs described in FIGS. 10A-10I, 11A-11F, and 12A-12H. The filter parameter area 930 may enable user to filter results by minimum and/or maximum sales, minimum and/or maximum CAGR percentages, minimum and/or maximum for last year's growth rate percentages, and/or minimum and/or maximum growth rate percentages for particular years.

Figure 9B:
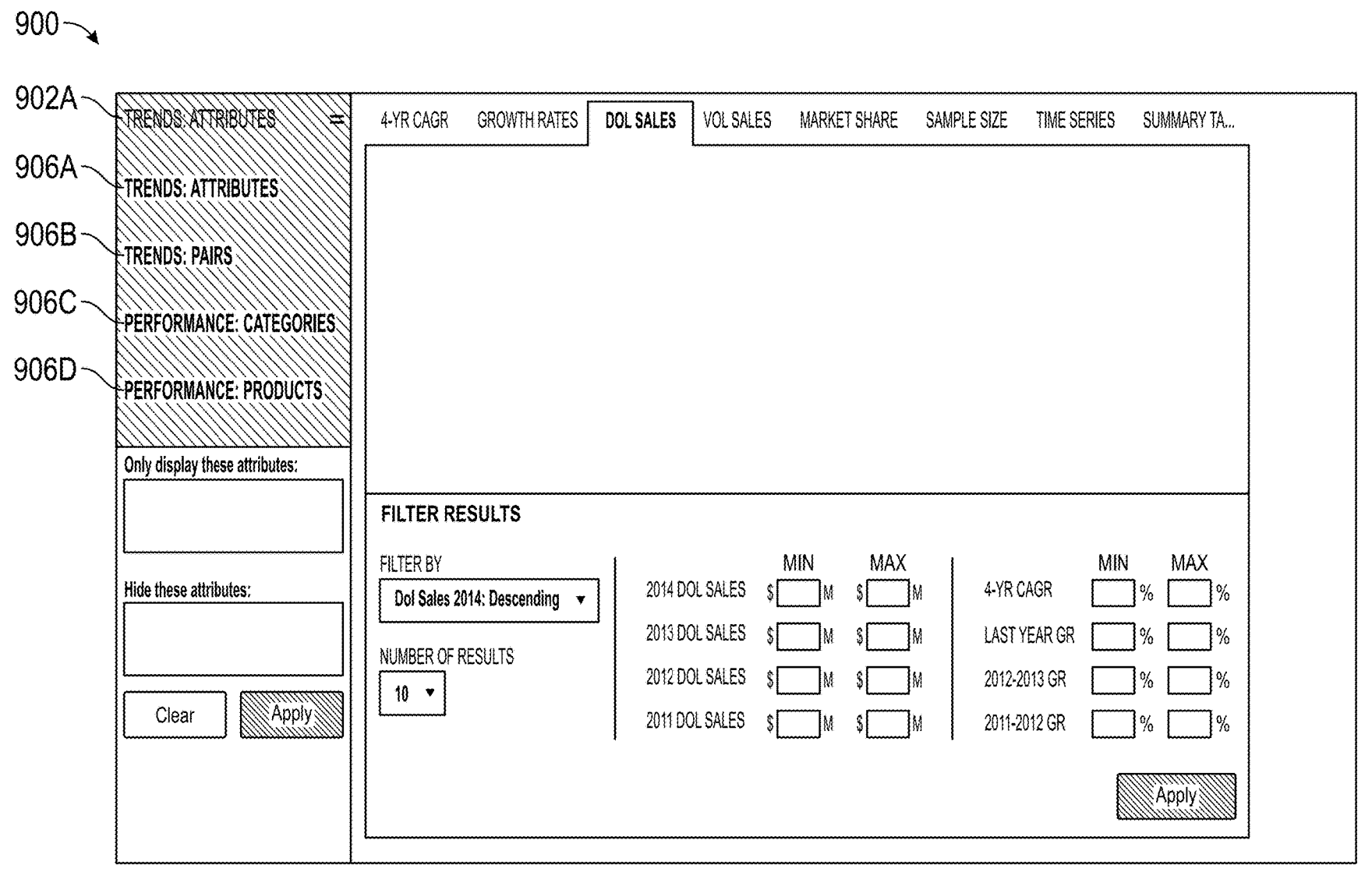

FIG. 9B illustrates the user interface selector 902A that enables a user to transition between the user interfaces corresponding to "Trends: Attributes" 906A, "Trends: Pairs" 906B, "Performance: Categories" 906C, and "Performance: Products" 906D.

Figure 9C:
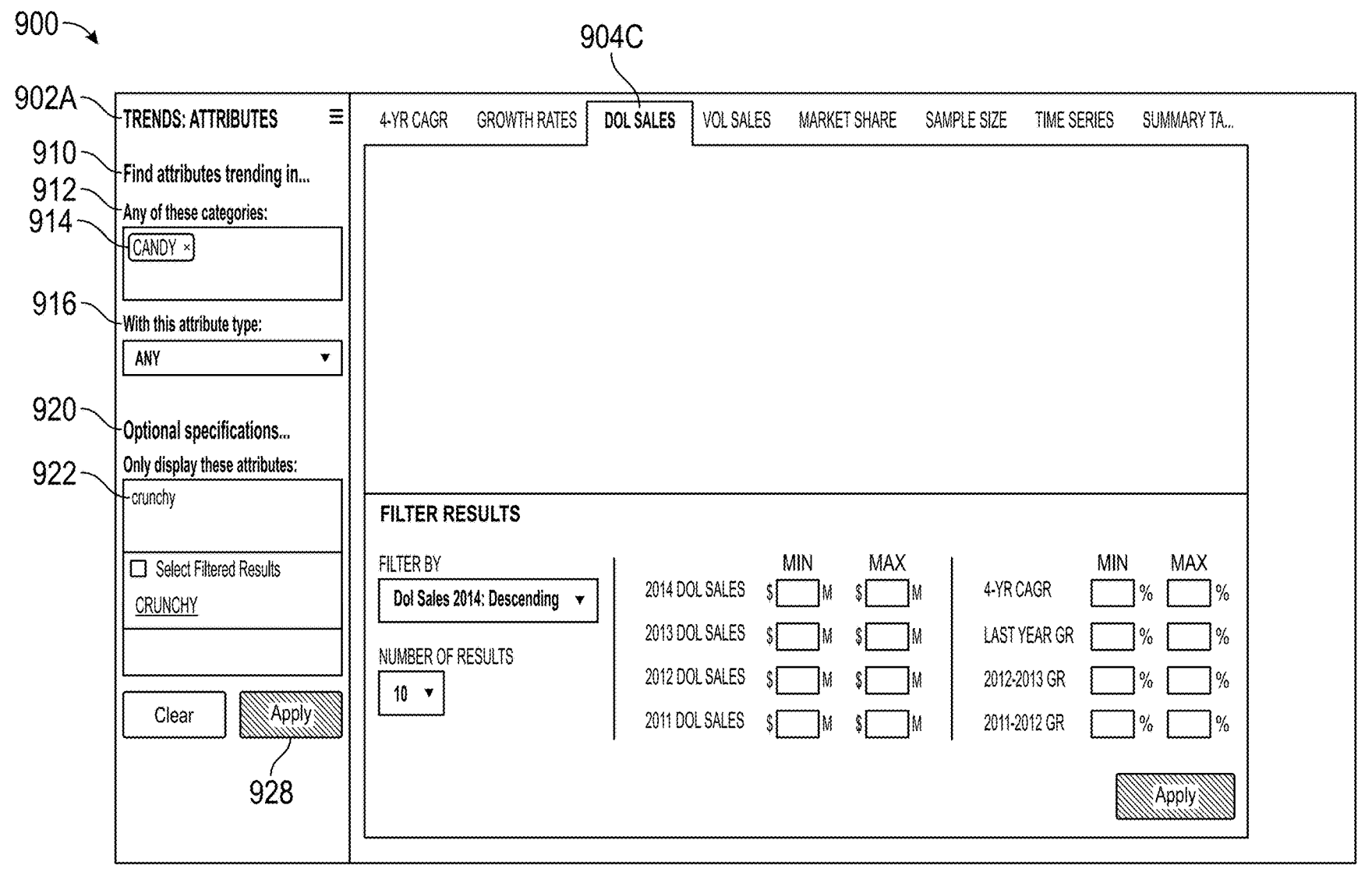

FIG. 9C illustrates the user input within the primary input area 910 and the secondary input area 920. For example, an input category area 912 may receive the data input 914, which illustrates the dynamic searching of attributes. In some embodiments, one or more of the input elements may dynamically present input options based on complete and/or partial text matching of input (i.e., autocomplete). The attribute type selector 916 may receive user input corresponding to attribute types. The secondary input area 920 may receive input attribute 922. A user may cause the attribute analysis system 100 present results within the tab 904C by selecting the execute element 928.

Figure 9D:
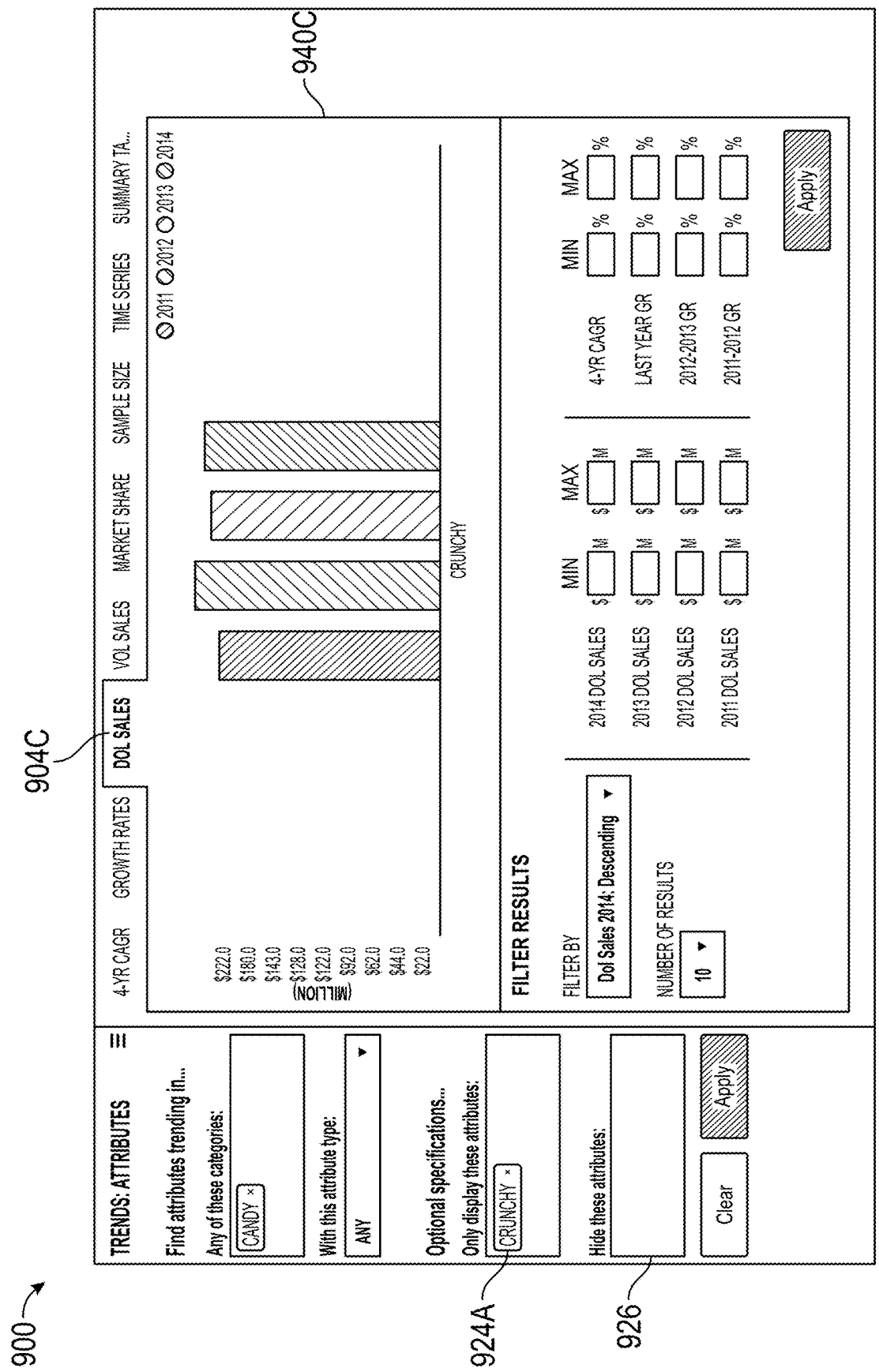

FIG. 9D illustrates the user interface 900 with a visualization within results area 940C. For example, the user interface 900 of FIG. 9D may be a result of a user selecting the execute element 982 of the user interface of FIG. 9C. As illustrated, the visualization, in a graph format, is shown in results area 940C based on the input category "candy" and the input attribute "crunchy" 924A. As illustrated, the graph presents annual dollar sales of a collection of items matching the input parameters that are grouped by the one or more input attributes.

Figure 9E:
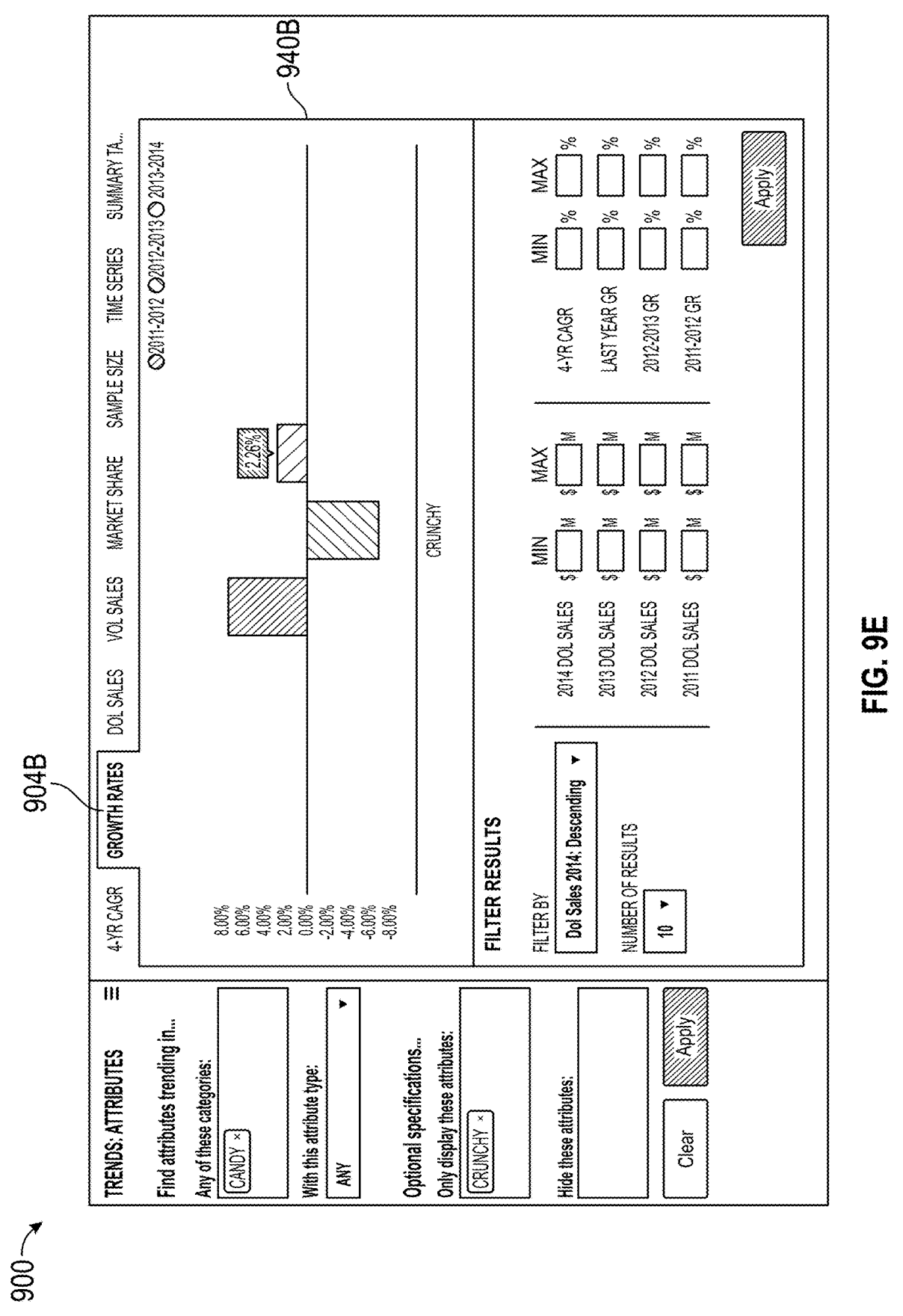

FIG. 9E illustrates user interface 900 with another visualization within results area 940B. As illustrated, the results area 940B corresponds to the growth rates tab 904B.

Figure 9F:
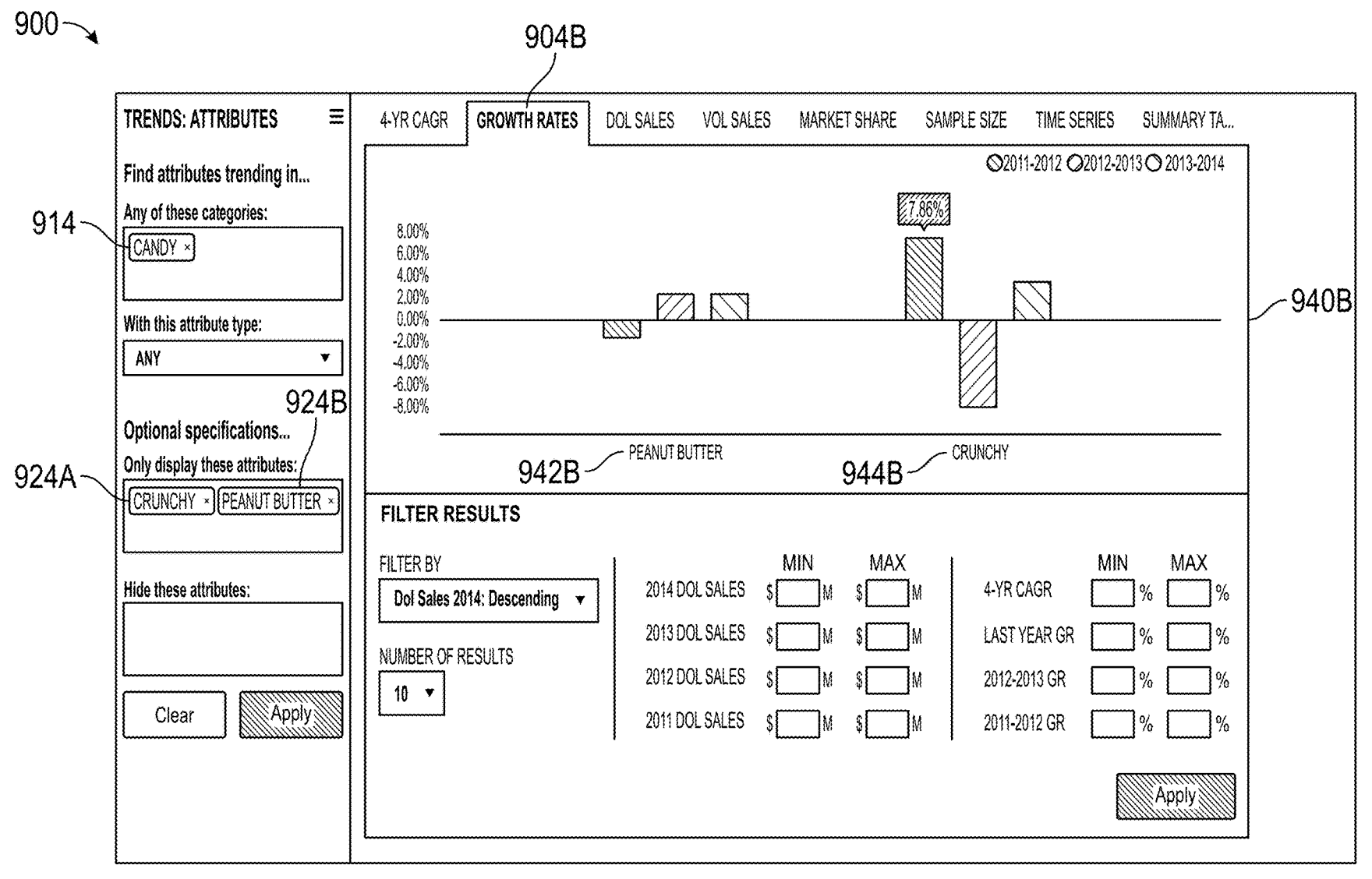

FIG. 9F illustrates user interface 900 with an updated visualization within results area 940B based on additional input parameters. As illustrated, user interface 900 includes attribute inputs including the attribute "crunchy" 924A in the attribute "peanut_butter" 924B. Accordingly, results area 940B presents to graph visualizations including first graphs 924B and second graphs 944B, correspond to the attribute "peanut butter" 924B and the attribute "crunchy" 924A, respectively.

Figure 9G:
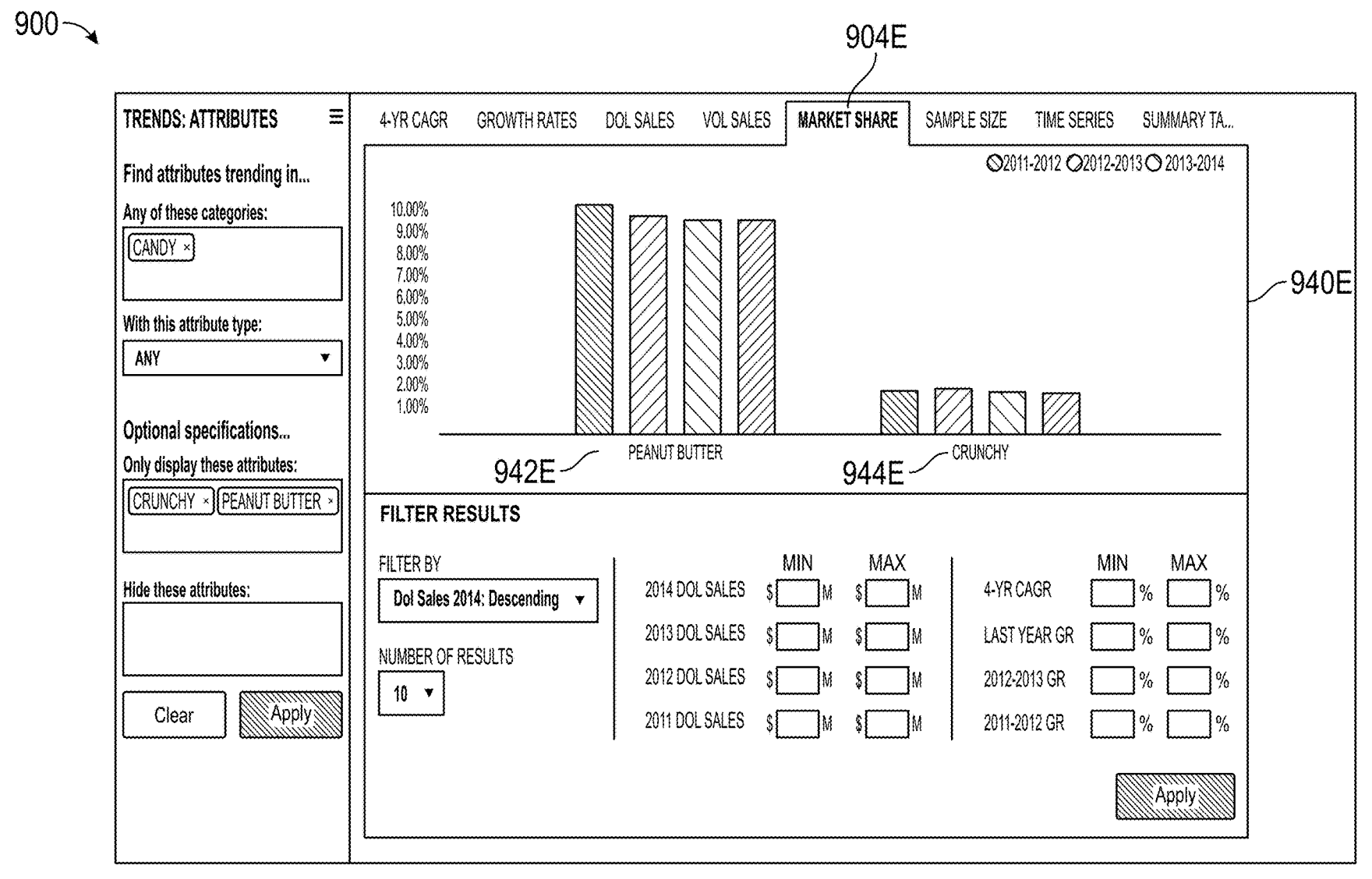

FIGS. 9G, 9H, 9I, and 9J illustrate various graph visualizations corresponding to different tabs of the user interface 900. For example, FIG. 9G illustrates the market share tab 904E with corresponding results area 940E, which includes market share graph visualizations 942E and 944E that correspond to the selected attributes. FIG. 9H illustrates the sample size tab 904F with corresponding results area 940F, which includes sample size graph visualizations 942E and 944E that correspond to the selected attributes. As used herein, "sample size" may refer to the number of items in a collection (e.g. graph 942E illustrates the number of items that contain the "peanut_butter" attribute within the determined collection).

Figure 9I:
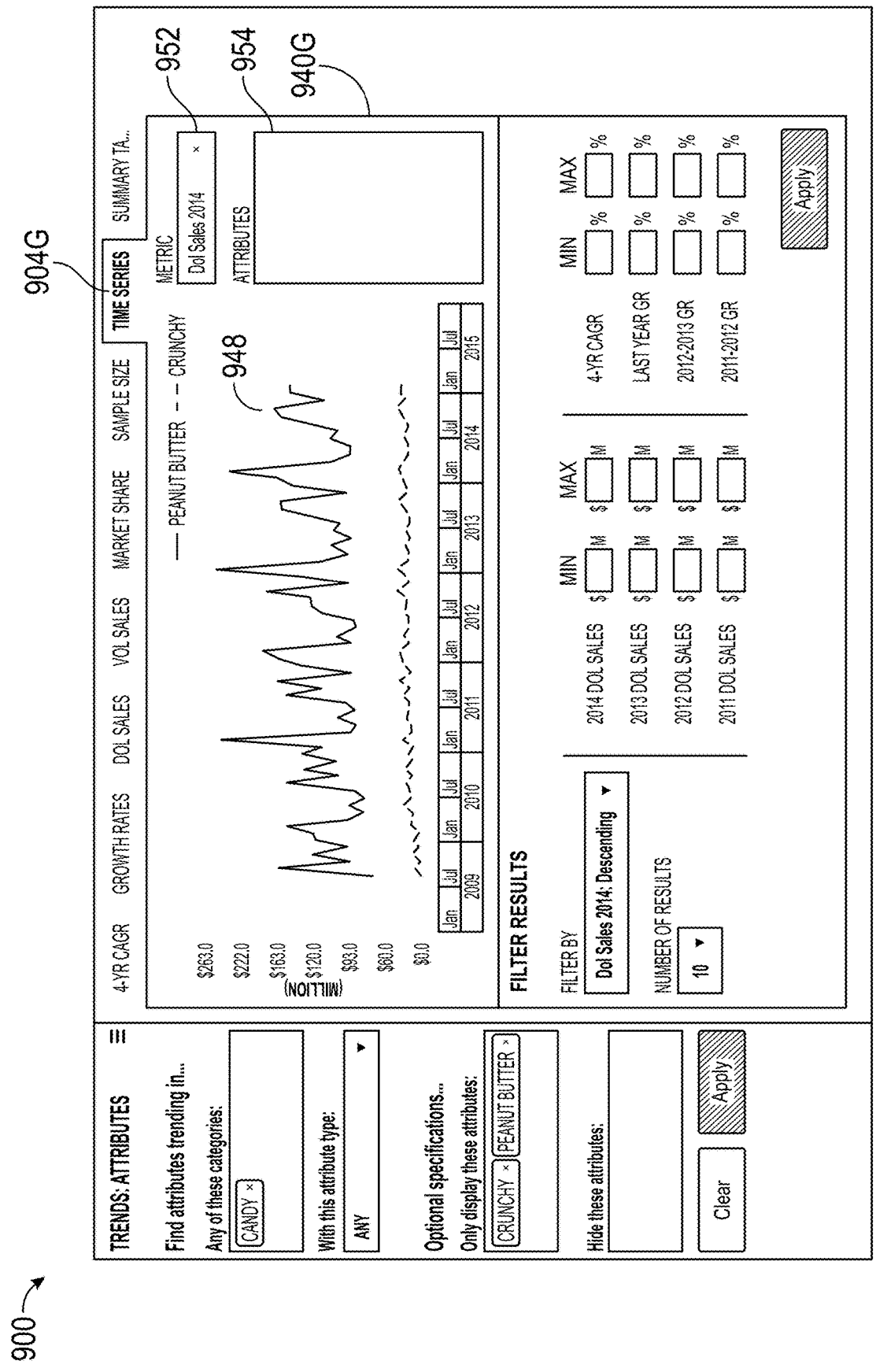

FIG. 9I illustrates the time series tab 904G. For example, the user interface 900 includes results area 940G that presents time series visualizations 948. The results area 940G includes further filters, such as metric filter 952 and an attribute filter 954.

FIG. 9J illustrates the summary table tab 904H. For example, the user interface 900 includes results area 940H that presents a summary table visualization 956. The results area 940G includes an export element 946 that causes the summary table 956 to be exported to a spreadsheet and/or delimited format. The summary table 956 includes summary data that may correspond to data in the CAGR tab 904A, growth rates tab 904B, dollar sales tab 904C, volume sales tab 904D, market share tab 904E, and/or the sample size tab 904F.

FIGS. 10A-10I illustrate example user interface 1000 of the attribute analysis system 100 that enables a user to query a database of items based on multi-attributes, and categories and/or other parameters. Functional aspects of example user interface 1000 may correspond to the method 200 of FIG. 2 and/or the method 500 of FIG. 5.

Figure 10A:
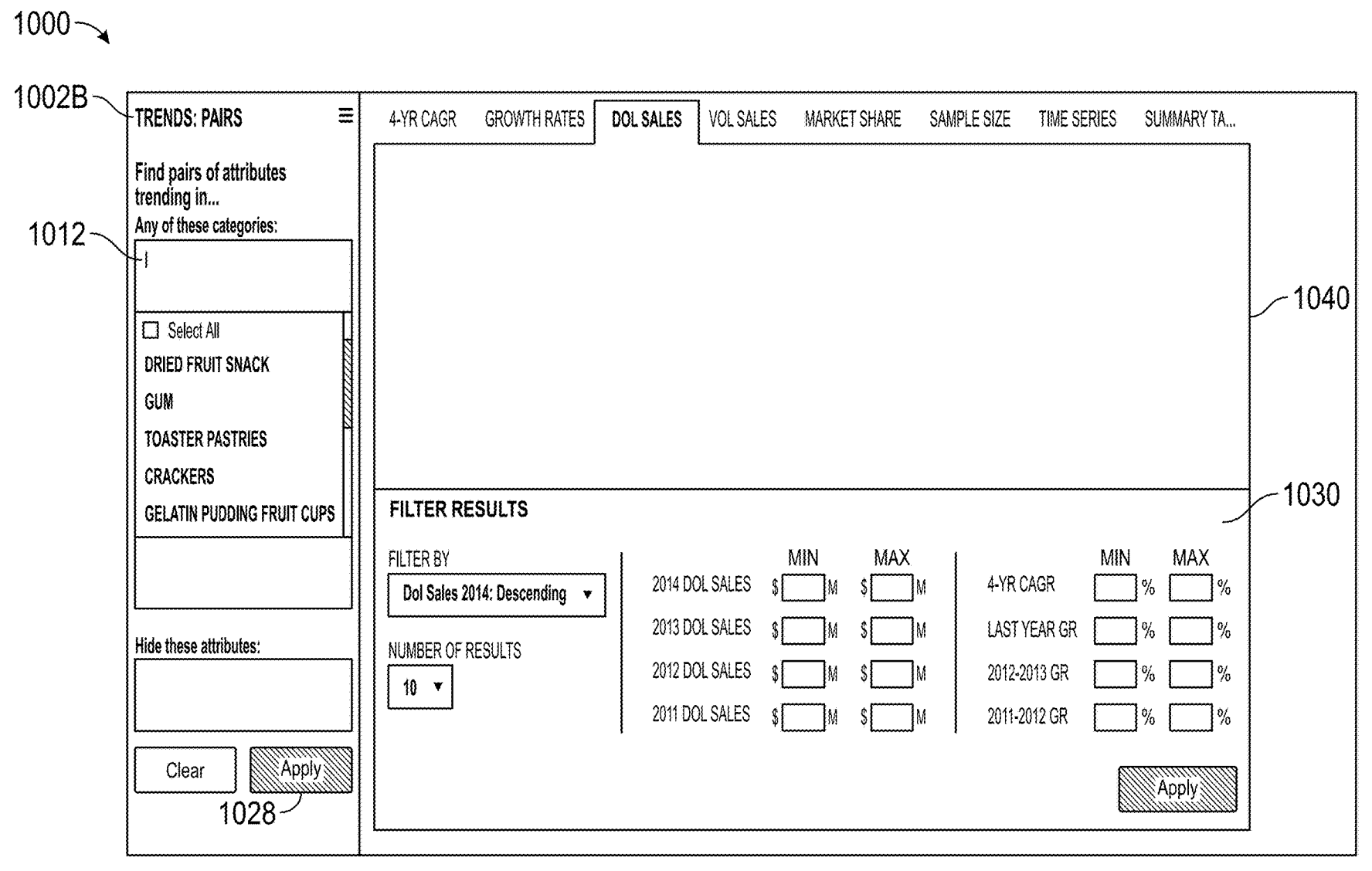

In FIG. 10A, the user interface 1000 indicates that the "Trends: Pairs" user interface 1002B was selected. Example user interface 100 includes filter parameter area 1030 and results area 1040. As illustrated, the input category element 1012 may receive input regarding the selection of one or more item categories.

Figure 10B:
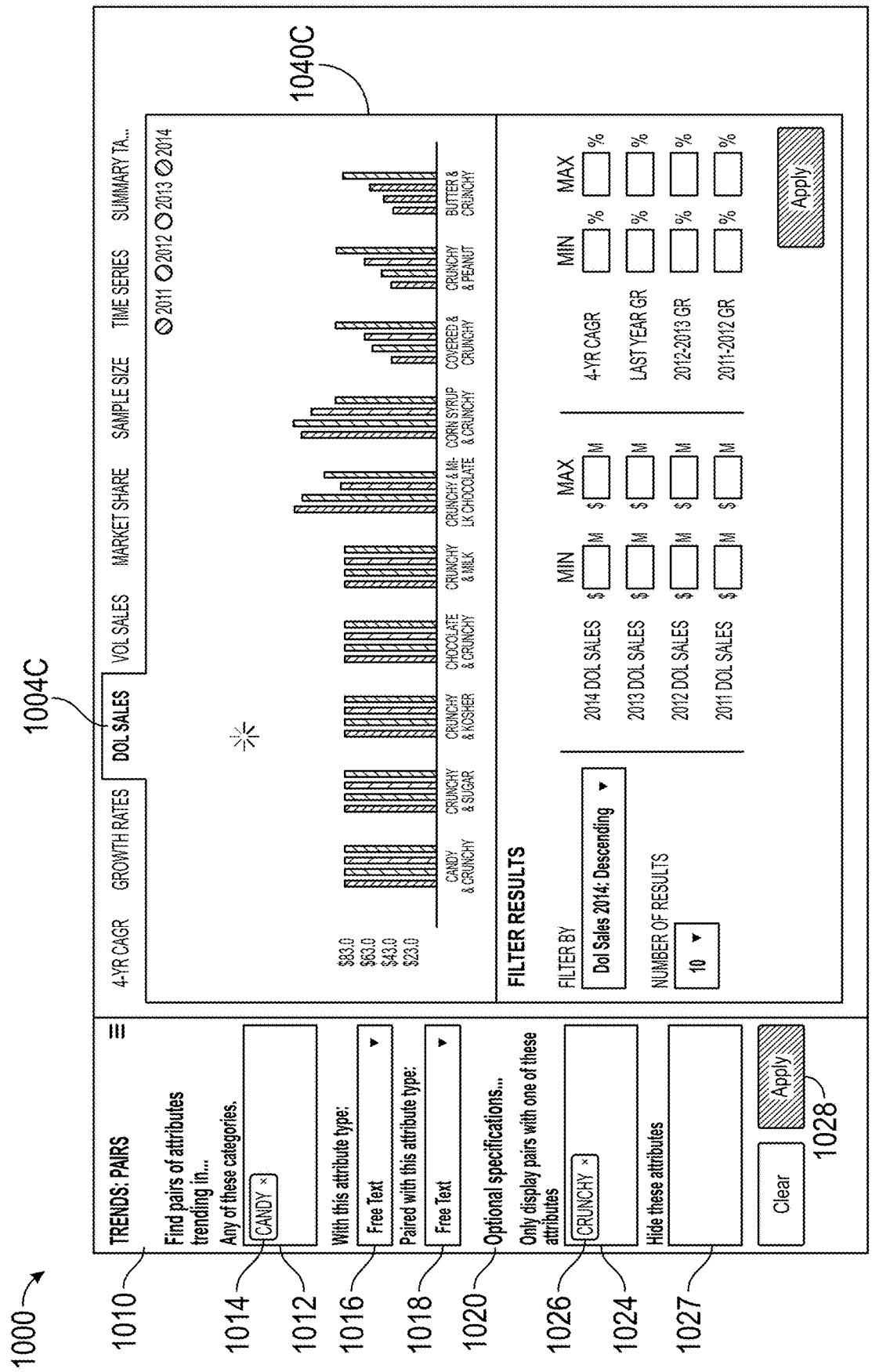

In FIG. 10B, the user interface 1000 indicates that the results area 1040C has been populated based on the user input and the selection of the dollar sales tab 1004C. For example, the user interface 1000 includes primary input area 1010 and secondary input area 1020. Continuing with the example, the category input element 1012 has received the input category "candy" 1014. The primary input area 1010 includes a first attribute type selector 1016 and a second attribute type selector 1018. The secondary input area 1020 includes an attribute inclusion input element 1024 and an attribute exclusion input element 1027. As illustrated, user selection of execution element 1028 causes the results area 1040C to dynamically update.

Figure 10C:
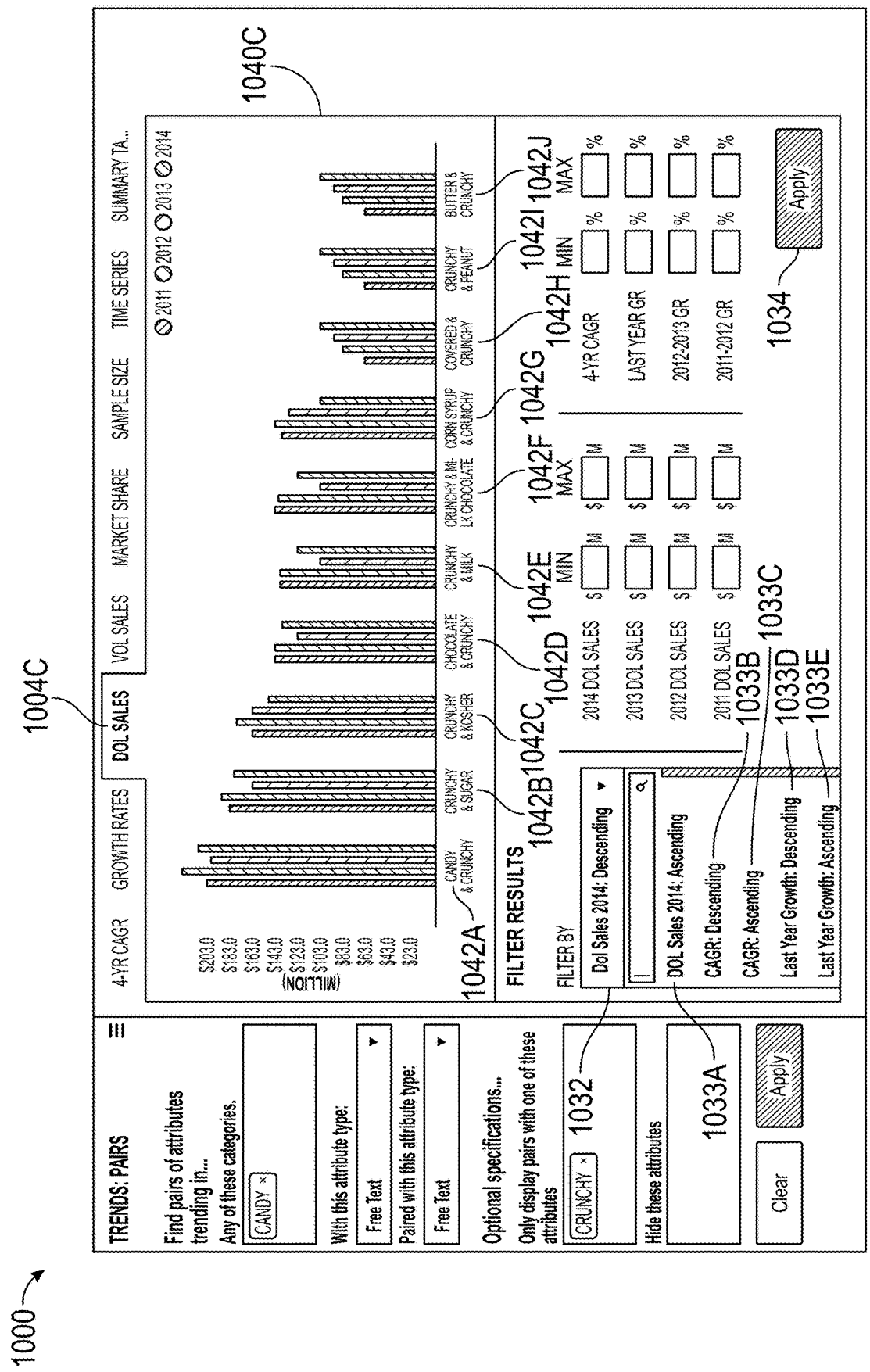
Figure 10D:
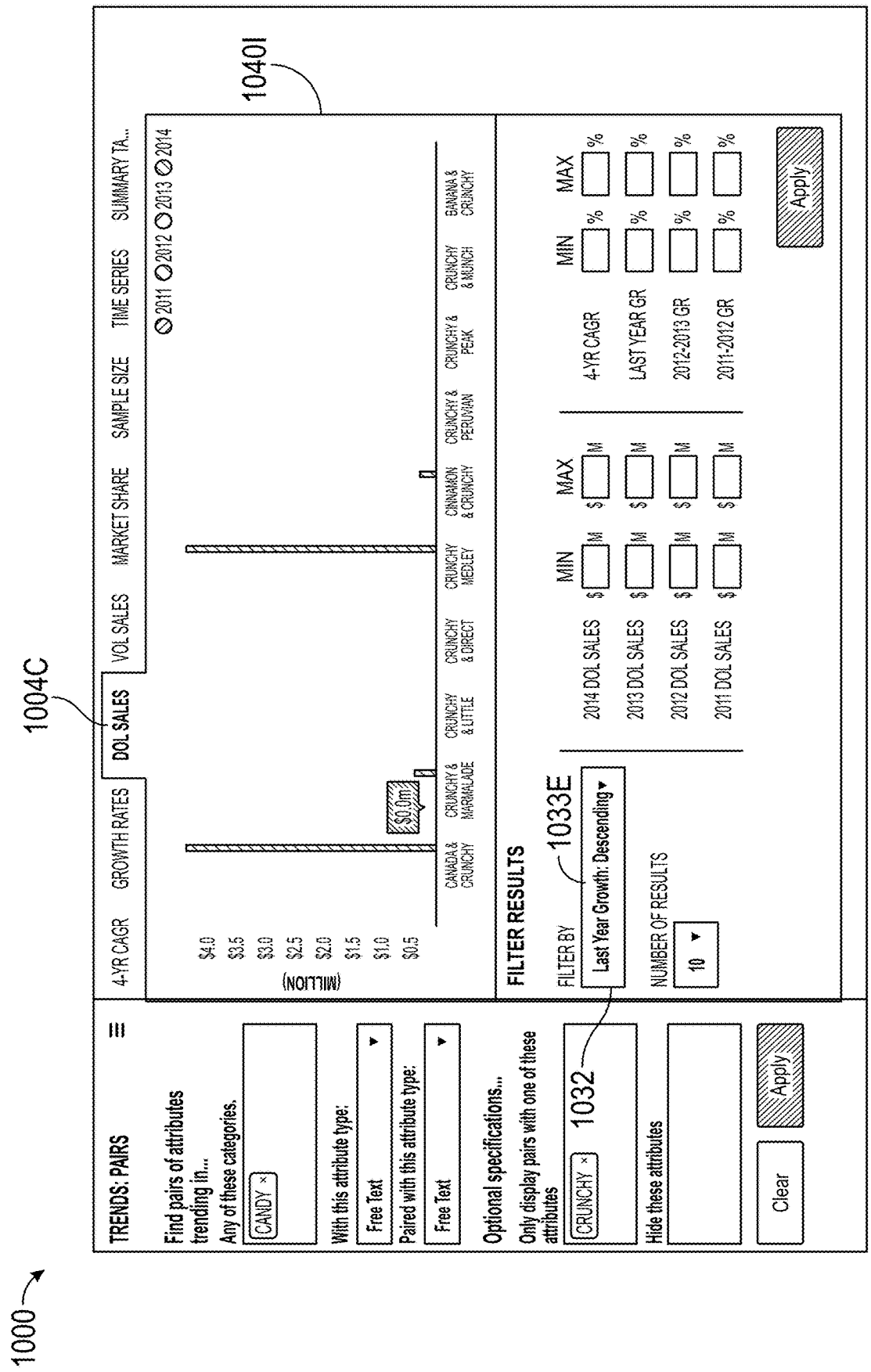

FIG. 10C illustrates a populated results area 1040C. For example, the results area 1040C includes graphs 1042A-1042J. As illustrated, graphs 1042A-1042J correspond to the top results of multi-attributes (in this case paired attributes with the attribute "crunchy"). The user interface 1000 also includes a filter results input area 1032 that enables a user to sort and/or filter the results area 1040C by filter options 1033A-1033E. For example, user selection of filter results input area 1032 and the filter execution element 1034 may cause the results area 1040C to dynamically update and sort the results differently and or cause different multi-attributes presented as discussed herein. For example, FIG. 10D illustrates the selection of the "Last Year Growth: Descending" filter option 1033E, which caused the results area 1040I to dynamically update and to present different multi-attribute groups (in this case pairs of attributes) than the multi-attribute groups of FIG. 10C.

Figure 10E:
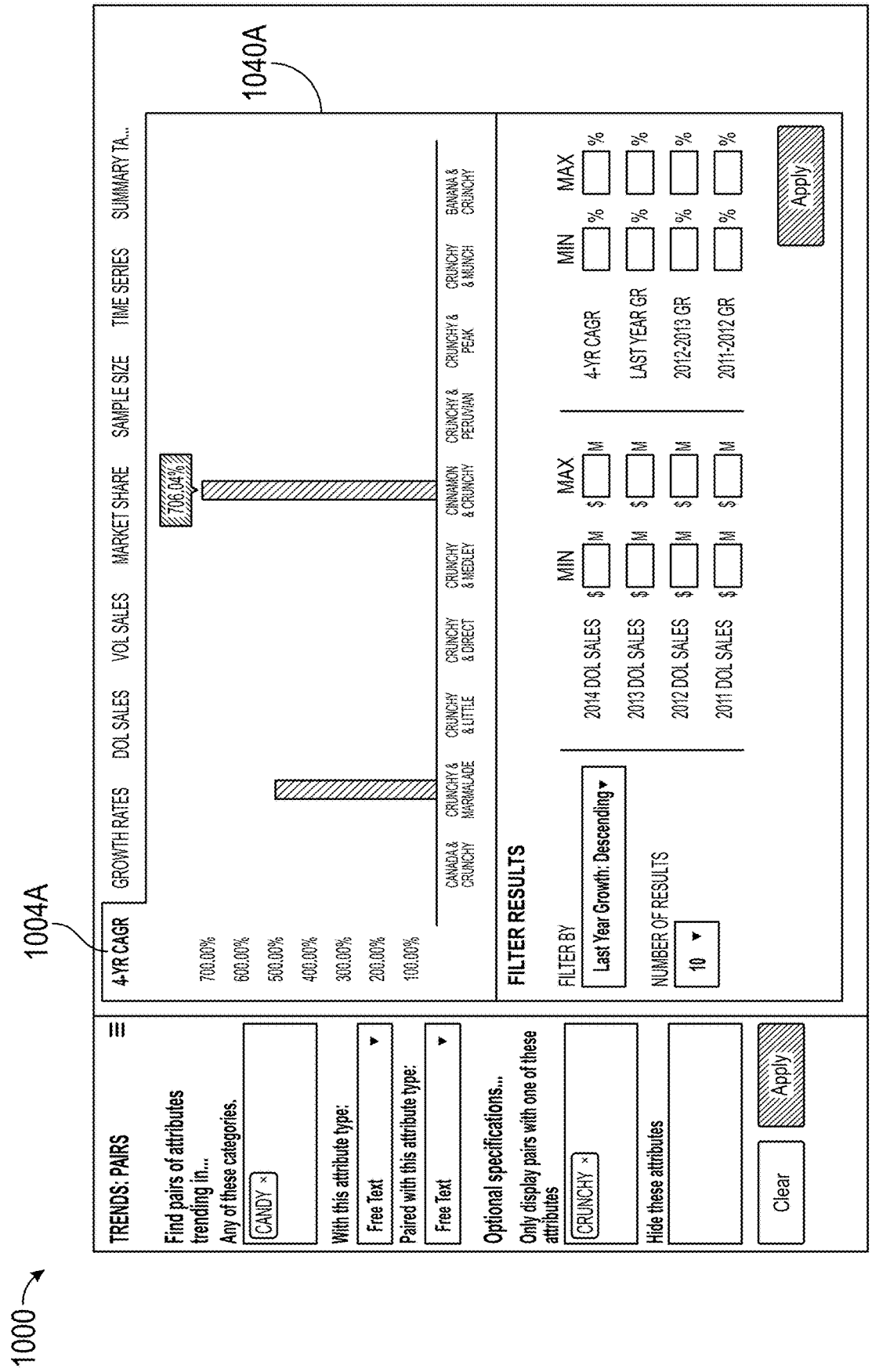

FIG. 10E illustrates the CAGR tab 1004A with respect to multi-attribute collections and with corresponding results area 1040A, which includes a compound annual growth rate graph visualization that corresponds to the selected category and attribute.

Figure 10F:
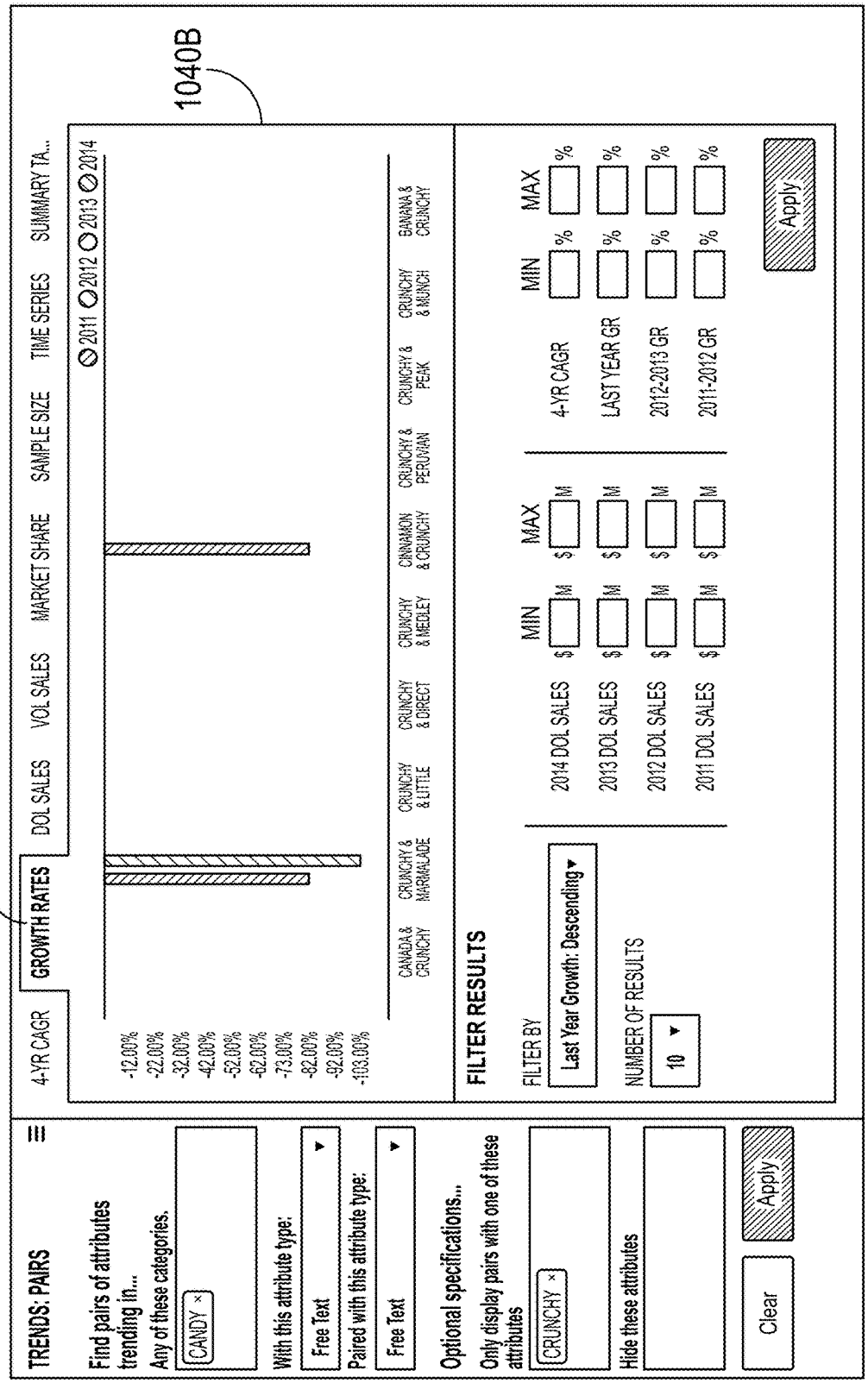

FIG. 10F illustrates the growth rates tab 1004B with respect to multi-attribute collections and with corresponding results area 1040B, which includes growth rate visualizations that correspond to the selected category and attribute.

Figure 10G:
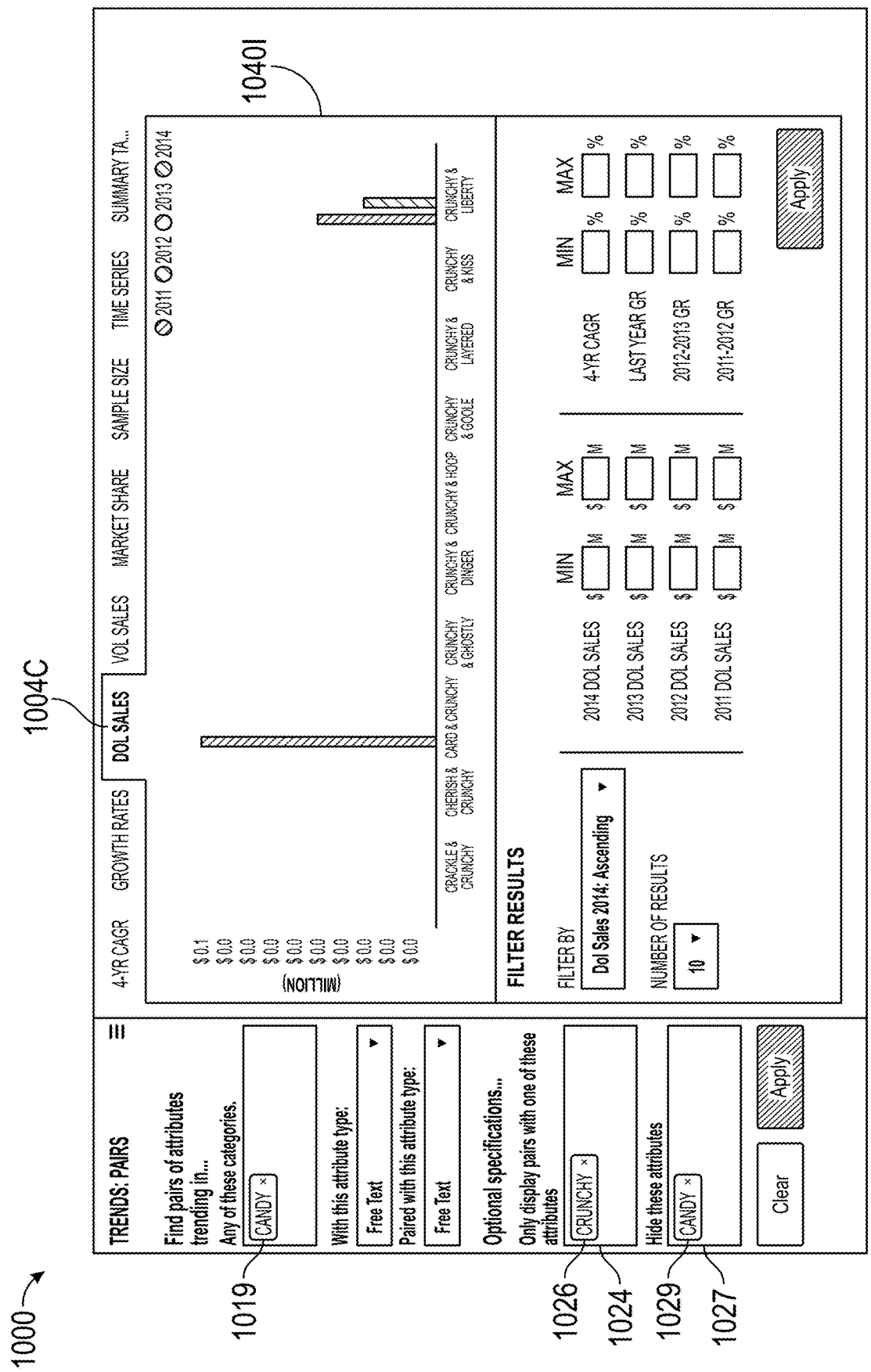

FIG. 10G illustrates filtering of the results via selection of an example exclusion attribute. For example, user interface 1000 illustrates the selection of exclusion attribute "candy" 1029 that causes the results area 1040I to exclude any multi-attribute collections that include the "candy" attribute.

Figure 10H:
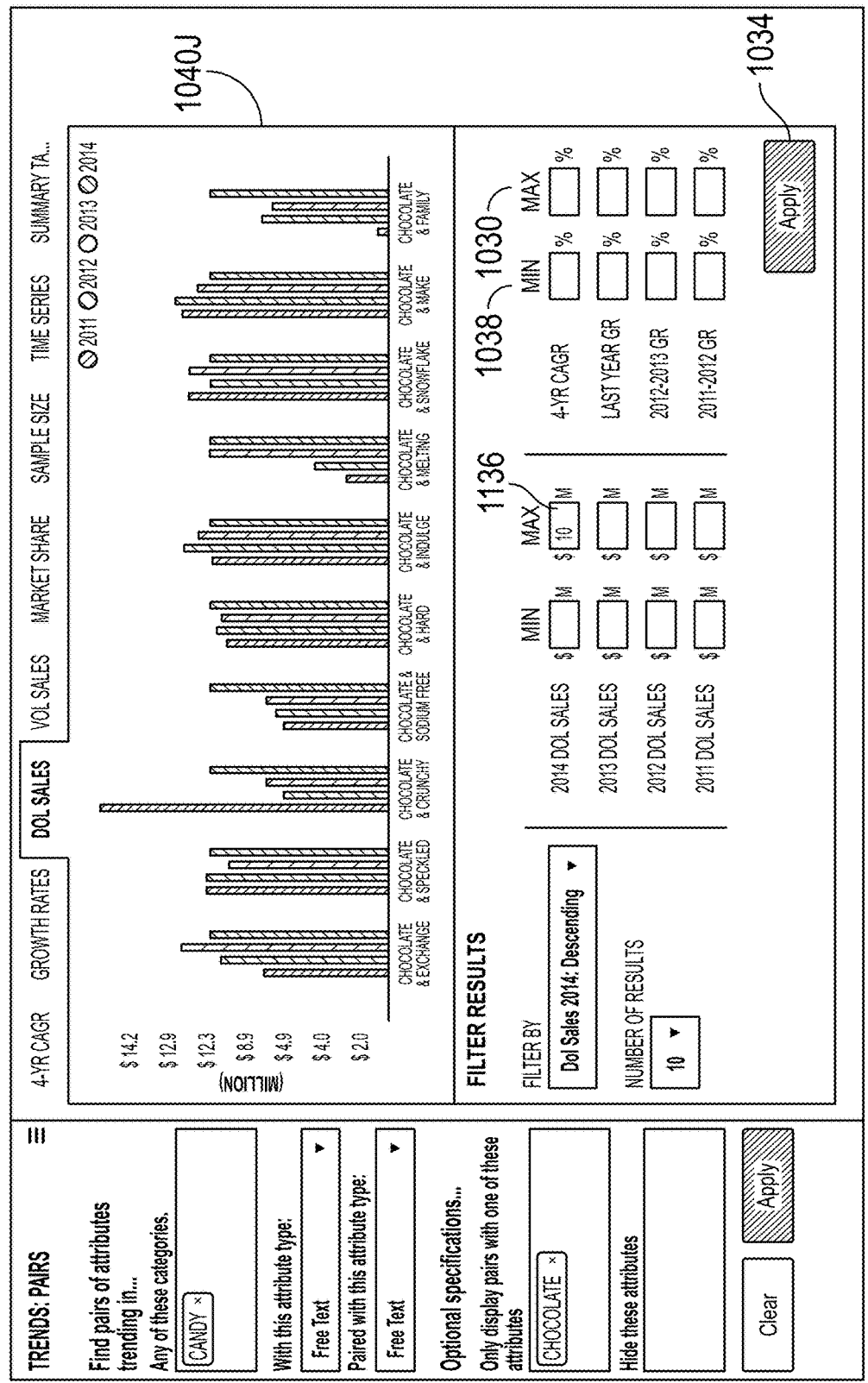

FIG. 10H illustrates filtering of the results area via the filter parameter area 1030. For example, user input within maximum dollar sales filter area 1036 and the selection of the filter execution element 1034 causes the attribute analysis system 102 to filter the multi-attribute collections within results area 1040J to those collections of items which have an aggregated annual dollar sales for 2014 below $10 million. The filter parameter area 1030 includes minimum percentage input areas 1038 and maximum percentage input areas 1030 that receive user input that can cause the results area 1040J to update.

Figure 10I:
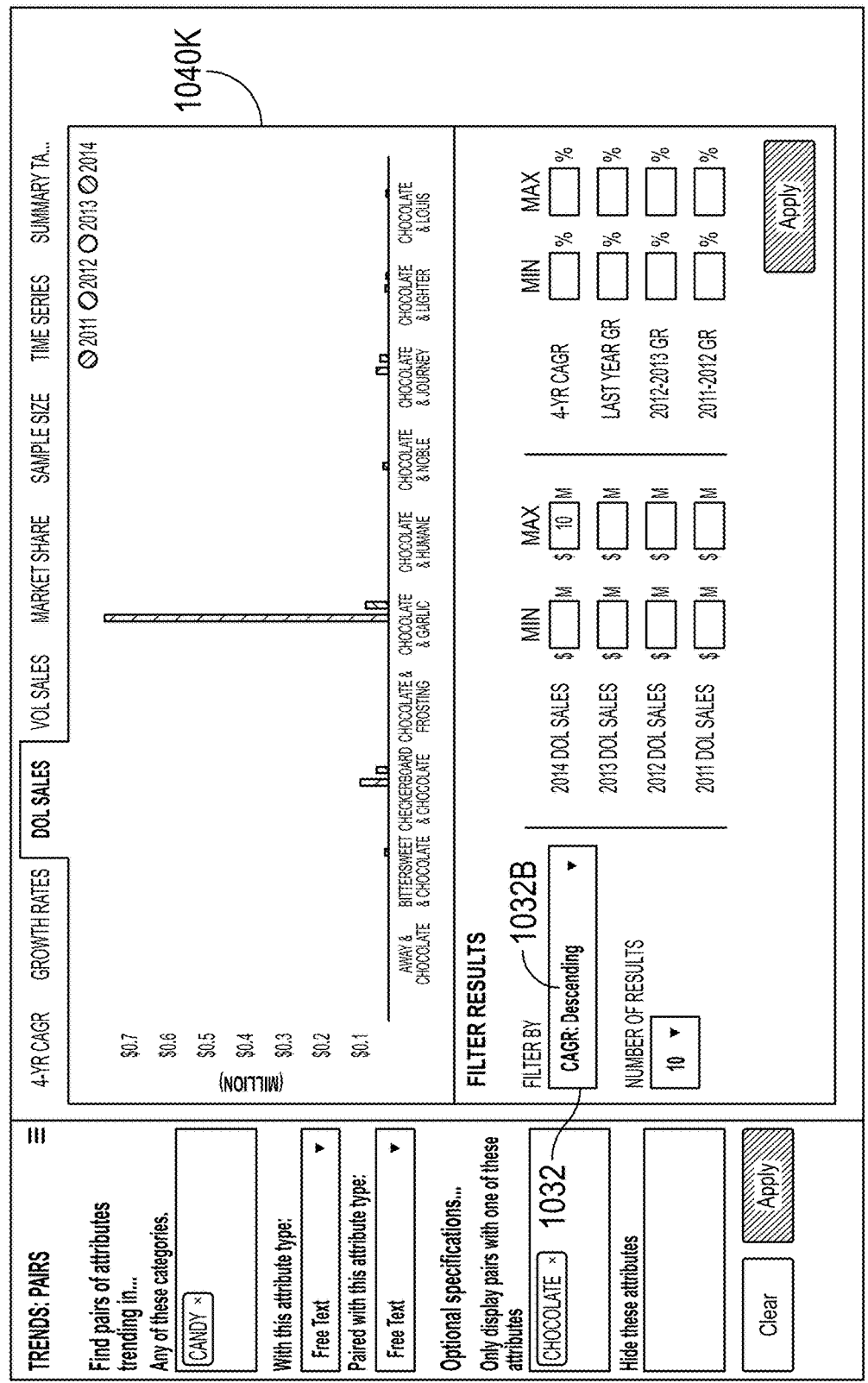

FIG. 10I illustrates another selection of the filter results input area 1032 that enables a user to sort and/or filter the results area 1040C by the "CAGR: Descending" filter option 1033B. For example, selection of the "CAGR: Descending" filter option 1033B caused the results area 1040K to dynamically update and to present different multi-attribute groups than the multi-attribute groups of FIG. 10H.

FIGS. 11A-11F illustrate example user interfaces of the attribute analysis system 100 for analyzing particular items and/or products, according to some embodiments of the present disclosure. Functional aspects of example user interface 1100 may correspond to the method 200 of FIG. 2 and/or the method 600 of FIG. 6.

Figure 11A:
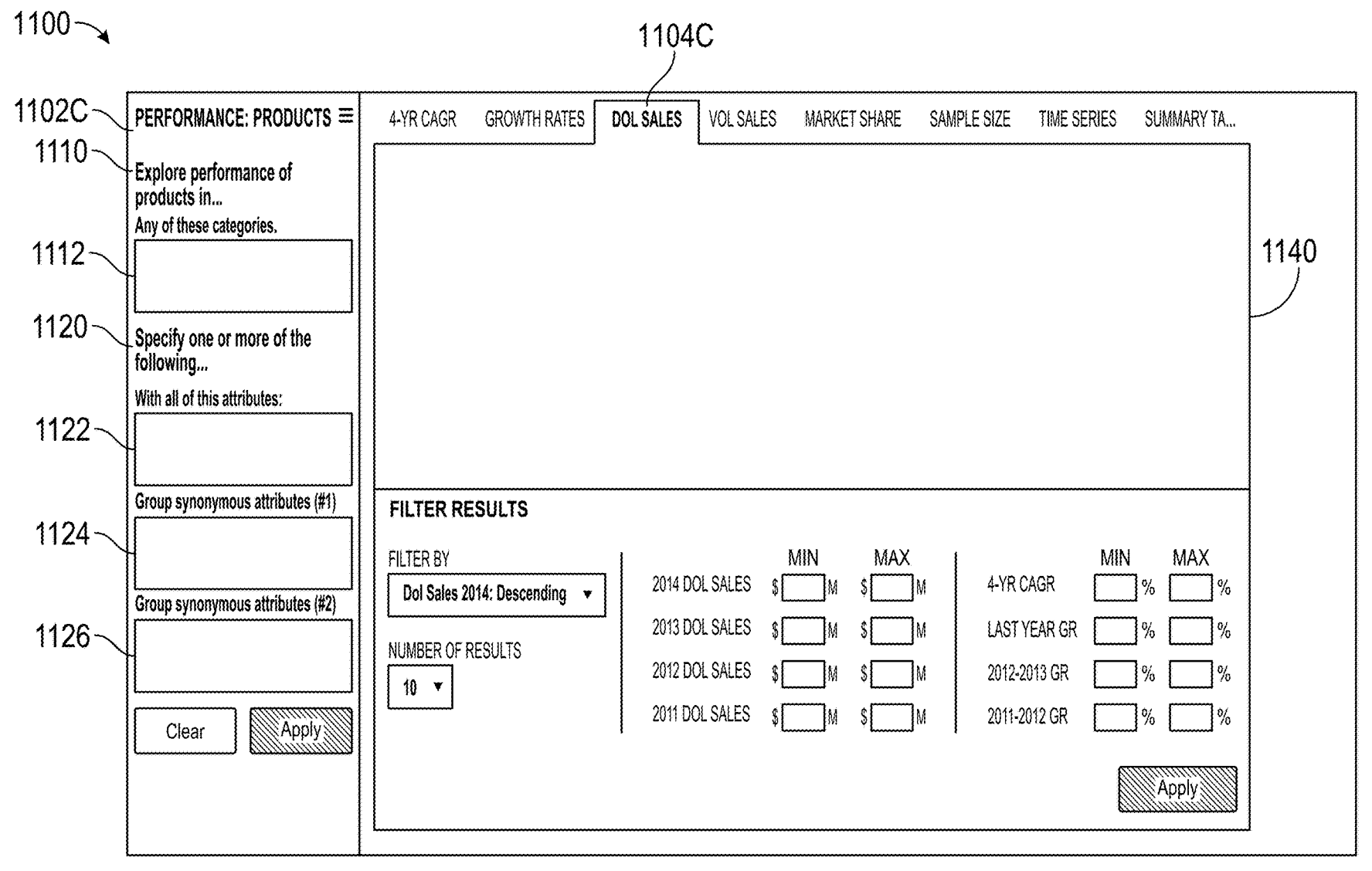

In FIG. 11A, the user interface 1100 indicates that the "Performance: Products" user interface 1102B was selected. Example user interface 1100 includes primary input area 1110, secondary input area 1120, and results area 1040. The example primary input area 1110 includes an category input element 1112. The example secondary input area 1120 includes an attribute conjunction input element 1122, a first synonymous attribute input element 1124, and a second synonymous attribute input element 1126.

Figure 11B:
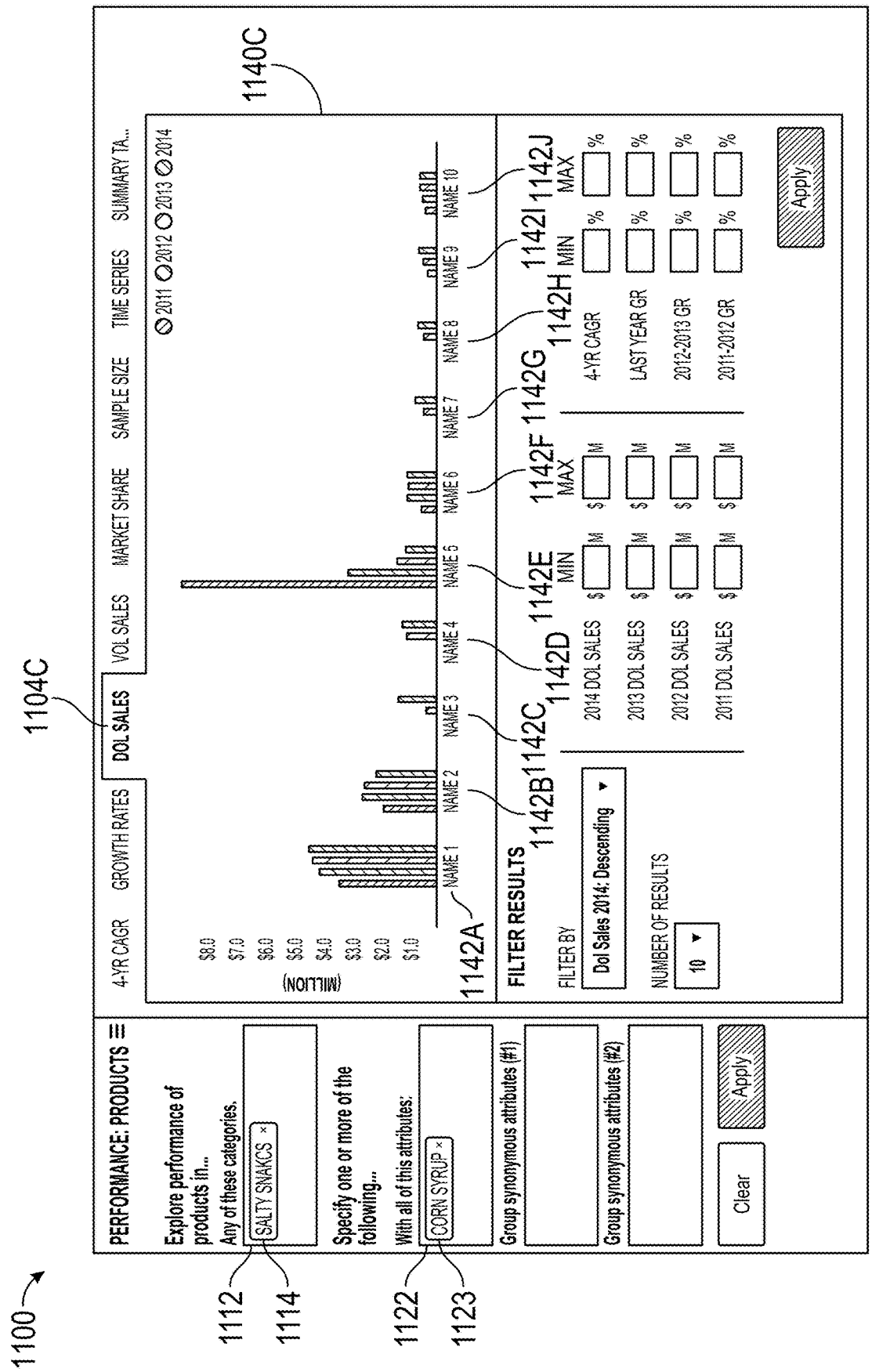

In FIG. 11B, the user interface 1100 indicates that results area 1140C has been populated based on the user input and the selection of the dollar sales tab 1104C. For example, the category input element 1112 has received the input category "salty snacks" 1114 and the attribute conjunction input element 1122 has received the input attribute "corn syrup" 1123. Accordingly, the results area 1140C may display the illustrated graph visualization. The results area 1140C presents graphs for each of the particular product labels 1142A-1142J. For example, the "NAME 1" label 1142A may correspond to the name and/or identifier for a particular first product. In some embodiments, label 1142A corresponds to a generic identifier for a particular first product. For example, a product label may be "Acme," but may correspond to a particular product of the Acme corporation, such as a specific brand of Acme cookie. In other embodiments, the product may include a broad number of items. In an Acme example, the product may refer to most or all of the items from Acme and the "Acme" product label would reflect that accordingly.

Figure 11C:
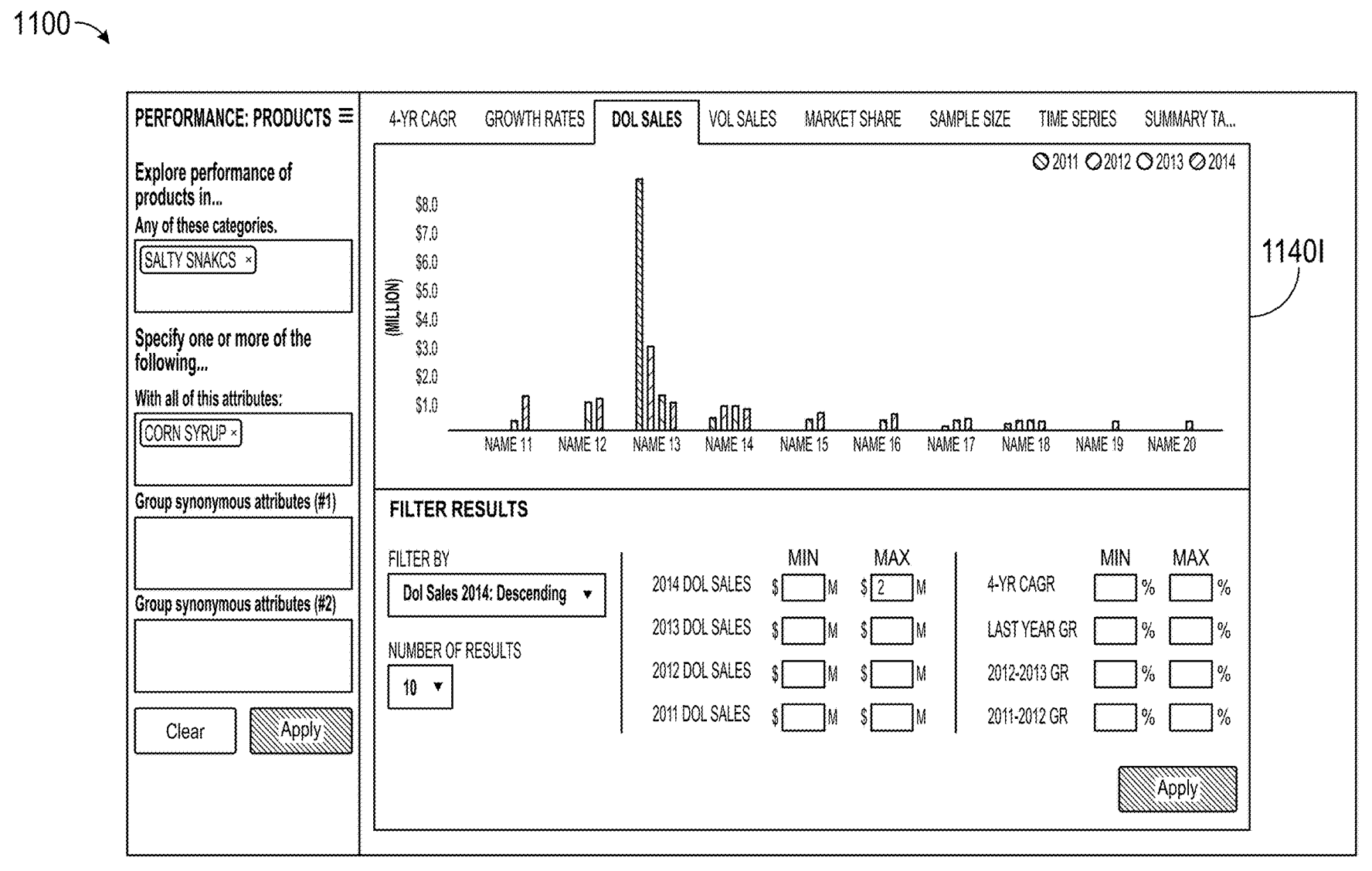

In FIG. 11C, the user interface 11100 includes the filter parameter area with a filter value that may cause the results area 11401 to update. For example, the results area 11401 presents different results then results area 1140C of FIG. 11B because the maximum dollar sales input element for a particular year has received the input value of $2 million. Accordingly, the annual dollar sales per year visualization in results area 11401 displays the annual dollar sales for particular products that have annual dollar sales of $2 million or below for the particular year.

Figure 11D:
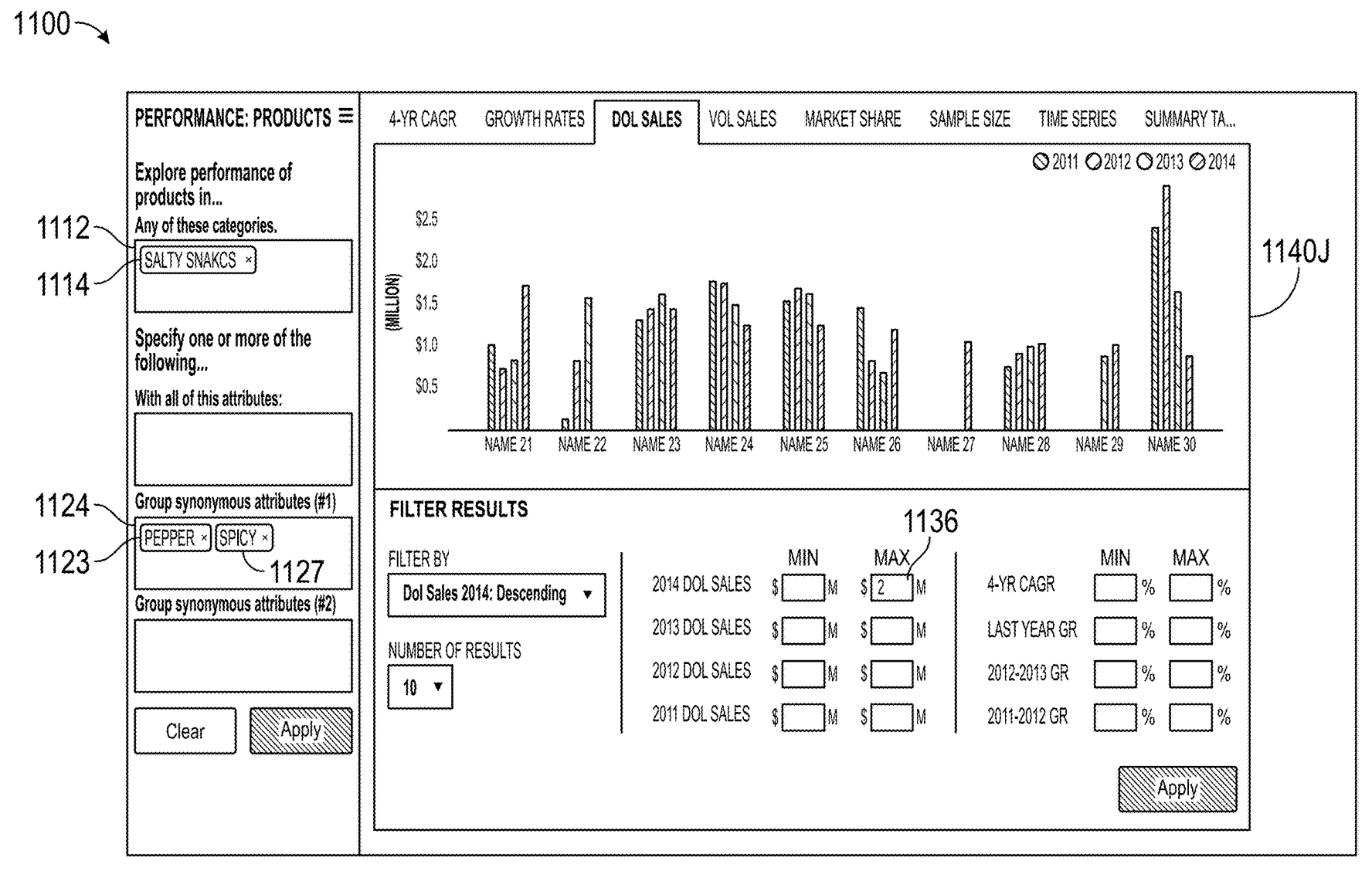

FIG. 11D illustrates filtering of the results area via the primary, secondary, and filter input areas. For example, the category input element 1112 has received the input category "salty snacks" 1114, the first synonymous attribute input element 1124 has received a first input synonymous attribute "pepper" 1125 and a second input synonymous attribute "spicy" 1127, and a filter input element 1136 has received an input value. Accordingly, results area 1140) presents respective graph visualizations for each of the particular products matching the input parameters. For example, the particular products presented (Name 21, Name 22, etc.) may be associated with either the first input synonymous attribute "pepper" 1125 and/or the second input synonymous attribute "spicy" 1127. For example, the product Name 21 may correspond to the attribute "pepper" and the product Name 22 may correspond to the attribute "spicy." Accordingly, in some embodiments, a synonymous attribute input element may provide a logical OR condition for inputs attributes.

Figure 11E:
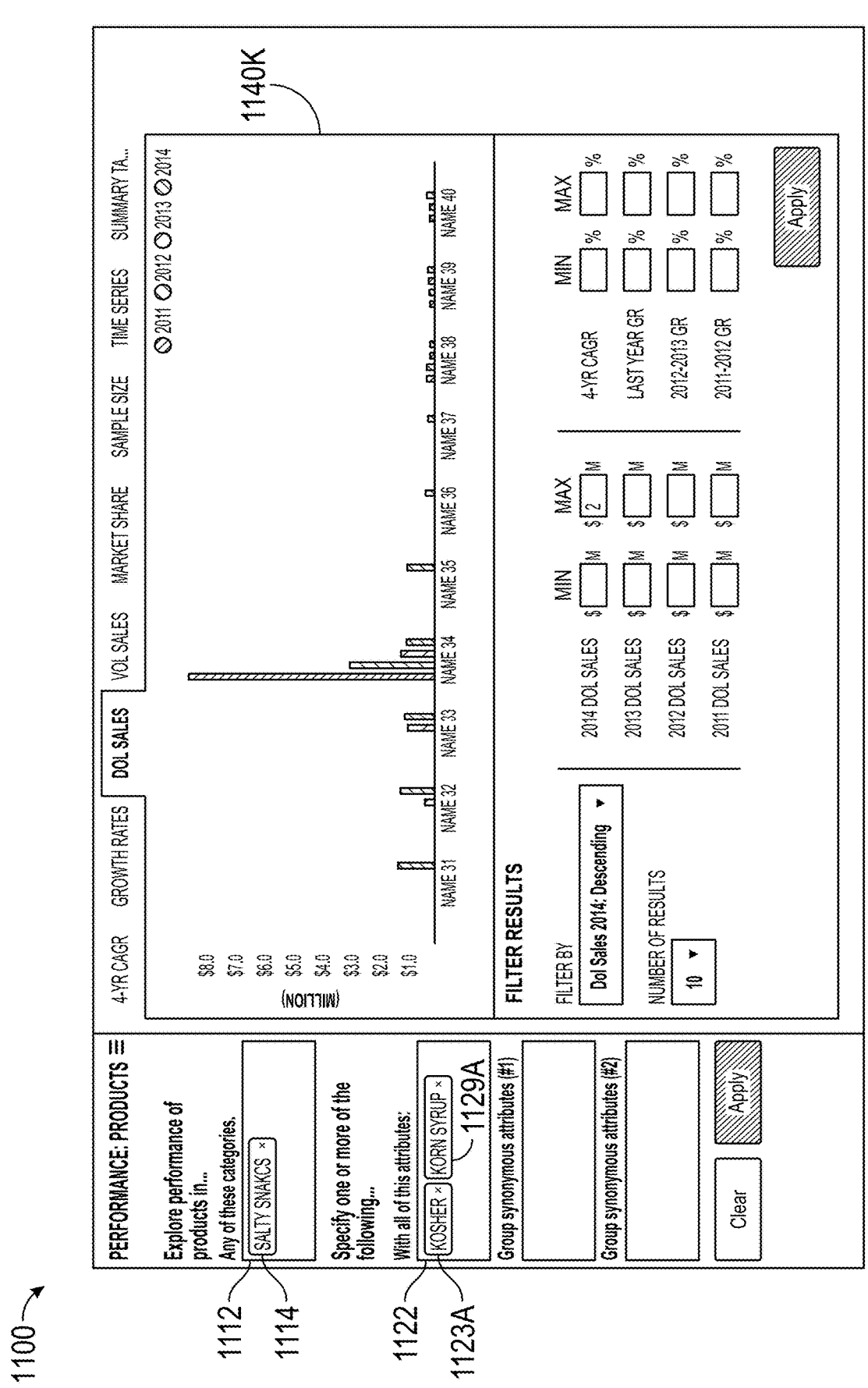
Figure 11F:
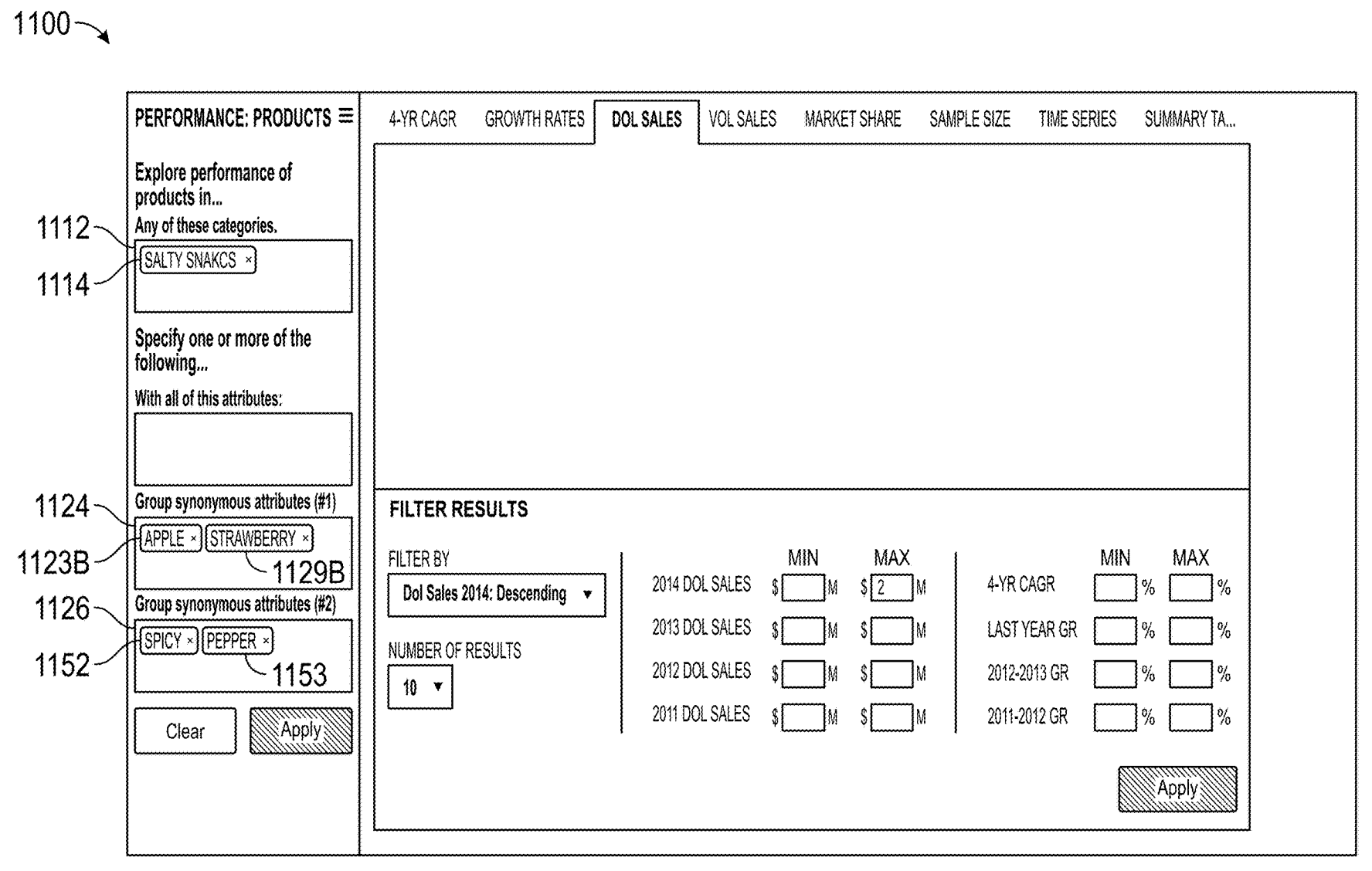

FIG. 11E illustrates another example of filtering of the results area via the primary, secondary, and filter input areas. For example, the category input element 1112 has received the input category "salty snacks" 1114, the attribute conjunction input element 1122 has received a first input attribute "kosher" 1123A and a second input attribute "corn syrup" 1129A, and a filter input element has received an input value. In the example user interface 1100, the particular products presented (Name 31, Name 32, etc.) may be associated with the first input attribute "kosher" 1123A and the second input attribute "corn syrup" 1129A. Accordingly, in some embodiments, the attribute conjunction input element 1122 may provide a logical AND condition for input attributes.

FIG. 11E illustrates another example of multiple synonymous attribute input element. For example, the particular elements and inputs in user interface 1100 of FIG. 11F may be similar to the particular elements and inputs of user interface 1100 of FIG. 11D (e.g., the input element 1126, the second input 1153, and the first input 1152 of FIG. 11F may be similar to the input element 1124, the first input 1125, and the second input 1127 of FIG. 11D, respectively). However, FIG. 11E differs from FIG. 11D, in that FIG. 11E illustrates use of both the first synonymous attribute input element 1124 and the second synonymous attribute input element 1126. For example, the first synonymous attribute input element 1124 and the second synonymous attribute input element 1126 may operate as logical AND conditions with respect to one another. Continue with the example, a particular product matching the input parameters of FIG. 11F would include a particular product associated with the attribute "apple" 1123B and/or the attribute "strawberry" 129B, and the same particular product associated must be associated with the attribute "spicy" 1123B and/or the attribute "pepper" 129B. For example, a first product may be associated with "apple" and "spicy," and a second product may be associated with "strawberry" and "pepper."

FIGS. 12A-12H illustrate example user interfaces of the attribute analysis system 1100 for analyzing collections of items by category, according to some embodiments of the present disclosure. Functional aspects of example user interface 1200 may correspond to the method 200 of FIG. 2 and/or the method 700 of FIG. 7.

Figure 12A:
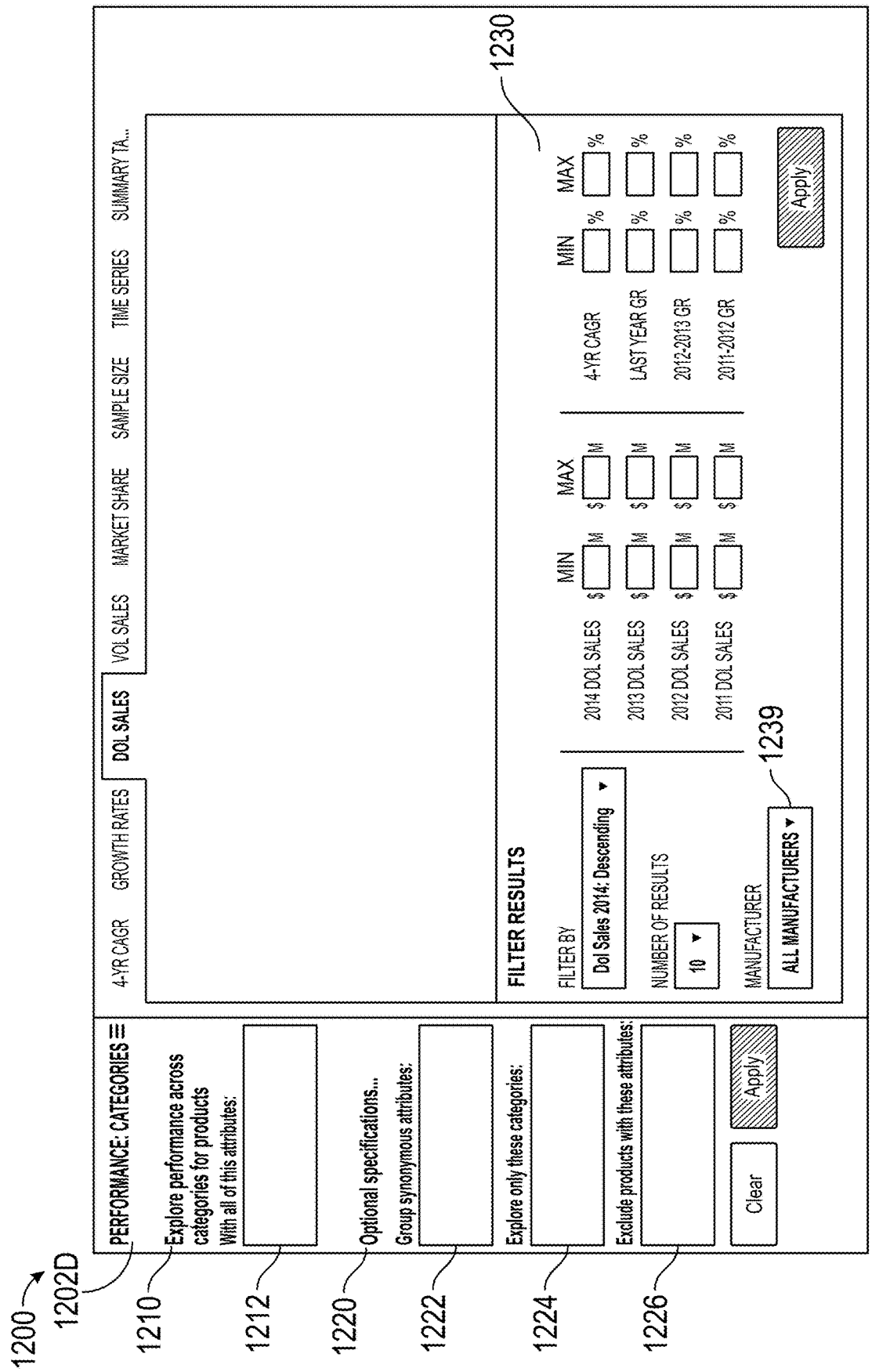
FIGS. 12A-12H illustrate example user interfaces of the attribute analysis system for analyzing collections of items by category, according to some embodiments of the present disclosure.

In FIG. 12A, the user interface 1200 indicates that the "Performance: Products" user interface 1202D was selected. Example user interface 1200 includes primary input area 1210, secondary input area 1220, filter parameter area 1230, and a results area. The example primary input area 1210 includes an attribute input element 1212. The example secondary input area 1220 includes an synonymous attribute input element 1222, a category input element 1124, and an attribute exclusion input element 1126. The filter parameter area 1230 includes a manufacturer input element 1239. In some embodiments, the manufacturer input element 1239 may correspond to an organization associated with the item, such as the manufacturer and/or retailer of an item. For example, selection of the "Acme" input option of the input element 1239 may cause the user interface 1200 to filter the items to be presented to only include items that are associated with the Acme company.

Figure 12B:
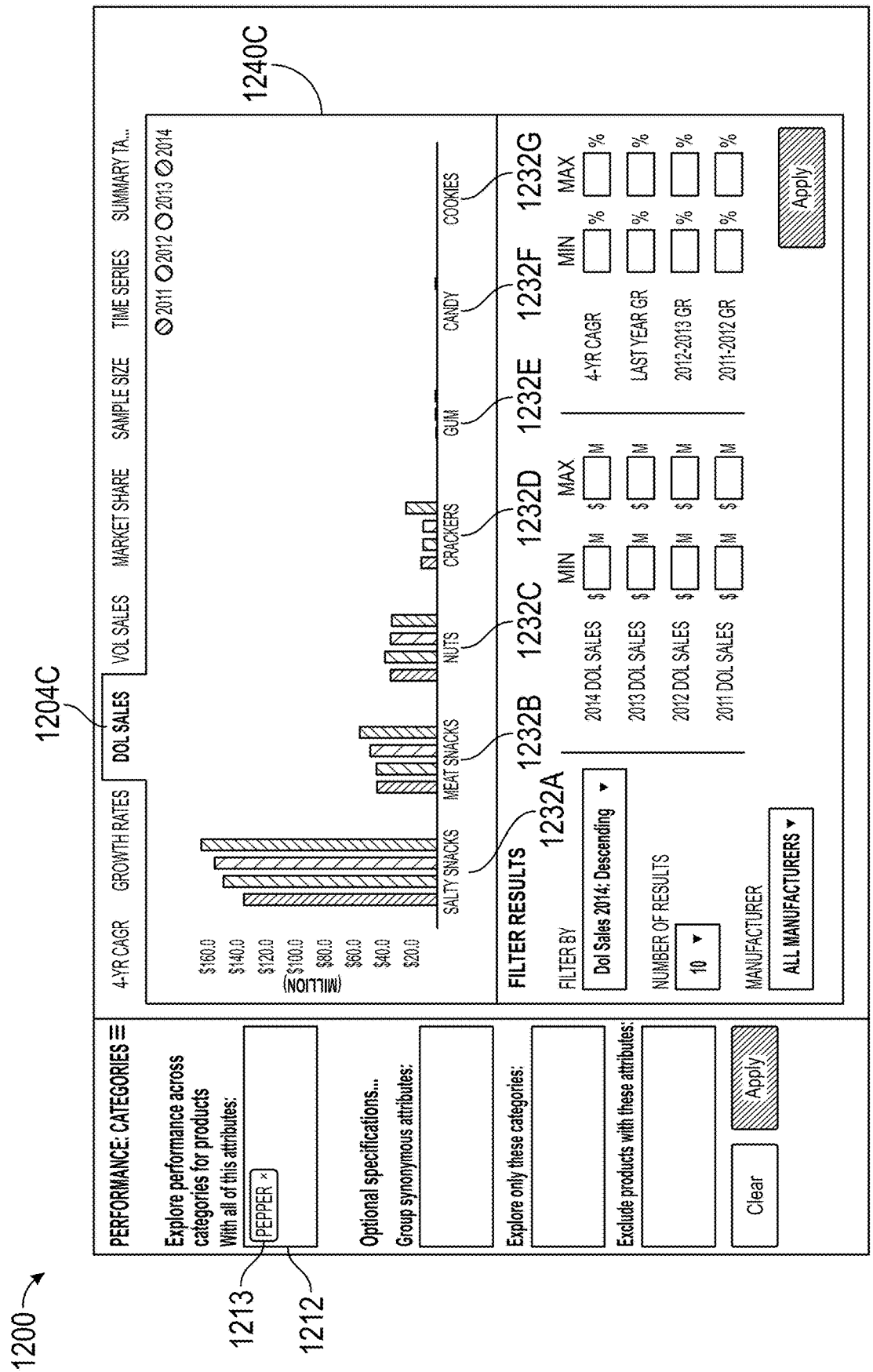

In FIG. 12B, the user interface 1200 indicates that the results area 1240C has been populated based on the user input and the selection of the dollar sales tab 1204C. For example, the attribute input element 1212 has received the input attribute "pepper" 1213. As illustrated, the results area 1240C includes graph visualizations corresponding to respective collections of items grouped by categories 1232A-1232G.

Figure 12C:
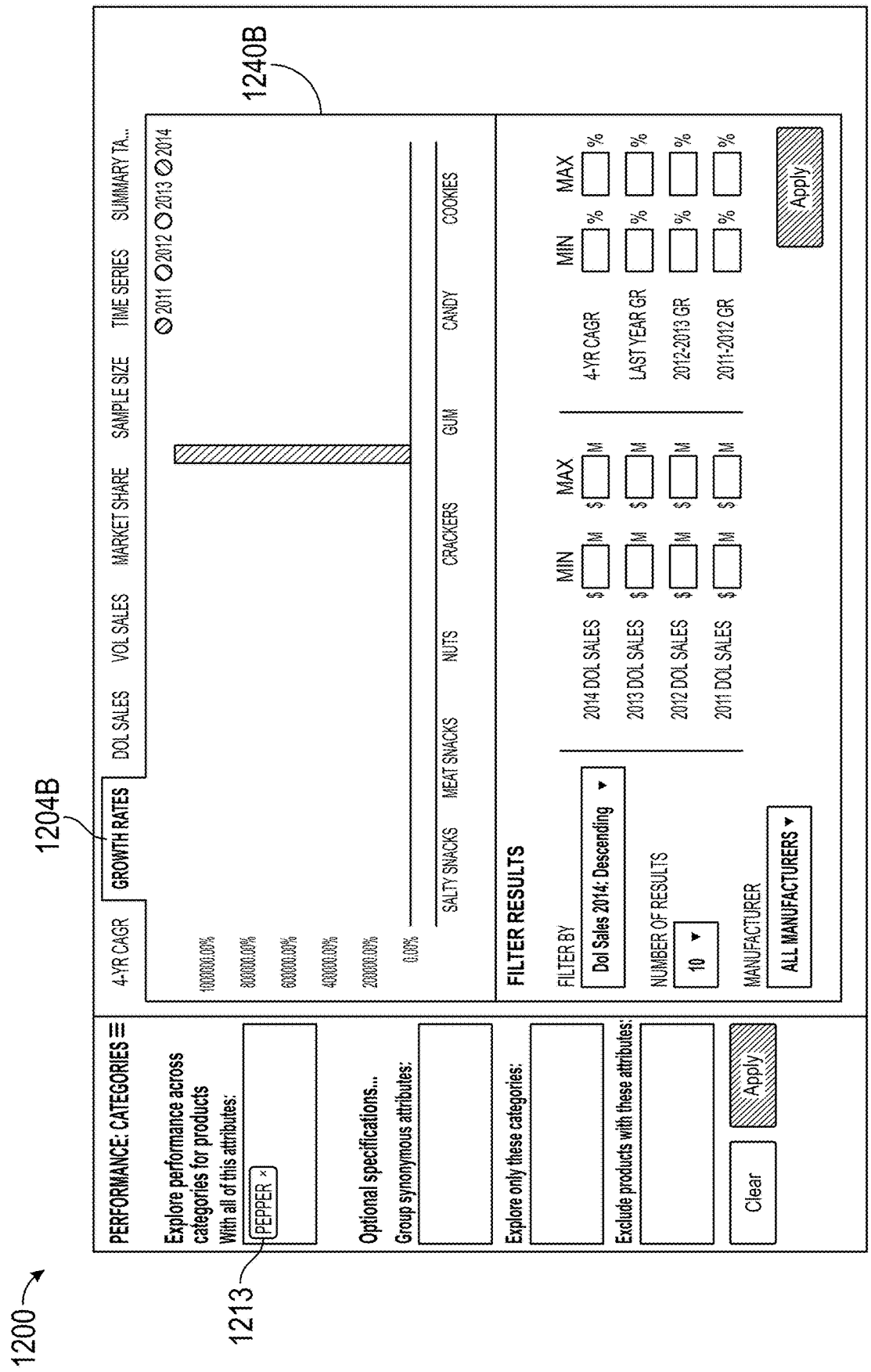

FIG. 12C illustrates the growth rates tab 1204B with respect to collections of items grouped by category and with corresponding results area 1240B, which includes growth rate visualizations that correspond to the selected attribute 1213.

Figure 12D:
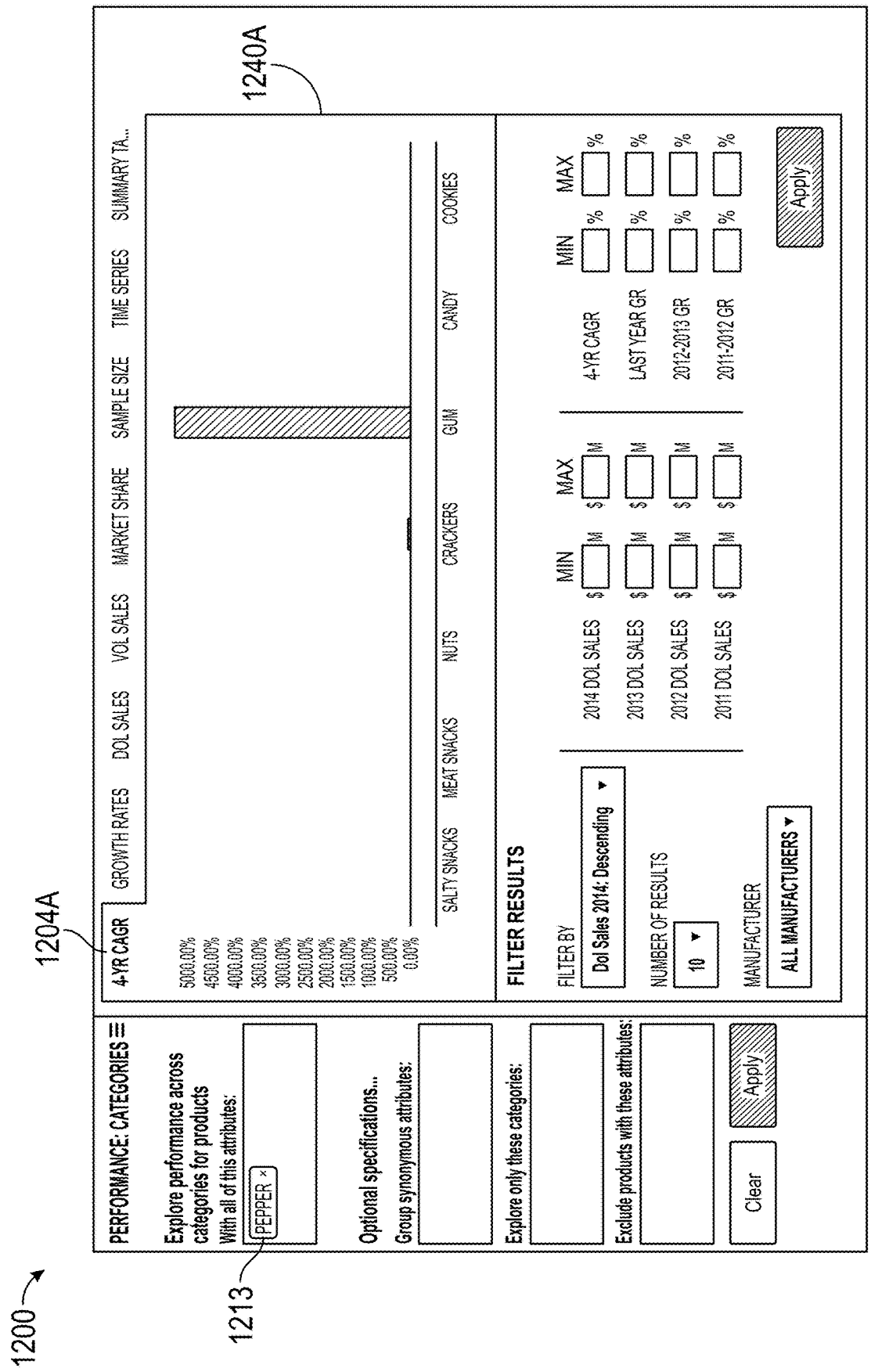

FIG. 12D illustrates the CAGR tab 1204A with respect to collections of items grouped by category and with corresponding results area 1040A, which includes a compound annual growth rate graph visualization that corresponds to the selected attribute 1213.

Figure 12E:
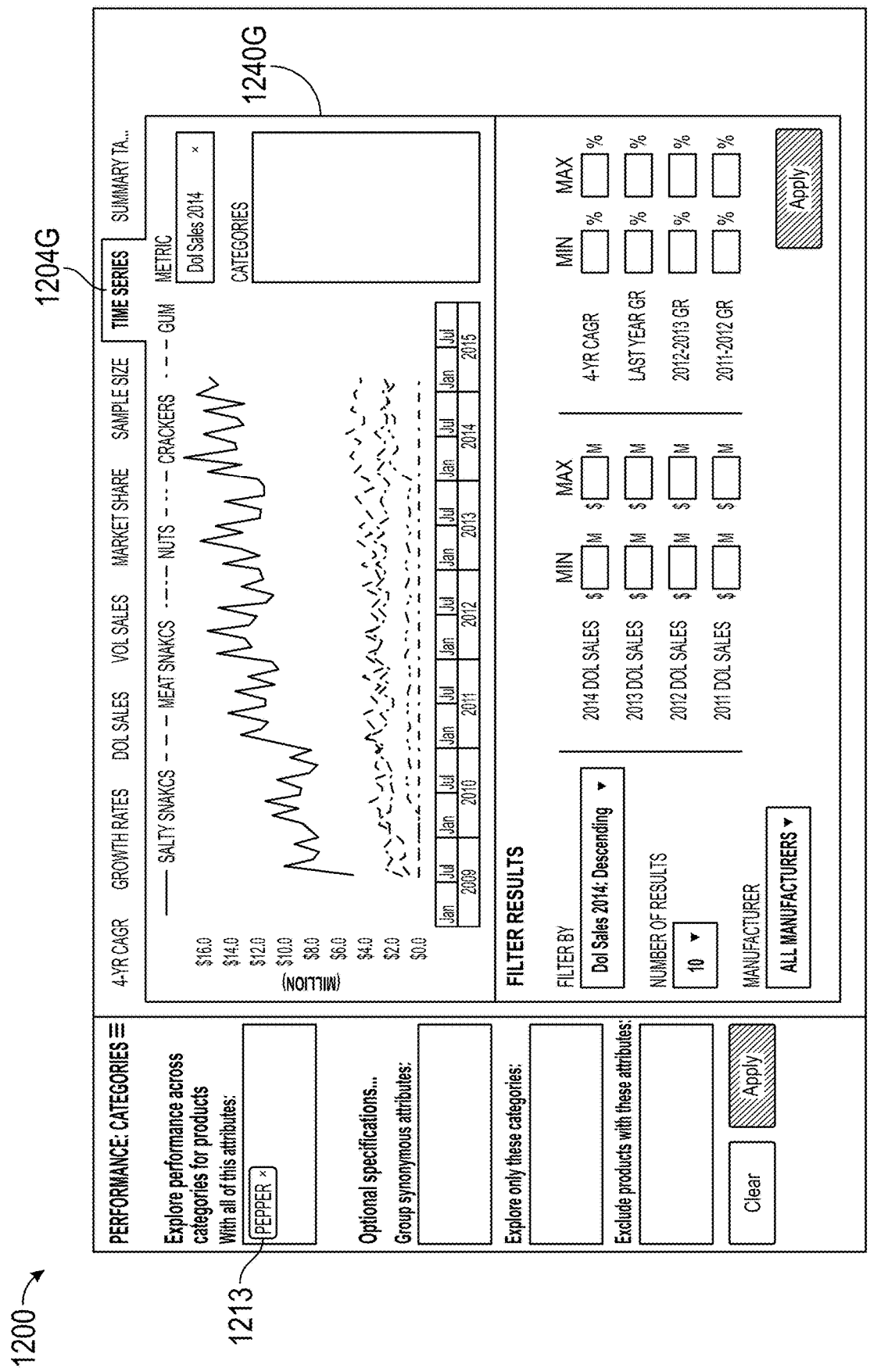

FIG. 12E illustrates the time series tab 1204G with respect to collections of items grouped by category and with corresponding results area 1240G, which includes a times series visualization that corresponds to the selected attribute 1213.

Figure 12F:
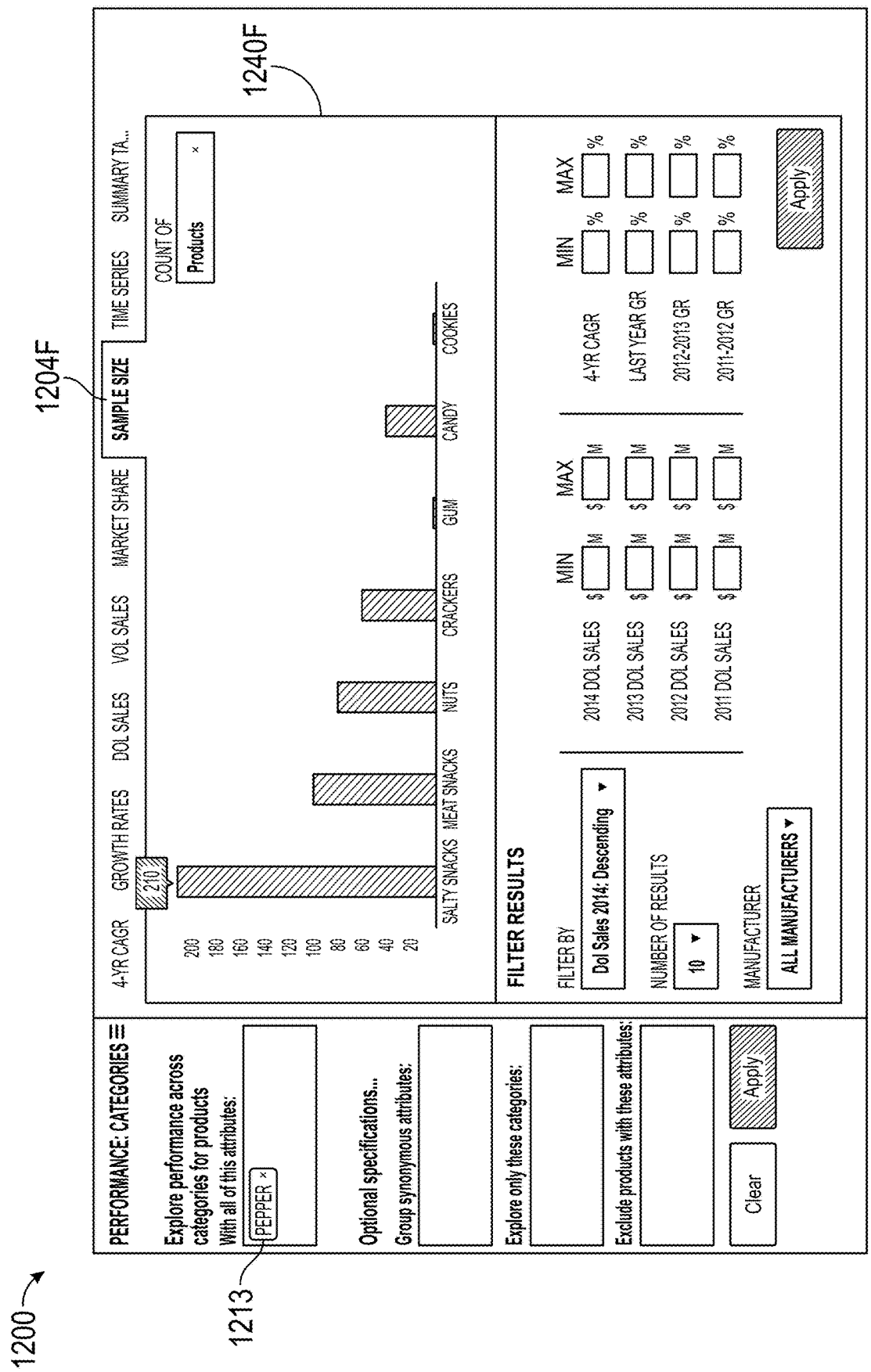

FIG. 12F illustrates the sample size tab 1204F with respect to collections of items grouped by category and with the corresponding results area 1240F, which includes graph visualizations that correspond to the selected attribute 1213. For example, the graph visualization for the category "salty snacks" in results area 1240F illustrates the count of items within the determined collection that are associated with the category "salty snacks" and that are further associated with the attribute "pepper," which is a count of 210 matching items.

Figure 12G:
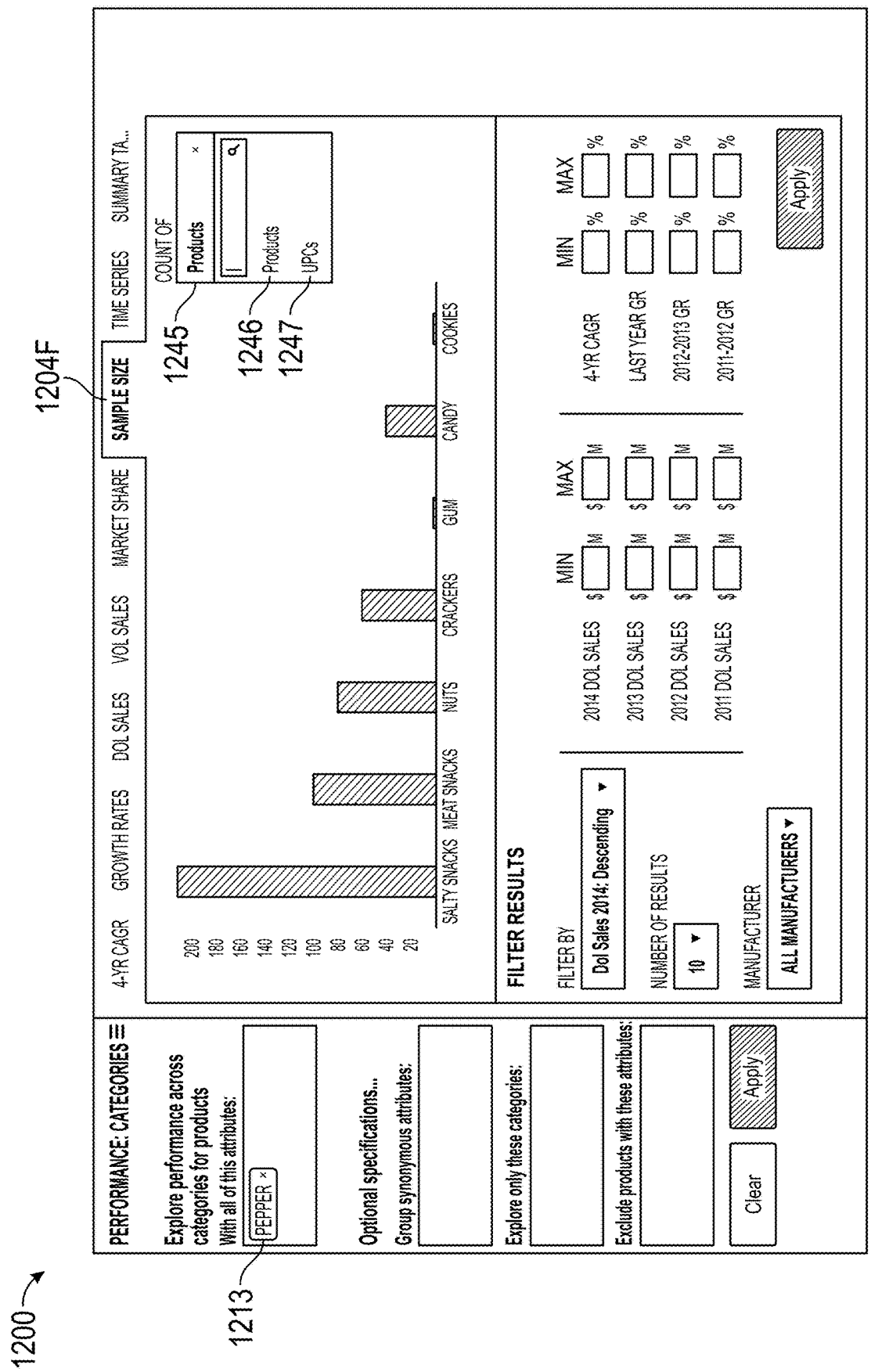

FIG. 12G illustrates that the sample size tab 1204F includes filters to update the graph visualizations. For example, the sample size selector 1245 may enable a user to update the count of collections within the sample size tab 1204F. Continuing with the example, the sample size selector 1245 may include a "Products" option 1246 and a "UPCs" option 1247. In some embodiments, selection of counting "UPCs" within the sample size selector 1245 may cause the counts of the items to update where counting of particular "UPCs" may be more specific and/or granular than counting "Products."

Figure 12H:
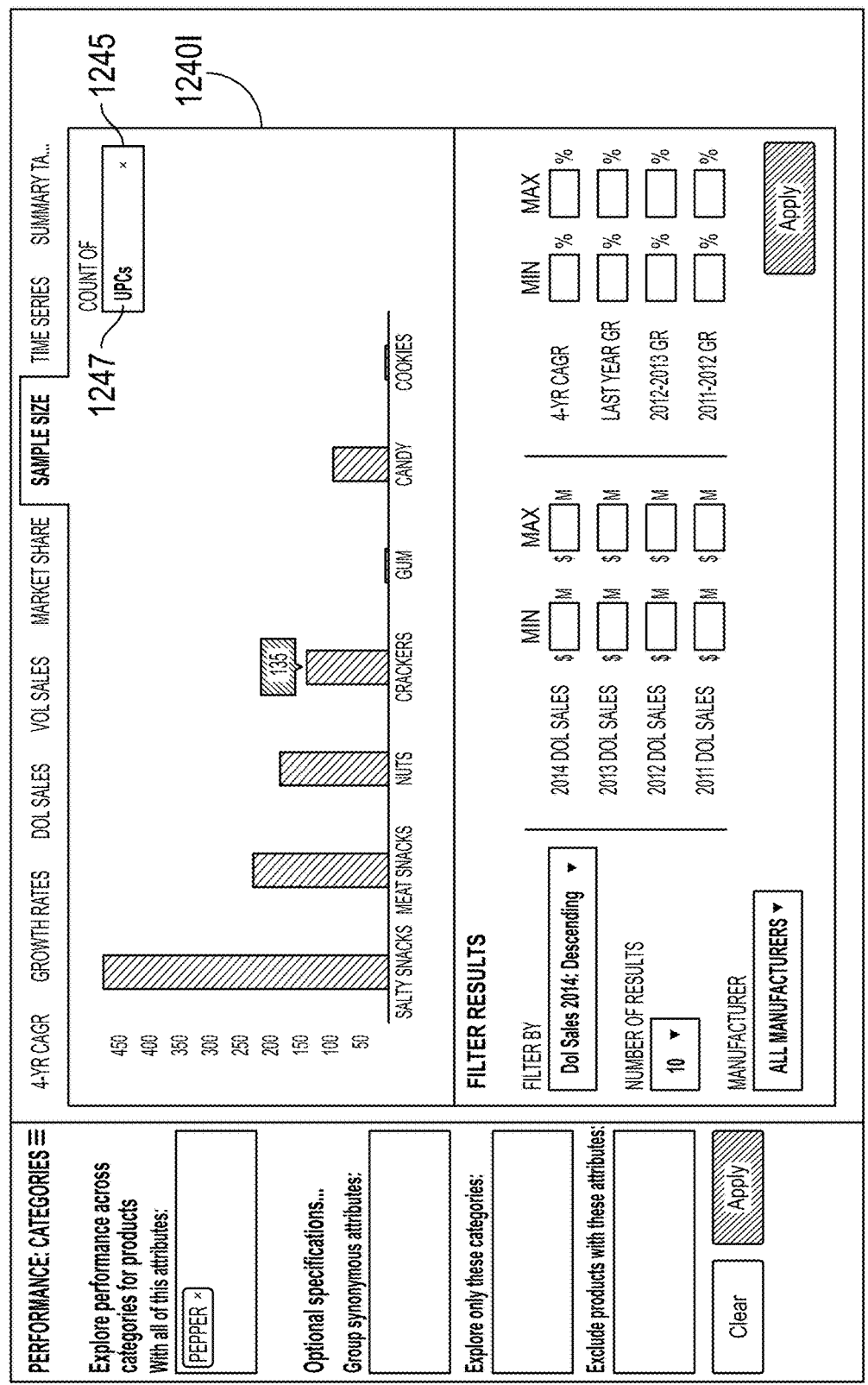

FIG. 12H illustrates the sample size tab 1204F presenting graph visualizations based on a more granular filter criteria. For example, the user interface 1200 includes the results area 1240I with the "UPCs" option 1247 selected from the sample size selector 1245. Accordingly, the results area 1240I illustrates the more granular count of items within results area 1240I. For example, the results area 1240F of FIG. 12F illustrates a count of 210 "products" corresponding to the "salty snacks" category and the results area 1240I of FIG. 12H illustrates a count of approximately 450 "UPCs" corresponding to the "salty snacks" category and FIG. 12H.

Implementation Mechanisms

The various computing device(s) discussed herein, such as the attribute analysis system 100, the item processor 104, the user interface server 106, the item analyzer 108, the user interface system 120, and/or user computing device 102, are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things. The attribute analysis system 100 may be hosted and/or executed on one or more computing devices with one or more hardware processors and with any of the previously mentioned operating system software.

Figure 13:
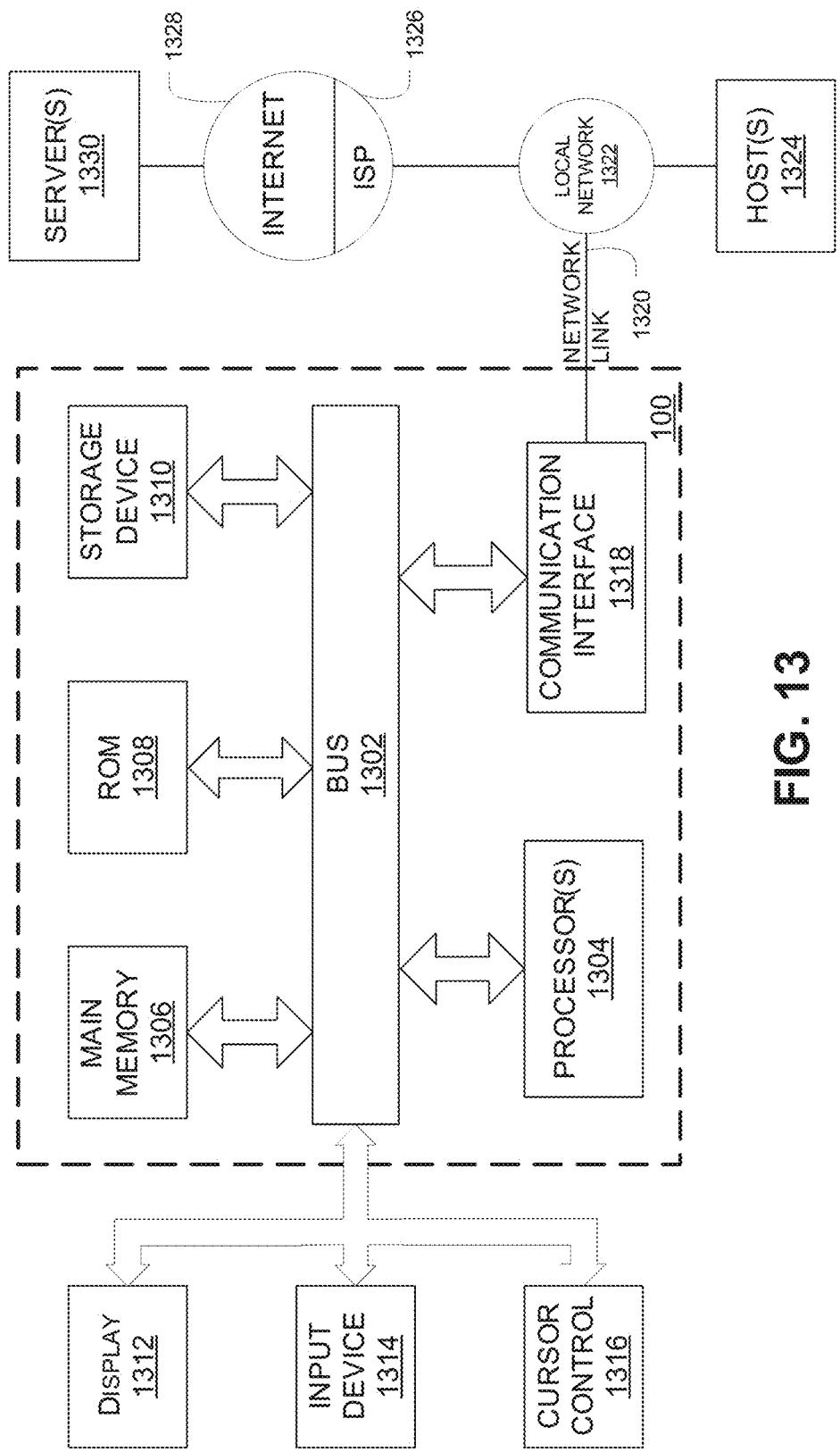
FIG. 13 is a block diagram illustrating an example attribute analysis system with which various methods and systems discussed herein may be implemented.

FIG. 13 is a block diagram that illustrates example components of the attribute analysis system 100. While FIG. 13 refers to the attribute analysis system 100, any of the other computing devices, modules, services, and/or user computing devices discussed herein may have some or all of the same or similar components, such as the user interface system 120.

The attribute analysis system 100 may execute software, e.g., standalone software applications, applications within browsers, network applications, etc., whether by the particular application, the operating system, or otherwise. Any of the systems discussed herein may be performed by the attribute analysis system 100 and/or a similar computing system having some or all of the components discussed with reference to FIG. 13.

The attribute analysis system 100 includes a bus 1302 or other communication mechanism for communicating information, and a hardware processor, or multiple processors, 1304 coupled with bus 1302 for processing information.

The attribute analysis system 100 also includes a main memory 1306, such as a random access memory (RAM), cache and/or other dynamic storage devices, coupled to bus 1302 for storing information and instructions to be executed by processor(s) 1304. Main memory 1306 also may be used for storing temporary variables or other intermediate information during execution of instructions to be executed by processor(s) 1304. Such instructions, when stored in storage media accessible to processor(s) 1304, render the attribute analysis system 100 into a special-purpose machine that is customized to perform the operations specified in the instructions. Such instructions, as executed by hardware processors, may implement the methods and systems described herein for processing item data and/or metadata and/or for analyzing attributes and data associated with one or more items.

The attribute analysis system 100 further includes a read only memory (ROM) 1308 or other static storage device coupled to bus 1302 for storing static information and instructions for processor(s) 1304. A storage device 1310, such as a magnetic disk, optical disk, or USB thumb drive (Flash drive), etc., is provided and coupled to bus 1302 for storing information and instructions. The item processor 104 and/or the item analyzer 108 of FIG. 1 may be stored on the main memory 1306 and/or the storage device 1310.

In some embodiments, each of the process data storage 112, the item metadata storage 132, item data storage 134, and/or the data sources 136 of FIG. 1 is a file system, relational database such as, but not limited to, MySql, Oracle, Sybase, or DB2, and/or a distributed in memory caching system such as, but not limited to, Memcache, Memcached, or Java Caching System.

The attribute analysis system 100 and/or user computing device 102 may be coupled via bus 1302 to a display 1312, such as a cathode ray tube (CRT) or LCD display or touch screen, for displaying information to a computer user. An input device 1314 is coupled to bus 1002 for communicating information and command selections to processor 1304. One type of input device 1314 is a keyboard including alphanumeric and other keys. Another type of input device 1314 is a touch screen. Another type of user input device is cursor control 1316, such as a mouse, a trackball, a touch screen, or cursor direction keys for communicating direction information and command selections to processor 1304 and for controlling cursor movement on display 1312. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The attribute analysis system 100 may include a presentation server to implement a GUI, for example, FIGS. 9A-9J, 10A-10I, 11A-11F, and 12A-12H, which may be stored in a mass storage device as executable software codes that are executed by the computing device(s). This and other units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The attribute analysis system 100, or components of it, such as the item processor 104, the item analyzer 108, the user interface server 106 of FIG. 1, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor(s) 1304 for execution. For example, the instructions may initially be carried on a magnetic disk or solid state drive of a remote computer. The remote computer may load the instructions into its dynamic memory and send the instructions over a telephone or cable line using a modem. A modem local to the attribute analysis system 100 may receive the data on the telephone or cable line and use an infra-red transmitter to convert the data to an infra-red signal. An infra-red detector can receive the data carried in the infra-red signal and appropriate circuitry can place the data on bus 1302. Bus 1302 carries the data to main memory 1306, from which the processor(s) 1304 retrieves and executes the instructions. The instructions received by main memory 1306 may retrieve and execute the instructions. The instructions received by main memory 1306 may optionally be stored on storage device 1310 either before or after execution by computer hardware processor(s) 1304.

The attribute analysis system 100 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or WAN component to be communicated with a WAN). Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from the attribute analysis system 100, are example forms of transmission media.

A network, such as the network 160 of FIG. 1, may comprise, but is not limited to, one or more local area networks, wide area network, wireless local area network, wireless wide area network, the Internet, or any combination thereof.

The attribute analysis system 100 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor(s) 1304 as it is received, and/or stored in storage device 1310, or other non-volatile storage for later execution.

In some embodiments, the attribute analysis system 100, the user interface system 120, and/or the user computing device 102 may operate in a distributed computing environment including several computer systems that are interconnected using one or more computer networks. The attribute analysis system 100, the user interface system 120, and/or the user computing device 102 could also operate within a computing environment having a fewer or greater number of devices than are illustrated in FIG. 1 and/or FIG. 13. Thus, the depiction of attribute analysis system 100, the user interface system 120, and/or the user computing device 102 in FIG. 1 and/or FIG. 13 should be taken as illustrative and not limiting to the present disclosure. For example, the attribute analysis system 100, the user interface system 120, and/or the user computing device 102 could implement various Web services components and/or peer-to-peer network configurations to implement at least a portion of the processes described herein. For example, multiple servers and/or processes may process and/or analyze items and/or present a user interface in a distributed manner, as described herein.

It will be appreciated that while the present disclosure typically discusses data analysis and/or trending of food products, the systems and methods described herein may be agnostic to the types of data being analyzed and/or may analyze any type of data source, such as, electronic product databases, automobile databases, or any database of items that may be associated with attributes, for example. In some embodiments, the systems and methods described herein enable the transformation of large structured databases of items into manageable and/or index sets of attribute and/or word cloud data, such that a user may search and/or analyze large structured databases based on the attributes.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method comprising:
   generating item data, wherein generating the item data further comprises:
      determining, from a data set, a first column of data with a cardinality below a predefined cardinality threshold; and
      removing, from a data set, the first column of data that results in the item data;
   determining, from the item data, a plurality of items;
   determining, from the item data, a plurality of attributes, wherein determining the plurality of attributes further comprises:
      identifying, from the item data, a first valid word that matches a first word in a first dictionary;
      adding the first valid word as a first attribute to the plurality of attributes;
      identifying, from the item data, a second valid word that matches a second word in a second dictionary different from the first dictionary; and
      adding the second valid word as a second attribute to the plurality of attributes;
   receiving first user input comprising a set of user specified conjunction attributes, the set of user specified conjunction attributes comprising the first attribute;
   receiving second user input comprising a set of user specified synonymous attributes, the set of user specified synonymous attributes comprising the second attribute and a third attribute;
   determining, from the plurality of items, a subset of items corresponding to the set of user specified conjunction attributes and the set of user specified synonymous attributes;
   determining, from item metadata, a plurality of summary indicators, wherein each summary indicator of the plurality of summary indicators is representative of each item from the subset of items; and
   causing presentation, in a user interface, a plurality of visualizations associated with a respective indicator from the plurality of summary indicators, wherein the plurality of visualizations indicate data associated with the set of user specified conjunction attributes and at least one attribute of the set of user specified synonymous attributes as if the second attribute and the third attribute were the same.

2. The computer-implemented method of claim 1, wherein determining the plurality of attributes further comprises:
   identifying an association between a first code in the item data and the first attribute based at least in part on a translation table;
   assigning the first code to the first attribute.

3. The computer-implemented method of claim 1, wherein the first user input further comprises an exclusion attribute, and wherein determining the subset of items further comprises:
   determining a first item associated with the exclusion attribute; and
   excluding the first item from the subset of items.

4. The computer-implemented method of claim 1, wherein the item data comprises row and columnar data, and wherein determining the plurality of items from the item data further comprises:
   converting at least some of the row and columnar data into a plurality of data objects, wherein each item of the plurality of items is a data object from the plurality of data objects.

5. The computer-implemented method of claim 1, wherein the plurality of visualizations further comprise a plurality of graphs, the computer-implemented method further comprising:
 receiving a user interface selection to change the plurality of visualizations;
 in response to receiving the user interface selection, causing presentation, in the user interface, of a plurality of time series visualizations based at least in part on the item metadata and the subset of items.

6. The computer-implemented method of claim 1, wherein determining the plurality of attributes further comprises:
 assigning, from the item data, a multi-word phrase to the first attribute.

7. The computer-implemented method of claim 6, further comprising:
 determining, from the item data, the multi-word phrase using an n-gram identification algorithm.

8. The computer-implemented method of claim 1, wherein the plurality of summary indicators indicate at least one of: growth rate data, market share data, or sample size data.

9. The computer-implemented method of claim 1, wherein the second dictionary comprises a crowd-sourced dictionary.

10. A system comprising:
 at least one computer hardware processor; and
 data storage comprising instructions executable by the at least one computer hardware processor to cause the system to:
  generate item data, wherein generating the item data further comprises:
   determining, from a data set, a first column of data with a cardinality below a predefined cardinality threshold; and
   removing, from a data set, the first column of data that results in the item data;
  determine, from the item data, a plurality of attributes, wherein determining the plurality of attributes further comprises:
   identifying, from the item data, a first valid word that matches a first word in a first dictionary;
   adding the first valid word as a first attribute to the plurality of attributes;
   identifying, from the item data, a second valid word that matches a second word in a second dictionary different from the first dictionary; and
   adding the second valid word as a second attribute to the plurality of attributes;
  receive first user input comprising a set of user specified conjunction attributes, the set of user specified conjunction attributes comprising the first attribute;
  receive second user input comprising a set of user specified synonymous attributes, the set of user specified synonymous attributes comprising the second attribute and a third attribute;
  determine, from a plurality of items, a subset of items corresponding to the set of user specified conjunction attributes and the set of user specified synonymous attributes;
  determine, from item metadata, a plurality of summary indicators, wherein each summary indicator of the plurality of summary indicators is representative of each item from the subset of items; and
  cause presentation, in a user interface, a plurality of visualizations associated with a respective indicator from the plurality of summary indicators, wherein the plurality of visualizations indicate data associated with the set of user specified conjunction attributes and at least one attribute of the set of user specified synonymous attributes as if the second attribute and the third attribute were the same.

11. The system of claim 10, wherein determining the plurality of attributes further comprises:
 identifying an association between a first code in the item data and the first attribute based at least in part on a translation table;
 assigning the first code to the first attribute.

12. The system of claim 10, wherein the first user input further comprises an exclusion attribute, and wherein determining the subset of items further comprises:
 determining a first item associated with the exclusion attribute; and
 excluding the first item from the subset of items.

13. The system of claim 10, wherein the item data comprises row and columnar data, and wherein determining the plurality of items from the item data further comprises:
 converting at least some of the row and columnar data into a plurality of data objects, wherein each item of the plurality of items is a data object from the plurality of data objects.

14. The system of claim 10, wherein the plurality of visualizations further comprise a plurality of graphs, wherein the at least one computer hardware processor further execute additional code instructions to:
 receive a user interface selection to change the plurality of visualizations;
 in response to receiving the user interface selection, cause presentation, in the user interface, of a plurality of time series visualizations based at least in part on the item metadata and the subset of items.

15. The system of claim 10, wherein determining the plurality of attributes further comprises:
 assigning, from the item data, a multi-word phrase to the first attribute.

16. The system of claim 15, wherein the at least one computer hardware processor further execute additional code instructions to:
 determine, from the item data, the multi-word phrase using an n-gram identification algorithm.

17. The system of claim 10, wherein the plurality of summary indicators indicate at least one of: growth rate data, market share data, or sample size data.

18. The system of claim 10, wherein the second dictionary comprises a crowd-sourced dictionary.

* * * * *